(12) United States Patent
Deng et al.

(10) Patent No.: US 12,646,716 B2
(45) Date of Patent: Jun. 2, 2026

(54) MATERIALS AND METHODS OF PRODUCING LITHIUM COBALT OXIDE MATERIALS OF A BATTERY CELL

(71) Applicant: eJoule, Inc., Fremont, CA (US)

(72) Inventors: Haixia Deng, Fremont, CA (US);
Shengfeng Liu, Newark, CA (US);
Min-Duan Liu, Bethany, CT (US);
Mengchen Liu, Union City, CA (US);
Liang-Yuh Chen, Saratoga, CA (US)

( * ) Notice: Subject to any disclaimer, the term of this patent is extended or adjusted under 35 U.S.C. 154(b) by 174 days.

(21) Appl. No.: 18/105,713

(22) Filed: Feb. 3, 2023

(65) Prior Publication Data

US 2023/0187632 A1 Jun. 15, 2023

Related U.S. Application Data

(63) Continuation of application No. 17/478,869, filed on Sep. 17, 2021.

(Continued)

(51) Int. Cl.
H01M 4/525 (2010.01)
C01G 51/42 (2025.01)
(Continued)

(52) U.S. Cl.
CPC ............ H01M 4/525 (2013.01); C01G 51/42 (2013.01); H01M 4/0471 (2013.01);
(Continued)

(58) Field of Classification Search
CPC ............... H01M 4/525; H01M 4/0471; H01M 2004/028; C01G 51/42; C01P 2002/72; C01P 2004/03; C01P 2006/40
(Continued)

(56) References Cited

U.S. PATENT DOCUMENTS 6,383,235 B1 5/2002 Maegawa et al.
8,241,789 B2 8/2012 Chiang et al.
(Continued)

FOREIGN PATENT DOCUMENTS

CN 1178396 A 4/1998
CN 101415509 A 4/2009
(Continued)

OTHER PUBLICATIONS

PCT/US 21/51156_Notification of transmittal of the international search report and the written opinion of the international searching authority, or the declaration, dated Dec. 29, 2021.
(Continued)

*Primary Examiner* — Coris Fung
*Assistant Examiner* — Catriona M Corallo
(74) *Attorney, Agent, or Firm* — JAS LAW, LLP; Ya-Fen Chen

(57) ABSTRACT

Various lithium cobalt oxides materials doped with one or more metal dopants having a chemical formula of $Li_x Co_y O_z$ (doped $Me1_a Me2_b Me3_c \ldots MeN_n$), and method and apparatus of producing the various lithium cobalt oxides materials are provided. The method includes adjusting a molar ratio $M_{LiSalt}:M_{CoSalt}:M_{Me1Salt}:M_{Me2Salt}:M_{Me3Salt}: \ldots M_{MeNSalt}$ of a lithium-containing salt, a cobalt-containing salt and one or more metal-dopant-containing salts within a liquid mixture to be equivalent to a ratio of $x:y:a:b:c: \ldots n$, drying a mist of the liquid mixture in the presence of a gas to form a gas-solid mixture, separating the gas-solid mixture into one or more solid particles of an oxide material, and annealing the solid particles of the oxide material in the presence of another gas flow to obtain crystallized particles of the lithium cobalt oxide material. The process system has a mist generator, a drying chamber, one or more gas-solid separator, and one or more reactors.

20 Claims, 14 Drawing Sheets

Related U.S. Application Data

(60) Provisional application No. 63/080,023, filed on Sep. 18, 2020.

(51) Int. Cl.
*H01M 4/04* (2006.01)
*H01M 4/02* (2006.01)

(52) U.S. Cl.
CPC ...... *C01P 2002/72* (2013.01); *C01P 2004/03* (2013.01); *C01P 2006/40* (2013.01); *H01M 2004/028* (2013.01)

(58) Field of Classification Search
USPC ......................................................... 423/625
See application file for complete search history.

(56) References Cited

U.S. PATENT DOCUMENTS

| | | | |
|---|---|---|---|
| 9,614,220 | B2 | 4/2017 | Paulsen et al. |
| 9,882,206 | B2 | 1/2018 | Gopukumar et al. |
| 2003/0221589 | A1 | 12/2003 | Lee |
| 2008/0032132 | A1 | 2/2008 | Woodfield et al. |
| 2009/0117471 | A1 | 5/2009 | Grey et al. |
| 2011/0045206 | A1 | 2/2011 | Shang et al. |
| 2011/0045346 | A1* | 2/2011 | Chiang .................. H01G 11/56 |
| | | | 429/231.95 |
| 2013/0149609 | A1 | 6/2013 | Deng et al. |
| 2014/0272568 | A1 | 9/2014 | Frianeza-Kullberg |
| 2016/0200589 | A1 | 7/2016 | Fang et al. |
| 2018/0361338 | A1 | 12/2018 | Chen |
| 2020/0147574 | A1 | 5/2020 | Chen |

FOREIGN PATENT DOCUMENTS

| | | |
|---|---|---|
| EP | 1281673 B1 | 5/2003 |
| EP | 2314545 A1 | 4/2011 |
| EP | 3599222 A1 | 1/2020 |
| TW | 201332202 A | 8/2013 |
| TW | 201509792 A | 3/2015 |
| TW | 201512079 A | 4/2015 |
| WO | 2020264192 A1 | 12/2020 |

OTHER PUBLICATIONS

PCT/US 21/51157_Notification of transmittal of the international search report and the written opinion of the international searching authority, or the declaration, dated Dec. 28, 2021.

Hee Jang , Chun Seong , Yong Suh , Heon Kim & Churl Lee (2004) Synthesis of Lithium-Cobalt Oxide Nanoparticles by Flame Spray Pyrolysis, Aerosol Science and Technology, 38:10, 1027-1032, DOI: 10.1080/027868290524016.

Fa-tang Li, Jingrun Ran, Mietek Jaroniecc & Shi Zhang Qiao (2015) Solution combustion synthesis of metal oxide nanomaterials for energy storage and conversion, Nanoscale.

S Levasseur, M Ménétrier, C Delmas (2002), On the LixCo1-yMgyO2 system upon deintercalation: electrochemical, electronic properties and 7Li MAS NMR studies, Journal of Power Sources, vol. 112, Issue 2, pp. 419-427. https://doi.org/10.1016/S0378-7753(02)00456-1.

* cited by examiner

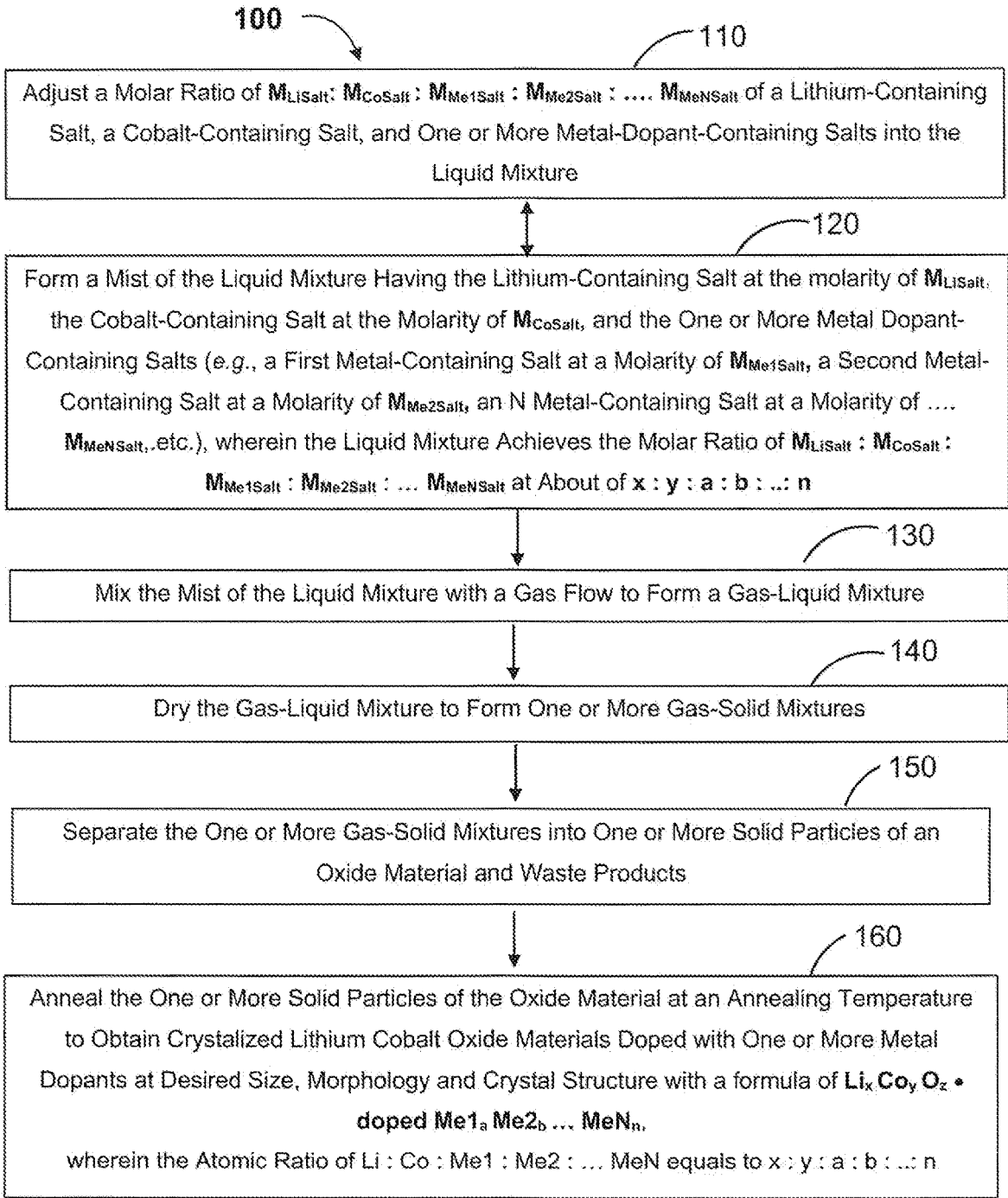

100

110

Adjust a Molar Ratio of $M_{LiSalt}$ : $M_{CoSalt}$ : $M_{Me1Salt}$ : $M_{Me2Salt}$ : …. $M_{MeNSalt}$ of a Lithium-Containing Salt, a Cobalt-Containing Salt, and One or More Metal-Dopant-Containing Salts into the Liquid Mixture

120

Form a Mist of the Liquid Mixture Having the Lithium-Containing Salt at the molarity of $M_{LiSalt}$, the Cobalt-Containing Salt at the Molarity of $M_{CoSalt}$, and the One or More Metal Dopant-Containing Salts (e.g., a First Metal-Containing Salt at a Molarity of $M_{Me1Salt}$, a Second Metal-Containing Salt at a Molarity of $M_{Me2Salt}$, an N Metal-Containing Salt at a Molarity of …. $M_{MeNSalt}$,.etc.), wherein the Liquid Mixture Achieves the Molar Ratio of $M_{LiSalt}$ : $M_{CoSalt}$ : $M_{Me1Salt}$ : $M_{Me2Salt}$ : … $M_{MeNSalt}$ at About of x : y : a : b : ..: n

130

Mix the Mist of the Liquid Mixture with a Gas Flow to Form a Gas-Liquid Mixture

140

Dry the Gas-Liquid Mixture to Form One or More Gas-Solid Mixtures

150

Separate the One or More Gas-Solid Mixtures into One or More Solid Particles of an Oxide Material and Waste Products

160

Anneal the One or More Solid Particles of the Oxide Material at an Annealing Temperature to Obtain Crystalized Lithium Cobalt Oxide Materials Doped with One or More Metal Dopants at Desired Size, Morphology and Crystal Structure with a formula of $Li_x Co_y O_z$ • doped $Me1_a Me2_b … MeN_n$, wherein the Atomic Ratio of Li : Co : Me1 : Me2 : … MeN equals to x : y : a : b : ..: n

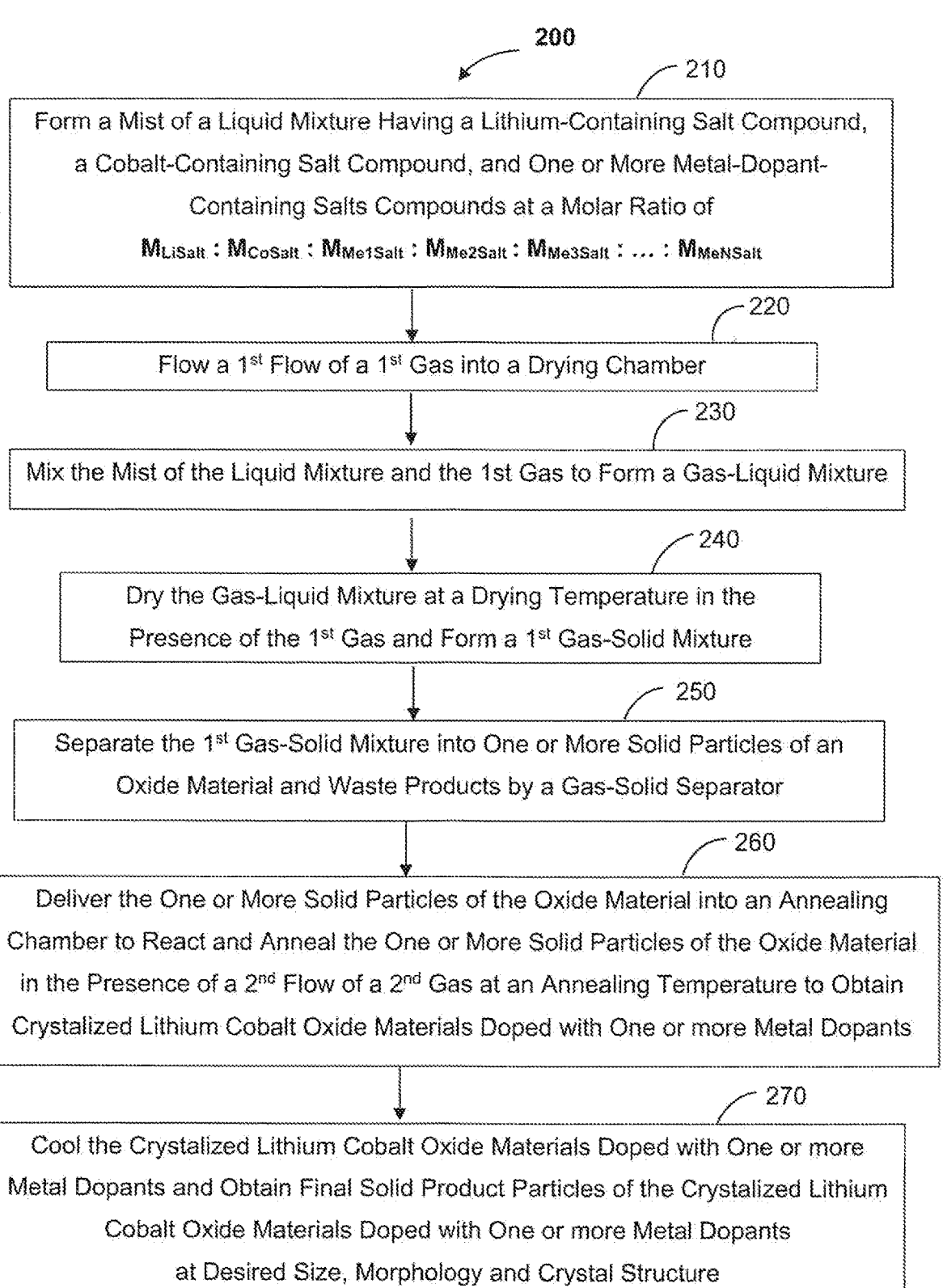

210

Form a Mist of a Liquid Mixture Having a Lithium-Containing Salt Compound, a Cobalt-Containing Salt Compound, and One or More Metal-Dopant-Containing Salts Compounds at a Molar Ratio of $M_{LiSalt} : M_{CoSalt} : M_{Me1Salt} : M_{Me2Salt} : M_{Me3Salt} : ... : M_{MeNSalt}$

220

Flow a 1st Flow of a 1st Gas into a Drying Chamber

230

Mix the Mist of the Liquid Mixture and the 1st Gas to Form a Gas-Liquid Mixture

240

Dry the Gas-Liquid Mixture at a Drying Temperature in the Presence of the 1st Gas and Form a 1st Gas-Solid Mixture

250

Separate the 1st Gas-Solid Mixture into One or More Solid Particles of an Oxide Material and Waste Products by a Gas-Solid Separator

260

Deliver the One or More Solid Particles of the Oxide Material into an Annealing Chamber to React and Anneal the One or More Solid Particles of the Oxide Material in the Presence of a 2nd Flow of a 2nd Gas at an Annealing Temperature to Obtain Crystalized Lithium Cobalt Oxide Materials Doped with One or more Metal Dopants

270

Cool the Crystalized Lithium Cobalt Oxide Materials Doped with One or more Metal Dopants and Obtain Final Solid Product Particles of the Crystalized Lithium Cobalt Oxide Materials Doped with One or more Metal Dopants at Desired Size, Morphology and Crystal Structure

Figure 1B

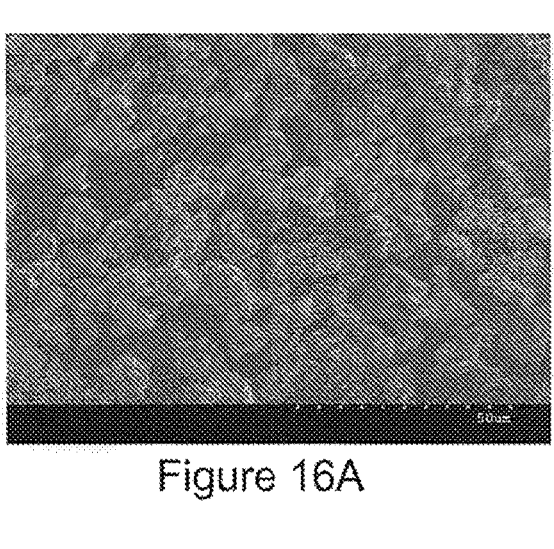
Figure 16A
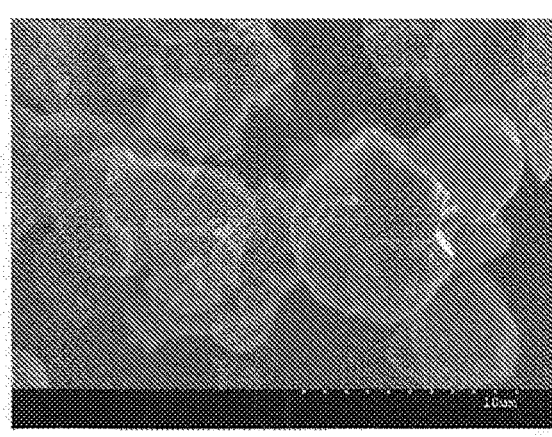
Figure 16B
Figure 16C
Figure 17A
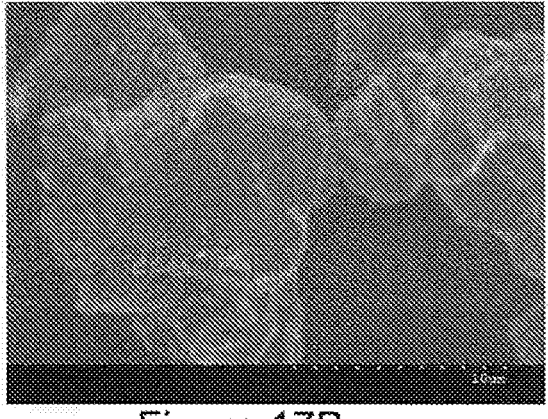
Figure 17B
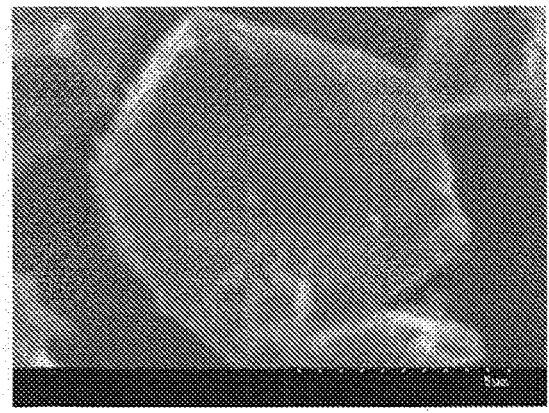
Figure 17C

MATERIALS AND METHODS OF PRODUCING LITHIUM COBALT OXIDE MATERIALS OF A BATTERY CELL

CROSS-REFERENCE TO RELATED APPLICATIONS

This application is a continuation of U.S. patent application Ser. No. 17/478,869, filed on Sep. 17, 2021, which claims benefit of U.S. provisional patent application Ser. No. 63/080,023, filed on Sep. 18, 2020, which. All of the above-referenced applications are herein incorporated by reference.

BACKGROUND OF THE INVENTION

Great efforts have been devoted to the development of advanced electrochemical battery cells to meet the growing demand of various consumer electronics, electrical vehicles and grid energy storage applications in terms of high energy density, high power performance, high capacity, long cycle life, low cost and excellent safety. Thus, a need for more efficient utilization of the available energy resources as well as air-quality-control has generated an enormous interest in the development of advanced high energy density batteries for electric powered vehicles. Furthermore, cost effectiveness, great cycling life, stability, rechargeability, and better safety characteristics have been other factors driving the battery market.

In an electrochemically active battery cell, a cathode and an anode are immersed in an electrolyte and electronically separated by a separator. The separator is typically made of porous polymer membrane materials such that metal ions released from the electrodes into the electrolyte can diffuse through the pores of the separator and migrate between the cathode and the anode during battery charge and discharge. The type of a battery cell is usually named from the metal ions that are transported between its cathode and anode electrodes. Lithium ion battery is a secondary battery which was developed in the early 1990s and it represent a new generation of lightweight, compact, and yet high-energy power sources. However, the cost for commercially manufacturing various lithium battery materials is considerably higher than other types of secondary batteries.

Cathode active materials are the most expensive component in a lithium ion battery and, to a relatively large extent, determines the energy density, cycle life, manufacturing cost and safety of a lithium battery cell. Examples of good cathode active materials include nanometer- or micron-sized lithium transition metal oxide materials and lithium ion phosphate, etc. When lithium battery was first commercialized, lithium cobalt oxide ($LiCoO_2$) material is used as the cathode material. While the theoretical capacity of $LiCoO_2$ is about 274-275 mAh/g, and a capacity of the $LiCoO_2$ when using 4.2 V as an upper limit voltage is about 150 mAh/g.

To further increase the battery performance of $LiCoO_2$, one can increase charging cut-off voltage to extract more $Li^+$. However, conventional material manufacturing processes such as solid-state reaction (e.g., mixing solid precursors and then calcination) and wet-chemistry processes (e.g., treating precursors in solution through co-precipitation, sol-gel, or hydrothermal reaction, etc., and then mixing and calcination) have notable challenges in promoting cycle stability of $LiCoO_2$ at high voltage. Since a high voltage is applied to $LiCoO_2$ materials, it is difficult to consistently produce $LiCoO_2$ having the characteristics of high stability and long battery life cycle at a level of industrial size.

In addition, solid-state diffusion rates affect the performance of resulting batteries made from these lithium oxide materials in applications requiring high-powered batteries. Overall, the processing time for such a solid-state multi-step batch manufacturing process will take up to a week so it is very labor intensive and energy consuming. Batch process also increases the chance of introducing impurity with poor run-to-run quality consistency and low overall yield. Specifically, co-precipitation is not suitable for the preparation of highly pure, accurate stoichiometric phases of these lithium-containing transition metal oxide battery materials.

Thus, there is a need for an improved method and system to manufacture high power performance, high capacity, long cycle life, excellent stability, properly crystallized, structured lithium metal oxide active materials for a lithium-ion battery (LIB) cell at high voltage and high temperature.

SUMMARY OF THE INVENTION

Embodiments of the invention generally provide lithium ion battery materials and methods for producing lithium ion battery materials thereof. One embodiment of the invention provides an oxide material, such as a lithium cobalt oxide material doped with at least one metal dopant ($Li_x Co_y O_z$● doped $Me_a$), wherein x is from 0.9 to 1.1 ($0.9 \leq x \leq 1.1$), y is from 0.9 to 1.1 ($0.9 \leq y \leq 1.1$), z is from 1.8 to 2.2 ($1.8 \leq z \leq 2.2$), and $0 < a \leq 0.05$. The material can be obtained from a process, which includes forming a mist of a liquid mixture comprising a lithium-containing salt, a cobalt-containing salt, and at least one metal-dopant-containing salt, mixing the mist of the liquid mixture with a first gas flow to form a gas-liquid mixture, wherein the liquid mixture is soluble in a suitable solvent, drying the gas-liquid mixture to form a gas-solid mixture, separating the gas-solid mixture into one or more solid particles of an oxide material; and annealing the one or more solid particles of the oxide material at an annealing temperature of 400° C. or higher to obtain crystallized particles of the lithium cobalt oxide material doped with at least one metal dopant ($Li_x Co_y O_z$ ● doped $Me_a$).

In one example, the lithium cobalt oxide material doped with the at least one metal dopant ($Li_xCo_yO_z$● doped $Me_a$), is obtained from adjusting a molar ratio $M_{LiSalt}:M_{CoSalt}:M_{MeSalt}$ of the lithium-containing salt, the cobalt-containing salt, and the at least one metal-dopant-containing salts in the liquid mixture to be a ratio of about x:y:a for making the lithium cobalt oxide material doped with at least one metal dopant (Me) at desirable atomic ratio of Li:Co:Me equaling to x:y:a. For example, the molar ratio $M_{LiSalt}:M_{CoSalt}:M_{MeSalt}$ of the lithium-containing salt, the cobalt-containing salt, and the at least one metal-dopant-containing salt is performed prior to forming the mist of the liquid mixture. As another example, molar ratio $M_{LiSalt}:M_{CoSalt}:M_{MeSalt}$ of the lithium-containing salt, the cobalt-containing salt, and the at least one metal-dopant-containing salts can be adjusted at the same time of forming the mist of the liquid mixture.

Another embodiment of the invention provides a lithium cobalt oxide material doped with one or more metal dopants ($Li_x Co_y O_z$ ● doped $Me1_a$, $Me2_b$, $Me3_c$, . . . $MeN_n$), wherein x is from 0.9 to 1.1 ($0.9 \leq x \leq 1.1$), y is from 0.9 to 1.1 ($0.9 \leq y \leq 1.1$), z is from 1.8 to 2.2 ($1.8 \leq z \leq 2.2$), and wherein $N \geq 1$, and each a, b, c, . . . , n is more than 0 and no more than 0.05. The lithium cobalt oxide material doped with one or more metal dopants is obtained from a process, which includes adjusting a molar ratio $M_{LiSalt}:M_{CoSalt}:M_{Me1Salt}:M_{Me2Salt}:M_{Me3Salt}: . . . M_{MeNSalt}$ of a lithium-containing salt, a cobalt-containing salt, and one or more metal-dopant-containing salts which are soluble in a suitable solvent into a liquid mixture, wherein each of the one or more metal-dopant-containing salts is selected from a group consisting of a first metal-containing salt, a second metal-containing salt, a third metal-containing salt, . . . an N metal-containing salt and combinations thereof, and forming a mist of the liquid mixture. The process further includes mixing the mist of the liquid mixture with a gas flow to form a gas-liquid mixture, drying the gas-liquid mixture to form a gas-solid mixture, separating the gas-solid mixture into one or more solid particles of an oxide material; and annealing the one or more solid particles of the oxide material at an annealing temperature of 400° C. or higher to obtain crystallized particles of the lithium cobalt oxide material doped with one or more metal dopants.

Another embodiment of the invention provides a lithium cobalt oxide material doped with at least one metal dopant ($Li_x Co_y O_z$ ● doped $Me_a$), wherein x is from 0.9 to 1.1 ($0.9 \leq x \leq 1.1$), y is from 0.9 to 1.1 ($0.9 \leq y \leq 1.1$), z is from 1.8 to 2.2 ($1.8 \leq z \leq 2.2$), and wherein $0 < a \leq 0.05$. The lithium cobalt oxide material doped with one or more metal dopants is obtained from a process, which includes adjusting a molar ratio $M_{LiSalt}:M_{CoSalt}:M_{Me\ Salt}$ of a lithium-containing salt, a cobalt-containing salt, and at least one metal-dopant-containing salt into a liquid mixture and forming a mist of the liquid mixture, where the liquid mixture comprises the lithium-containing salt, the cobalt-containing salt; the at least one metal-dopant-containing salt; and a suitable solvent. The process further includes mixing the mist of the liquid mixture with a gas flow to form a gas-liquid mixture, drying the gas-liquid mixture to form one or more solid particles of an oxide material; and annealing the one or more solid particles of the oxide material at an annealing temperature of 400° C. or higher to obtain crystallized particles of the lithium cobalt oxide material doped with at least one metal dopant ($Li_x Co_y O_z$ ● doped $Me_a$).

In yet another embodiment, a method of producing a lithium cobalt oxide material with one or more metal dopants having a chemical formula of $Li_x Co_y O_z$ (doped $Me1_a$ $Me2_b$, $Me3_c$ . . . $MeN_n$) is provided. The method includes forming a mist of a liquid mixture, where the liquid mixture is obtained from adjusting a molar ratio $M_{LiSalt}:M_{CoSalt}:M_{MeSalt}$ of a lithium-containing salt (LiSalt), a cobalt-containing salt (CoSalt), and at least one metal-dopant-containing salt (MeSalt) in the liquid mixture to be a ratio of about x:y:a for making the lithium cobalt oxide material doped with at least one metal dopant (Me) at desirable atomic ratio of Li:Co:Me equaling to x:y:a. The method further includes mixing the mist of the liquid mixture with a gas flow to form a gas-liquid mixture, drying the gas-liquid mixture to form a gas-solid mixture, separating the gas-solid mixture into one or more solid particles of an oxide material, and annealing the one or more solid particles of the oxide material at an annealing temperature of 400° C. or higher to obtain crystallized particles of the lithium cobalt oxide material doped with at least one metal dopant (Me) ($Li_x Co_y O_z$ ● doped $Me_a$), where x is from 0.9 to 1.1 ($0.9 \leq x \leq 1.1$), y is from 0.9 to 1.1 ($0.9 \leq y \leq 1.1$), z is from 1.8 to 2.2 ($1.8 \leq z \leq 2.2$), and $0 < a \leq 0.05$.

BRIEF DESCRIPTION OF THE DRAWING

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1A illustrates one embodiment of a flow chart of a method of producing cathode materials for lithium ion batteries.

FIG. 1B illustrates another embodiment of another flow chart of a method of producing cathode materials for lithium ion batteries.

FIG. 16A is a scanning electron microscopy (SEM) image of another example of crystallized lithium cobalt oxide materials of the invention.

FIG. 16B is a scanning electron microscopy (SEM) image of the example of FIG. 16A in larger magnitude.

FIG. 16C is a scanning electron microscopy (SEM) image of the example of FIG. 16A in larger magnitude.

FIG. 17A is a scanning electron microscopy (SEM) image of another example of crystallized lithium cobalt oxide materials of the invention.

FIG. 17B is a scanning electron microscopy (SEM) image of the example of FIG. 17A in larger magnitude.

FIG. 17C is a scanning electron microscopy (SEM) image of the example of FIG. 17A in larger magnitude.

DETAILED DESCRIPTION

Figure 2:
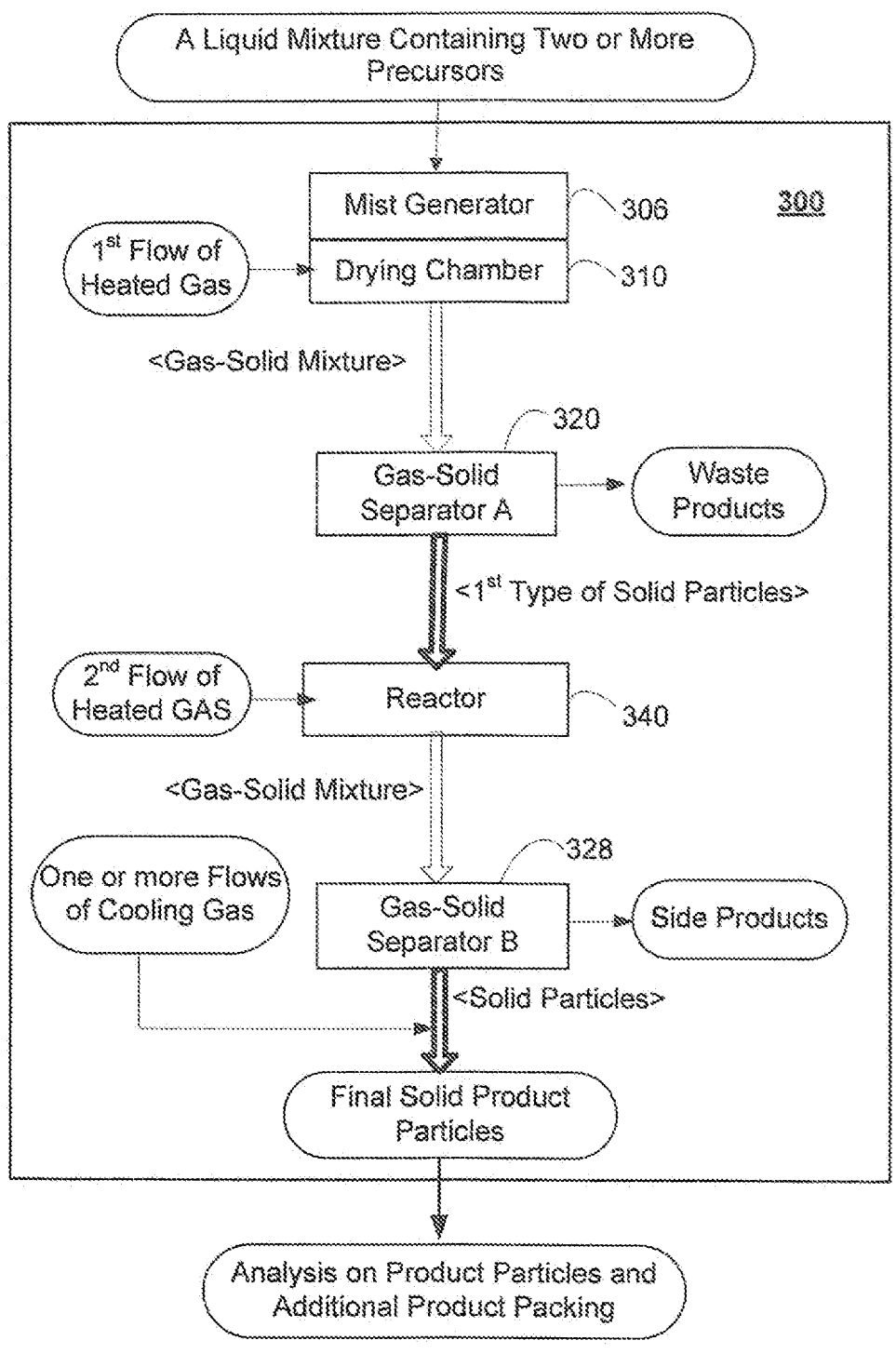
FIG. 2 is a schematic of an exemplary processing system useful in preparing a material for a battery electrochemical cell according one embodiment of the invention.

This invention generally relates to compositions, oxide materials, battery materials, apparatuses, and methods thereof in soluble solutions in proper molar ratio to precisely control and obtain proper atomic-level ratios and make-up of a battery active material to be used for a lithium-ion battery. The battery materials and methods and apparatus provided here results in highly pure, accurate stoichiometric phases battery cathode materials and can be used, in turn, to make lithium-ion batteries with, with characteristics associated with high battery cycling performance, including high electric capacity.

FIG. 1A is a flow chart showing a method 100 of producing lithium cobalt oxide material doped with one or more metal dopants having a chemical formula of $Li_x Co_y O_z$ ● doped $Me1_a$ $Me2_b$ $Me3_c$ . . . $MeN_n$ for lithium-ion batteries. The method 100 includes a step 110 or series of steps of adjusting a molar ratio $M_{LiSalt}$:$M_{CoSalt}$:$M_{Me1Salt}$:$M_{Me2Salt}$:$M_{Me3Salt}$: . . . :$M_{MeNSalt}$ of a lithium-containing salt (LiSalt), a cobalt-containing salt (CoSalt), and one or more metal-dopant-containing salts which are soluble in a suitable solvent into a liquid mixture, where each of the one or more metal-dopant-containing salts is selected from a group consisting of a first metal-containing salt, a second metal-containing salt, a third metal-containing salt, . . . an N metal-containing salt and combinations thereof. The molar ratio $M_{LiSalt}$:$M_{CoSalt}$:$M_{Me1Salt}$:$M_{Me2Salt}$:$M_{Me3Salt}$: . . . :$M_{MeNSalt}$ of the lithium-containing salt (LiSalt), the cobalt-containing salt (CoSalt), and the one or more metal-dopant-containing salts is adjusted to be a ratio of about x:y:a:b:c: . . . :n for making the lithium cobalt oxide doped with one or more metal dopants ($Li_x Co_y O_z$ ● doped $Me1_a$ $Me2_b$ $Me3_c$ . . . $MeN_n$) at desirable atomic ratio of Li:Co:Me1:Me2:Me3 . . . :MeN equaling to x:y:a:b:c: . . . :n, where x is from 0.9 to 1.1 (0.9≤x≤1.1), y is from 0.9 to 1.1 (0.9≤y≤1.1), z is from 1.8 to 2.2 (1.8≤z≤2.2), and where N≥1, a is from 0 to 0.05 (0≤x≤0.05), b is from 0 to 0.05 (0≤b≤0.05), c is from 0 to 0.05 (0≤x≤0.05), . . . , and n is from 0 to 0.05 (0≤x≤0.05).

In one embodiment, the desired molar ratio of $M_{LiSalt}$:$M_{CoSalt}$:$M_{Me1Salt}$:$M_{Me2Salt}$:$M_{Me3Salt}$: . . . :$M_{MeNSalt}$ can be achieved by measuring and preparing appropriate amounts a lithium-containing salt (LiSalt), a cobalt-containing salt (CoSalt), a first metal dopant-containing salt (Me1Salt), a second metal dopant-containing salt (Me2Salt), a third metal dopant-containing salt (Me3Salt), . . . , and a N metal dopant-containing salt (MeNSalt). For example, the molar ratio $M_{LiSalt}$:$M_{CoSalt}$:$M_{Me1Salt}$:$M_{Me2Salt}$:$M_{Me3Salt}$: . . . : $M_{MeNSalt}$ of the lithium-containing salt, the cobalt-containing salt, the first metal-containing salt, the second metal-containing salt, the third metal-containing salt, . . . the N metal-containing salt can be adjusted (e.g., manually or digitally using a processing system of the invention) and prepared directly into a liquid mixture in a desired concentration prior to forming the mist of the liquid mixture. As another example, the adjusting the molar ratio $M_{LiSalt}$:$M_{CoSalt}$:$M_{Me1Salt}$:$M_{Me2Salt}$:$M_{Me3Salt}$: . . . :$M_{MeNSalt}$ of the lithium-containing salt, the cobalt-containing salt, the first metal-containing salt, the second metal-containing salt, the third metal-containing salt, . . . and the N-containing salt can be performed simultaneously with forming the mist of the liquid mixture.

The method 100 includes further includes a step 120 of forming a liquid mixture having the lithium-containing salt at the molarity of $M_{LiSalt}$, the cobalt-containing salt at the molarity of $M_{CoSalt}$, and the one or more metal dopant-containing salts (e.g., a First Metal-Containing Salt at a Molarity of $M_{Me1Salt}$, a Second Metal-Containing Salt at a Molarity of $M_{Me2Salt}$, an N Metal-Containing Salt at a Molarity of . . . $M_{MeNSalt}$, etc.) for producing lithium cobalt oxide materials doped with one or more metal dopants with a targeting formula of $Li_x Co_y O_z$ ● doped $Me1_a$ $Me2_b$ $Me3_c$ . . . $MeN_n$, where the one or more metal-dopant-containing salts comprising the first-containing metal salt, the second-containing metal salt, the third-containing metal salt, . . . , the N-containing salt are generated, and where the liquid mixture achieves the molar ratio of $M_{LiSalt}$:$M_{CoSalt}$:$M_{Me1Salt}$:$M_{Me2Salt}$: . . . :$M_{MeNSalt}$ at about of x:y:a:b: . . . :n.

The mist of the liquid mixture may include droplets of various reactant solution, precursor solutions, etc., in homogenous forms, sizes, shape, etc. For example, the molar ratio $M_{LiSalt}$:$M_{CoSalt}$:$M_{Me1Salt}$:$M_{Me2Salt}$:$M_{Me3Salt}$: . . . :$M_{MeNSalt}$ of the lithium-containing salt, the cobalt-containing salt, and the first metal-containing salt, the second metal-containing salt, the third metal-containing salt, . . . the N-containing salt can be digitally adjusted, depending on the desired composition of final solid product particles.

In one embodiment, the one or more metal dopants (Me1, Me2, Me3, . . . MeN) are incorporated into the lithium cobalt oxide materials, wherein Me1, Me2, Me3, . . . MeN are different metal dopants. For example, each of the one or more metal dopants (i.e. Me1, Me2, Me3, . . . MeN) can be selected from a group consisting of Al, Mg, Mn, Zr, Zn, Nb, La, Ce, Sn, Ga, Ba, Ac, Ca, Sc, Ti, V, Cr, Fe, Cu, B, Ge, As, Hf, Mo, W, Re, Ru, Rh, Pt, Ag, Os, Ir, Au, and combinations thereof.

Another embodiment of the present invention is that the liquid form of the lithium-containing salt, the cobalt-containing salt and the first metal-containing salt, the second metal-containing salt, the third metal-containing salt, . . . the N-containing salt can be dissolved or dispersed in a suitable solvent (e.g., water, alcohol, methanol, isopropyl alcohol, organic solvents, inorganic solvents, organic acids, sulfuric acid ($H_2SO_4$), citric acid ($C_6H_8O_7$), acetic acids ($CH_3COOH$), butyric acid ($C_4H_8O_2$), lactic acid ($C_3H_6O_3$), nitric acid ($HNO_3$), hydrochloric acid (HCl), ethanol, pyridine, ammonia, acetone, and their combinations) to form into a liquid mixture of an aqueous solution, slurry, gel, aerosol or any other suitable liquid forms. For example, one or more solid particles of an oxide material can be adjusted manually or digitally and prepared in desirable molar ratio and mixed into a liquid mixture, such as by adjusting, measuring and preparing appropriate amounts of the lithium-containing salt compound, the cobalt-containing salt compound and the one or more metal-dopant-containing salts into one solution with suitable amounts of a solvent. Depending on the solubility of the lithium-containing salt, the cobalt-containing salt and the one or more metal-containing salts in a chosen solvent, pH, temperature, and mechanical stirring and mixing can be adjusted to obtain a liquid mixture where the one or more metal-dopant-containing salts at the desirable molar concentrations are fully dissolved and/or evenly dispersed.

In another embodiment, the lithium containing salts are mixed into the liquid mixture. Exemplary lithium containing salts include, but not limited to, lithium sulfate ($Li_2SO_4$), lithium nitrate ($LiNO_3$), lithium carbonate ($Li_2CO_3$), lithium acetate ($LiCH_2COO$), lithium hydroxide (LiOH), lithium formate ($LiCHO_2$), lithium chloride (LiCl), and combinations thereof. The cobalt containing salts are mixed into the liquid mixture. Exemplary cobalt containing salts include, but not limited to, cobalt sulfate ($CoSO_4$), cobalt nitrate ($Co(NO_3)_2$), cobalt acetate ($Co(CH_2COO)_2$), cobalt formate ($Co(CHO_2)_2$), cobalt chloride ($CoCl_2$), and combinations thereof.

In still another embodiment, the first metal-containing salt, the second metal-containing salt, the third metal containing salt, . . . the N-containing salts are mixed into the liquid mixture. Exemplary metal-dopant-containing salts include, but not limited to, of magnesium nitrate $Mg(NO_3)_2$, magnesium acetate (MgAc, $Mg(CH_3COO)_2$), magnesium chloride ($MgCl_2$), magnesium sulfate ($MgSO_4$), magnesium formate ($C_2H_2MgO_4$), aluminum nitrate ($Al(NO_3)_3$), aluminum acetate (AlAc, $C_6H_9AlO_6$), aluminum chloride ($AlCl_3$), aluminum sulfate ($Al_2(SO_4)_3$), aluminum formate (Al $(HCOO)_3$), manganese sulfate ($MnSO_4$), manganese nitrate ($Mn(NO_3)_2$), manganese acetate ($Mn(CH_2COO)_2$), manganese formate ($Mn(CHO_2)_2$), manganese chloride ($MnCl_2$), zirconium nitrate ($Zr(NO_3)_4$), zirconium acetate ($C_8H_{12}O_8Zr$), zirconium chloride ($ZrCl_4$), zirconium sulfate ($Zr(SO_4)_2$), zirconium formate ($C_4H_4O_8Zr$), nickel sulfate ($NiSO_4$), nickel nitrate ($Ni(NO_3)_2$), nickel acetate (Ni $(CH_2COO)_2$), nickel formate ($Ni(CHO_2)_2$), nickel chloride ($NiCl_2$), titanyl nitrate ($TIO(NO_3)_2$), aluminum (Al)-containing compound, magnesium (Mg)-containing compound, titanium (Ti)-containing compound, sodium (Na)-containing compound, potassium (K)-containing compound, scandium (Sc)-containing compound, niobium (Nb)-containing compound, neodymium (Nd)-containing compound, lanthanum (La)-containing compound, cerium (Ce)-containing compound, silicon (Si)-containing compound, rubidium (Rb)-containing compound, vanadium (V)-containing compound, cesium (Cs)-containing compound, chromium (Cr)-containing compound, copper (Cu)-containing compound, magnesium (Mg)-containing compound, manganese (Mn)-containing compound, zirconium (Zr)-containing compound, zinc (Zn)-containing compound, tin (Sn)-containing compound, gallium (Ga)-containing compound, barium (Ba)-containing compound, actinium (Ac)-containing compound, calcium (Ca)-containing compound, iron (Fe)-containing compound, boron (B)-containing compound, germanium (Ge)-containing compound, arsenic (As)-containing compound, hafnium (Hf)-containing compound, Molybdenum (Mo)-containing compound, tungsten (W)-containing compound, rhenium (Re)-containing compound, ruthenium (Ru)-containing compound, rhodium (Rh)-containing compound, platinum (Pt)-containing compound, silver (Ag)-containing compound, osmium (Os)-containing compound, iridium (Ir)-containing compound, gold (Au)-containing compound, and combinations thereof, among others.

Not wishing to be bound by theory, it is contemplated that, all the required metal-containing salts are first prepared in liquid phase (e.g., into a solution, slurry, or gel-like mixtures) using the lithium-containing salt, the cobalt-containing salt, the first metal-containing salt, the second metal-containing salt, the third metal-containing salt, . . . the N-containing salt as the sources of each metal element such that the different metals can be mixed uniformly at desired ratio. As an example, to prepare a liquid mixture of an aqueous solution, slurry or gel, one or more metal dopants with high water solubility can be used. For example, metal nitrate, metal sulfate, metal chloride, metal acetate, and metal format, etc., can be used. Organic solvents, such as alcohols, isopropanol, etc., can be used to dissolve and/or disperse metal-containing salt compounds with low water solubility. In some cases, the pH value of the liquid mixture can be adjusted to increase the solubility of the one or more precursor compounds. Optionally, chemical additives, gelation agents, and surfactants, such as ammonia, EDTA, etc., can be added into the liquid mixture to help dissolve or disperse the compounds in a chosen solvent.

At step 130, the mist of the liquid mixture is mixed with a gas flow of a gas inside a mist generator to form a gas-liquid mixture. In addition, the liquid mixture is mixed with a gas flow of another gas inside a drying chamber. It is contemplated that these gas flows are provided to thoroughly mix the liquid mixture to uniformly form into the gas-liquid mixture and assist in carrying the gas-liquid mixture inside the drying chamber. The method 100 further includes a step

140 of drying the gas-liquid mixture at a drying temperature in the presence of the gas flows for a time period to obtain gas-solid mixtures.

The gases within the gas flows may be, for example, air, oxygen, carbon dioxide, nitrogen gas, hydrogen gas, inert gas, noble gas, and combinations thereof, among others. The gas flows may be pumped through an air filter to remove any particles, droplets, or contaminants, and the flow rate of the gases can be adjusted by a valve or other means. Accordingly, one embodiment of the invention provides that the gases are used as the gas source for carrying out drying reaction, evaporation, dehydration, and/or other reactions. In another embodiment, the gases are heated to a drying temperature to mix with the mist and remove moisture from the mist.

The drying temperature can be, for example, about 200° C. or higher, such as from 200° C. to 300° C., or at 250° C. The time period is around 1 second to 1 hour. Optionally, additional gas flow may be used to perform the drying reaction. The additional gas may be, for example, air, oxygen, carbon dioxide, nitrogen gas, hydrogen gas, inert gas, noble gas, and combinations thereof, among others. The additional gas flow may be pumped through an air filter to remove any particles, droplets, or contaminants, and the flow rate of the additional gas can be adjusted by a valve or other means.

Next, at step 150, step 150 includes separating the gas-solid mixture into one or more solid particles of an oxide material and waste products. The gas-solid mixture comprising of the gas and the compounds mixed together are separated into one or more solid particles of oxide materials and waste products. The one or more solid particles of the oxide material may include thoroughly mixed solid particles of the compounds. Accordingly, the step 150 of the method 100 of preparing a battery material includes obtaining one or more solid particles of the oxide material from a gas-solid mixture comprised of a gas and one or more compounds.

The method 100 further includes a step 160 of annealing the one or more solid particles of an oxide material at an annealing temperature for a time period to obtain crystallized lithium cobalt oxide materials doped with one or more metal dopants of desired size, morphology and crystal structure with a formula of $Li_x Co_y O_z \bullet$ doped $Me1_a Me2_b Me3_c \ldots MeN_n$, wherein the atomic ratio of Li:Co:Me1: Me2:Me3 . . . :MeN equaling to x:y:a:b:c: . . . :n. The annealing temperature is from 400° C. to 1200° C., for example, more than 900° C., such as 1050° C. The time period is about 1 second to 10 hours.

FIG. 1B illustrates another embodiment of a flow chart of a method 200 of producing a lithium cobalt oxide material doped with one or more metal dopants for lithium ion batteries. The method 200 comprises a first step 210 of forming a mist of a liquid mixture having a lithium-containing salt compound, a cobalt-containing salt compound, and one or more metal-dopant-containing salts compounds at a molar ratio of $M_{LiSalt}:M_{CoSalt}:M_{Me1Salt}:M_{Me2Salt}: M_{Me3Salt}: \ldots :M_{MeNSalt}$, where each of the one or more metal-dopant-containing salts compounds is selected from a group consisting of a first metal-containing salt compound, a second metal-containing salt compound, a third metal-containing salt compound, . . . an N metal-containing salt compound and combinations thereof. The molar ratio $M_{LiSalt}:M_{CoSalt}:M_{Me1Salt}:M_{Me2Salt}:M_{Me3Salt}: \ldots :M_{MeNSalt}$ is adjusted to be a ratio of about x:y:a:b:c: . . . :n for making the lithium cobalt oxide doped with one or more metal dopants ($Li_x Co_y O_z \bullet$ doped $Me1_a Me2_b Me3_c \ldots MeN_n$) at desirable atomic ratio of Li:Co:Me1:Me2:Me3 . . . :MeN equaling to x:y:a:b:c: . . . :n, where x is from 0.9 to 1.1 ($0.9 \leq x \leq 1.1$), y is from 0.9 to 1.1 ($0.95 \leq y \leq 1.1$), z is from 1.8 to 2.2 ($1.8 \leq z \leq 2.2$), and where N≥1, a is from 0 to 0.05 ($0 \leq x \leq 0.05$), b is from 0 to 0.05 ($0 \leq b \leq 0.05$), c is from 0 to 0.05 ($0 \leq x \leq 0.05$), . . . , and n is from 0 to 0.05 ($0 \leq x \leq 0.05$).

In one embodiment, the desired molar ratio of $M_{LiSalt}: M_{CoSalt}:M_{Me1Salt}:M_{Me2Salt}:M_{Me3Salt}: \ldots :M_{MeNSalt}$ can be achieved by measuring and preparing appropriate amounts a lithium-containing salt (LiSalt), a cobalt-containing salt (CoSalt), a first metal dopant-containing salt (Me1Salt), a second metal dopant-containing salt (Me2Salt), a third metal dopant-containing salt (Me3Salt), . . . , and a N metal dopant-containing salt (MeNSalt). For example, the molar ratio $M_{LiSalt}:M_{CoSalt}:M_{Me1Salt}:M_{Me2Salt}:M_{Me3Salt}: \ldots : M_{MeNSalt}$ of the lithium-containing salt, the cobalt-containing salt, the first metal-containing salt, the second metal-containing salt, the third metal-containing salt, . . . the N metal-containing salt can be adjusted (e.g., manually or digitally using a processing system of the invention) and prepared directly into a liquid mixture in a desired concentration prior to forming the mist of the liquid mixture. As another example, the adjusting the molar ratio $M_{LiSalt}: M_{CoSalt}:M_{Me1Salt}:M_{Me2Salt}:M_{Me3Salt}: \ldots :M_{MeNSalt}$ of the lithium-containing salt, the cobalt-containing salt, the first metal-containing salt, the second metal-containing salt, the third metal-containing salt, . . . and the N-containing salt can be performed simultaneously with forming the mist of the liquid mixture.

In one embodiment, liquid form of lithium-containing salt compound, cobalt-containing salt compound and one or more metal-dopant-containing salts can be adjusted and prepared directly into a liquid mixture in a desired concentration. The liquid form of the lithium-containing salt compound, the cobalt-containing salt compound and the one or more metal-dopant-containing salts can be dissolved or dispersed in a suitable solvent (e.g., water, alcohol, methanol, isopropyl alcohol, organic solvents, inorganic solvents, organic acids, sulfuric acid ($H_2SO_4$), citric acid ($C_6H_8O_7$), acetic acids ($CH_3COOH$), butyric acid ($C_4H_8O_2$), lactic acid ($C_3H_6O_3$), Nitric acid ($HNO_3$), hydrochloric acid (HCl), ethanol, pyridine, ammonia, acetone, and their combinations) to form into a liquid mixture of an aqueous solution, slurry, gel, aerosol or any other suitable liquid forms.

In another embodiment, the lithium-containing salt, the cobalt-containing salt and the one or more metal-dopant-containing salts can be used, depending on the desired composition of final solid product particles. For example, one or more solid particles of an oxide material can be digitally adjusted and prepared in desirable molar ratio and mixed into a liquid mixture, such as by digitally adjusting, measuring and preparing appropriate amounts of the lithium-containing salt, the cobalt-containing salt and the one or more metal-dopant-containing salts into a container with suitable amounts of a solvent. Depending on the solubility of the lithium-containing salt, the cobalt-containing salt and the one or more metal-dopant-containing salts in a chosen solvent, pH, temperature, and mechanical stirring and mixing can be adjusted to obtain a liquid mixture where the one or more metal-dopant-containing salts at the desirable molar concentrations are fully dissolved and/or evenly dispersed.

In yet another embodiment, the lithium-containing salt, the cobalt-containing salt and the one or more metal-dopant-containing salts are mixed into a liquid mixture for obtaining final solid product particles of a mixed metal oxide material.

For example, the lithium containing salts and the cobalt containing salts are mixed into the liquid mixture. Exemplary lithium containing salts include, but not limited to, lithium sulfate ($Li_2SO_4$), lithium nitrate ($LiNO_3$), lithium carbonate ($Li_2CO_3$), lithium acetate ($LiCH_2COO$), lithium hydroxide (LiOH), lithium formate ($LiCHO_2$), lithium chloride (LiCl), and combinations thereof. Exemplary cobalt containing salts include, but not limited to, cobalt sulfate ($CoSO_4$), cobalt nitrate ($Co(NO_3)_2$), cobalt acetate ($Co(CH_2COO)_2$), cobalt formate ($Co(CHO_2)_2$), cobalt chloride ($CoCl_2$), and combinations thereof.

As another example, the one or more metal-dopant-containing salts are mixed into the liquid mixture. Exemplary other metal-containing salts include, but not limited to, of magnesium nitrate $Mg(NO_3)_2$, magnesium acetate (MgAc, $Mg(CH_3COO)_2$), magnesium chloride ($MgCl_2$), magnesium sulfate ($MgSO_4$), magnesium formate ($C_2H_2MgO_4$), aluminum nitrate ($Al(NO_3)_3$), aluminum acetate (AlAc, $C_6H_9AlO_6$), aluminum chloride ($AlCl_3$), aluminum sulfate ($Al_2(SO_4)_3$), aluminum formate (Al $(HCOO)_3$), manganese sulfate ($MnSO_4$), manganese nitrate ($Mn(NO_3)_2$), manganese acetate ($Mn(CH_2COO)_2$), manganese formate ($Mn(CHO_2)_2$), manganese chloride ($MnCl_2$), zirconium nitrate ($Zr(NO_3)_4$), zirconium acetate ($C_8H_{12}O_8Zr$), zirconium chloride ($ZrCl_4$), zirconium sulfate ($Zr(SO_4)_2$), zirconium formate ($C_4H_4O_8Zr$), nickel sulfate ($NiSO_4$), nickel nitrate ($Ni(NO_3)_2$), nickel acetate (Ni $(CH_2COO)_2$), nickel formate ($Ni(CHO_2)_2$), nickel chloride ($NiCl_2$), titanyl nitrate (($TiO(NO_3)_2$)), aluminum (Al)-containing compound, magnesium (Mg)-containing compound, titanium (Ti)-containing compound, sodium (Na)-containing compound, potassium (K)-containing compound, scandium (Sc)-containing compound, niobium (Nb)-containing compound, neodymium (Nd)-containing compound, lanthanum (La)-containing compound, cerium (Ce)-containing compound, silicon (Si)-containing compound, rubidium (Rb)-containing compound, vanadium (V)-containing compound, cesium (Cs)-containing compound, chromium (Cr)-containing compound, copper (Cu)-containing compound, magnesium (Mg)-containing compound, manganese (Mn)-containing compound, zirconium (Zr)-containing compound, zinc (Zn)-containing compound, tin (Sn)-containing compound, gallium (Ga)-containing compound, barium (Ba)-containing compound, actinium (Ac)-containing compound, calcium (Ca)-containing compound, iron (Fe)-containing compound, boron (B)-containing compound, germanium (Ge)-containing compound, arsenic (As)-containing compound, hafnium (Hf)-containing compound, Molybdenum (Mo)-containing compound, tungsten (W)-containing compound, rhenium (Re)-containing compound, ruthenium (Ru)-containing compound, rhodium (Rh)-containing compound, platinum (Pt)-containing compound, silver (Ag)-containing compound, osmium (Os)-containing compound, iridium (Ir)-containing compound, gold (Au)-containing compound, and combinations thereof, among others.

Not wishing to be bound by theory, it is contemplated that, all of the required metal elements are first mixed in liquid phase (e.g., into a solution, slurry, or gel) using metal-containing salts as the sources of each metal element such that the different metals can be mixed uniformly at desired ratio. As an example, to prepare a liquid mixture of an aqueous solution, slurry or gel, one or more metal dopants with high water solubility can be used. For example, metal nitrate, metal sulfate, metal chloride, metal acetate, and metal format, etc., can be used. Organic solvents, such as alcohols, isopropanol, etc., can be used to dissolve and/or disperse metal-containing salt with low water solubility. In some cases, the pH value of the liquid mixture can be adjusted to increase the solubility of the one or more precursor compounds. Optionally, chemical additives, gelation agents, and surfactants, such as ammonia, EDTA, etc., can be added into the liquid mixture to help dissolve or disperse the compounds in a chosen solvent.

Secondly, at step 220 of the method 200, the method includes flowing a flow of a gas into a drying chamber. The flow of the gas may be pumped through an air filter to remove any particles, droplets, or contaminants, and the flow rate of the gas can be adjusted by a valve or other means. In one embodiment, the gas is heated to a drying temperature to mix with the mist and remove moisture from the mist.

The mist of the liquid mixture may be generated by a mist generator, such as a nozzle, a sprayer, an atomizer, or any other mist generators. Most mist generators employ air pressure or other means to covert a liquid mixture into liquid droplets. The mist generator can be coupled to a portion of the drying chamber to generate a mist (e.g., a large collection of small size droplets) of the liquid mixture directly within the drying chamber. As an example, an atomizer can be attached to a portion of the drying chamber to spray or inject the liquid mixture into a mist containing small sized droplets directly inside the drying chamber. In general, a mist generator that generates a mist of mono-sized droplets are desirable. Alternatively, a mist can be generated outside the drying chamber and delivered into the drying chamber.

Desired liquid droplet sizes can be adjusted by adjusting the sizes of liquid delivery/injection channels within the mist generator. Droplet size ranging from a few nanometers to a few hundreds of micrometers can be generated. Suitable droplet sizes can be adjusted according to the choice of the mist generator used, the precursor compounds, the temperature of the drying chamber, the flow rate of the gas, and the residence time inside the drying chamber. As an example, a mist with liquid droplet sizes between one tenth of a micron and one millimeter is generated inside the drying chamber.

Then, at step 230 of the method 200, a mist of the liquid mixture is mixed with the flow of a gas to form a gas-liquid mixture prior to and/or after the liquid mixture is inside the drying chamber. The mist is formed from a liquid mixture dissolved and/or dispersed in a suitable liquid solvent. The flow of one or more gases and the flow of the mist are mixed together to form a gas-liquid mixture. The gases may be, for example, air, oxygen, carbon dioxide, nitrogen gas, hydrogen gas, inert gas, noble gas, and combinations thereof, among others. The gases may be pumped through an air filter to remove any particles, droplets, or contaminants, and the flow rate of the gases can be adjusted by a valve or other means.

In one example, the mist of the liquid mixture is mixed with a flow of a carrying gas inside the mist generator prior to delivering into the drying chamber. In another example, the mist of the liquid mixture is mixed with a flow of a drying gas inside the drying chamber and carrying through the drying chamber to be dried. Accordingly, one embodiment of the invention provides that one or more gases flown within the drying chamber are used as the gas source for carrying out drying reaction, evaporation, dehydration, and/or other reactions inside the drying chamber such that gas-liquid mixtures are dried into gas-solid mixtures. In another embodiment, the gases is heated to a drying temperature to mix with the mist and remove moisture from the mist.

At step 240, drying the gas-liquid mixture at a drying temperature in the presence of the gas and forming a gas-solid mixture is performed. The mist of the liquid mixture is dried (e.g., removing its moisture, liquid, etc.) at a drying temperature for a desired residence time and form into a gas-solid mixture with the flow of the gases within the drying chamber. As the removal of the moisture from the mist of the liquid mixture is performed within the drying chamber filled with the gases, a gas-solid mixture comprising of the gases and the compounds is formed. Accordingly, one embodiment of the invention provides that the gases flown within the drying chamber are used as the gas source for forming a gas-solid mixture within the drying chamber. To illustrate, the liquid mixture is dried inside the drying chamber and the drying temperature inside the drying chamber is maintained via a heating element coupled to the drying chamber, where the heating element can be a suitable heating mechanism, such as wall-heated furnace, electricity powered heater, fuel-burning heater, etc.

In another embodiment, the gases flown within the drying chamber is heated and the thermal energy of the heated gas is served as the energy source for carrying out drying reaction, evaporation, dehydration, and/or other reactions inside the drying chamber. The gas can be heated to a drying temperature by passing through a suitable heating mechanism, such as electricity powered heater, fuel-burning heater, etc. The drying temperature is about 200° C. or higher, for example, from 200° C. to 300° C., such as 250° C. For instance, the liquid mixture is dried in the presence of the gas that is heated to 200° C. or higher inside the drying chamber and the gas is delivered into the drying chamber to maintain the drying temperature inside the drying chamber.

In one configuration, the gas is pre-heated to a drying temperature of about 200° C. or higher prior to flowing into the drying chamber. In another configuration, drying the mist can be carried out by heating the drying chamber directly, such as heating the chamber body of the drying chamber. For example, the drying chamber can be a wall-heated furnace to maintain the drying temperature within internal plenum of the drying chamber. The advantages of using heated gas are fast heat transfer, high temperature uniformity, and easy to scale up, among others. The drying chambers may be any chambers, furnaces with enclosed chamber body, such as a dome type ceramic drying chamber, a quartz chamber, a tube chamber, etc. Optionally, the chamber body is made of thermal insulation materials (e.g., ceramics, etc.) to prevent heat loss during drying.

The gases may be, for example, air, oxygen, carbon dioxide, nitrogen gas, hydrogen gas, inert gas, noble gas, and combinations thereof, among others. For example, heated air can be used as an inexpensive gas source and energy source for drying the mist. The choice of the gases may be a gas that mix well with the mist of the liquid mixture and dry the mist without reacting to the compounds. In some cases, the chemicals in the droplets/mist may react to the gases and/or to each other to certain extent during drying, depending on the drying temperature and the chemical composition of the compounds. In addition, the residence time of the mist of thoroughly mixed compounds within the drying chamber is adjustable and may be, for example, between one second and one hour, depending on the flow rate of the gases, and the length and volume of the path that the mist has to flow through within the drying chamber.

The gas-liquid mixture is being dried within the drying chamber using the heated gases flow continuously and/or at adjustable, variable flow rates. At the same time, dried solid particles of compounds are carried by the gases, as a thoroughly-mixed gas-solid mixture, through a path within the drying chamber, and as more gases is flown in, the gas-solid mixture is delivered out of the drying chamber and continuously delivered to a gas-solid separator connected to the drying chamber.

Not wishing to be bound by theory, in the method 200 of manufacturing a battery material using the lithium-containing salt, the cobalt-containing salt and the one or more metal-dopant-containing salts, it is contemplated that the lithium-containing salt, the cobalt-containing salt and the one or more metal-dopant-containing salts are prepared into a liquid mixture and then converted into droplets, each droplet will have the one or more liquid mixture uniformly distributed. Then, the moisture of the liquid mixture is removed by passing the droplets through the drying chamber and the flow of the gas is used to carry the mist within the drying chamber for a suitable residence time. It is further contemplated that the concentrations of the compounds in a liquid mixture and the droplet sizes of the mist of the liquid mixture can be adjusted to control the chemical composition, particle sizes, and size distribution of final solid product particles of the battery material. It is designed to obtain spherical solid particles from a thoroughly mixed liquid mixture of two or more precursors after drying the mist of the liquid mixture. In contrast, conventional solid-state manufacturing processes involve mixing or milling a solid mixture of precursor compounds, resulting in uneven mixing of precursors.

Next, at step 250, step 250 includes separating the gas-solid mixture into one or more solid particles of an oxide material and waste products by a gas-solid separator. The gas-solid mixture comprising of the gas and the compounds mixed together are separated into one or more solid particles of an oxide material and a waste product. The one or more solid particles of an oxide material may include thoroughly mixed solid particles of the compounds. Accordingly, the step 250 of the method 200 of preparing a battery material includes obtaining one or more solid particles of an oxide material from a gas-solid mixture comprised of a gas and one or more compounds.

In the method 200 of preparing final solid product particles of the battery material in multiple stages, it is contemplated to perform one or more reactions of the compounds in a drying stage, two or more reaction stages, one or more cooling stages, etc., in order to obtain final solid product particles of the crystallized lithium cobalt oxide materials at desired size, morphology and crystal structure, which are ready for further battery applications. Not wishing to be bound by theory, it is designed to perform the reaction of the compounds in two or more reaction stages to allow sufficient time and contact of the compounds to each other, encourage nucleation of proper crystal structure and proper folding of particle morphology, incur lower-thermodynamic energy partial reaction pathways, ensure thorough reactions of all compounds, and finalize complete reactions, among others.

The one or more solid particles of a lithium cobalt oxide material comprising the compounds are then processed in two or more processing stages using at least a reaction module designed for initiating reactions, and one or more reaction modules designed for completing reactions and obtaining final solid product particles of the crystallized lithium cobalt oxide materials. Additional reaction modules can also be used. In one embodiment, the reaction module includes one anneal reaction to react and oxidize the one or more solid particles of a lithium cobalt oxide material into an oxidized reaction product, where a portion of them are partially reacted (some complete reactions may occur). The another reaction module includes annealing the oxidized reaction product into final solid product particles of the crystallized lithium cobalt oxide materials to ensure complete reactions of all the reaction products.

Accordingly, the method 200 may include a processing stage of drying a mist of a liquid mixture and obtaining one or more solid particles of an oxide material using a processing module comprised of a drying chamber and a gas-solid separator. The method 200 may further include another processing stage of reacting, oxidizing and annealing the f one or more solid particles of an oxide material using a reaction module comprised of an annealing chamber.

At step 260, step 260 includes delivering the solid particles of the oxide material into an annealing chamber to react and anneal the solid particles of the oxide material in the presence of a flow of a gas at an annealing temperature to obtain crystallized lithium cobalt oxide materials doped with one or more metal dopants.

The one or more solid particles of an oxide material is delivered into an annealing chamber once the one or more solid particles of an oxide material are separated from the waste product. The one or more solid particles of the oxide material is reacted and oxidized in the presence of a gas within the annealing chamber to form an oxidized reaction product. Reactions of the one or more solid particles of the oxide material within the annealing chamber may include any of oxidation, reduction, decomposition, combination reaction, phase-transformation, re-crystallization, single displacement reaction, double displacement reaction, combustion, isomerization, and combinations thereof. For example, the one or more solid particles of the oxide material may be oxidized, such as oxidizing the precursor compounds into an oxide material.

Exemplary gases include, but not limited to air, oxygen, carbon dioxide, an oxidizing gas, nitrogen gas, inert gas, noble gas, and combinations thereof. For an oxidation reaction inside the annealing chamber, such as forming an oxide material from one or more precursors, an oxidizing gas can be used as the gas for annealing. Accordingly, one embodiment of the invention provides that the gas flows within the annealing chamber is used to oxidize the one or more solid particles of the oxide material. The gases, for example, can be air or oxygen and combination thereof. If desired, the gases can be oxygen with high purity; the purity of the oxygen is more than 50%, for example more than 80%, such as 95%. Accordingly, the gas flows within the annealing chamber is served as the energy source for carrying out reaction, oxidation, and/or other reactions inside the annealing chamber.

At this stage of the process, the step 260 further includes delivering the solid particles of the oxide material into an annealing chamber to react and annealing the solid particles of the lithium cobalt oxide material in the presence of a flow of a gas at an annealing temperature of 400° C. or higher for a residence time to obtain crystallized lithium cobalt oxide materials doped with one or more metal dopants. For example, the annealing temperature can be more than 900° C., such as 1050° C., such as 1000° C. The residence time is about 1 second to 10 hours.

In one embodiment, the gas flown within the annealing chamber is heated and the thermal energy of the heated gas is served as the energy source for carrying out annealing reaction, and/or other reactions inside the annealing chamber. The gas can be heated to a temperature of 550° C. or higher by passing through a suitable heating mechanism, such as electricity powered heater, fuel-burning heater, etc. For instance, the one or more solid particles of the oxide materials are annealed in the presence of the gas that is heated to 550° C. or higher inside the annealing chamber and the gas is delivered into the annealing chamber to maintain the annealing temperature inside the annealing chamber.

Another embodiment of the present invention is that the one or more solid particles of the oxide materials are annealed inside the annealing chamber and the annealing temperature inside the annealing chamber is maintained via a heating element coupled to the annealing chamber, where the heating element can be a suitable heating mechanism, such as wall-heated furnace, electricity powered heater, fuel-burning heater, etc.

In one configuration, the gas is pre-heated to a temperature of about 550° C. or higher prior to flowing into the annealing chamber. In another configuration, annealing the one or more solid particles of the oxide materials can be carried out by heating the annealing chamber directly, such as heating the chamber body of the annealing chamber. For example, the annealing chamber can be a wall-heated furnace to maintain the annealing temperature within internal plenum of the annealing chamber. The advantages of using heated gas are fast heat transfer, high temperature uniformity, and easy to scale up, among others. The annealing chambers may be any chambers, furnaces with enclosed chamber body, such as a dome type ceramic annealing chamber, a quartz chamber, a tube chamber, etc. Optionally, the chamber body of the annealing chamber is made of thermal insulation materials (e.g., ceramics, etc.) to prevent heat loss during annealing process.

The gas may be, for example, air, oxygen, carbon dioxide, nitrogen gas, hydrogen gas, inert gas, noble gas, and combinations thereof, among others. For example, heated air can be used as an inexpensive gas source and energy source for drying the mist. In addition, the residence time within the annealing chamber is adjustable and may be, for example, between one second and one hour, depending on the flow rate of the gas, and the length and volume of the path that the solid particles have to pass through within the annealing chamber.

The method 200 may include a processing stage of cooling the crystallized lithium cobalt oxide materials doped with one or more metal dopants and obtaining final solid product particles of the crystallized lithium cobalt oxide materials doped with one or more metal dopants at desired size, morphology and crystal structure at step 270. For example, the temperature of the final solid product particles of the crystallized lithium cobalt oxide materials doped with one or more metal dopants may be slowly cooled down to room temperature to avoid interfering or destroying a process of forming into its stable energy state with uniform morphology and desired crystal structure. In another example, the cooling stage may be performed very quickly to quench the reaction product such the crystal structure of the solid particles of the reaction product can be formed at its stable energy state. As another example, a cooling processing stage in a multi-stage continuous process may include a cooling module comprised of one or more cooling mechanisms. Exemplary cooling mechanisms may be, for example, a gas-solid separator, a heat exchanger, a gas-solid feeder, a fluidized bed cooling mechanism, and combinations thereof, among others.

FIG. 2 illustrates a flow chart of incorporating the method 100 of preparing a material for a battery electrochemical cell using a system 300 fully equipped with all of the required manufacturing tools. The system 300 generally includes a mist generator 306, a drying chamber 310, a gas-solid separator 320, and a reactor 340. First, a liquid mixture containing two or more precursors is prepared and delivered into the mist generator 306 of the system 300. The mist generator 306 is coupled to the drying chamber 310 and adapted to generate a mist from the liquid mixture. A flow of heated gases can be flowed into the drying chamber 310 to fill and pre-heat an internal volume of the drying chamber 310 prior to the formation of the mist or at the same time when the mist is generated inside the drying chamber 310. The mist is mixed with the heated gas and its moisture is removed such that a gas-solid mixture, which contains the heated gases, two or more precursors, and/or other gas-phase waste product or by-products, etc., is formed.

Next, the gas-solid mixture is continuously delivered into the gas-solid separator 320 which separates the gas-solid mixture into solid particles and waste products. The solid particles is then delivered into the reactor 340 to be mixed with a flow of heated gas and form a gas-solid mixture. The reaction inside the reactor is carried out for a reaction time until reaction products can be obtained. Optionally, the reaction product gas-solid mixture can be delivered into a gas-solid separator (e.g., a gas-solid separator 328) to separate and obtain final solid product particles and a gaseous side product. In addition, one or more flows of cooling fluids (e.g., gases or liquids) may be used to cool the temperature of the reaction products. The final solid product particles can be delivered out of the system 300 for further analysis on their properties (e.g., specific capacity, power performance, battery charging cycle performance, etc.), particle sizes, morphology, crystal structure, etc., to be used as a material in a battery cell. Finally, the final particles are packed into a component of a battery cell.

Figure 3:
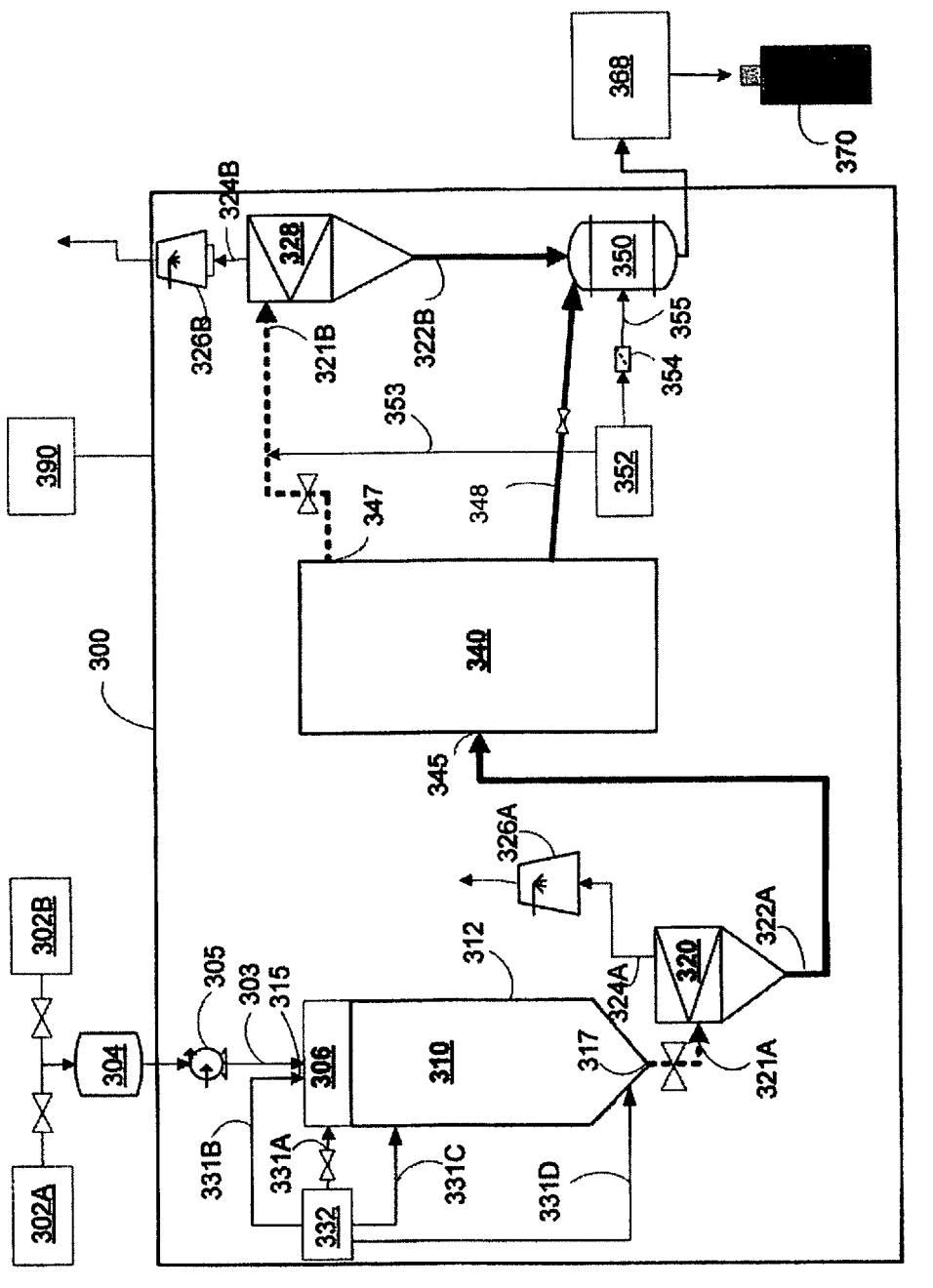
FIG. 3 is a schematic of another exemplary processing system useful in preparing a material for a battery electrochemical cell according one embodiment of the invention.

FIG. 3 is a schematic of the system 300, which is one example of an integrated tool/apparatus that can be used to carry out a fast, simple, continuous and low cost manufacturing process for preparing a material for a battery electrochemical cell. The system 300 is connected to a liquid mixer 304, which in turn is connected to two or more reactant sources 302A, 302B. The reactant sources 302A, 302B are provided to store various precursor compounds and liquid solvents. Desired amounts of precursor compounds (in solid or liquid form) and solvents are dosed and delivered from the reactant sources 302A, 302B to the liquid mixer 304 so that the precursor compounds can be dissolved and/or dispersed in the solvent and mix well into a liquid mixture. If necessary, the liquid mixer 304 is heated to a temperature, such as between 30° C. and 90° C. to help uniformly dissolve, disperse, and/or mix the precursors. The liquid mixer 304 is optionally connected to a pump 305, which pumps the liquid mixture from the liquid mixer 304 into the mist generator 306 of the system 300 to generate a mist.

The mist generator 306 converts the liquid mixture into a mist with desired droplet size and size distribution. In addition, the mist generator 306 is coupled to the drying chamber 310 in order to dry and remove moisture from the mist and obtain thoroughly-mixed solid precursor particles. In one embodiment, the mist generator 306 is positioned near the top of the drying chamber 310 that is positioned vertically (e.g., a dome-type drying chamber, etc.) to inject the mist into the drying chamber 310 and pass through the drying chamber vertically downward. Alternatively, the mist generator can be positioned near the bottom of the drying chamber 310 that is vertically positioned to inject the mist upward into the drying chamber to increase the residence time of the mist generated therein. In another embodiment, when the drying chamber 310 is positioned horizontally (e.g., a tube drying chamber, etc.) and the mist generator 306 is positioned near one end of the drying chamber 310 such that a flow of the mist, being delivered from the one end through another end of the drying chamber 310, can pass through a path within the drying chamber 310 for the length of its residence time.

The drying chamber 310 generally includes a chamber inlet 315, a chamber body 312, and a chamber outlet 317. In one configuration, the mist generator 306 is positioned inside the drying chamber 310 near the chamber inlet 315 and connected to a liquid line 303 adapted to flow the liquid mixture therein from the liquid mixer 304. For example, the liquid mixture within the liquid mixer 304 can be pumped by the pump 305 through the liquid line 303 connected to the chamber inlet 315 into the internal volume of the drying chamber 310. Pumping of the liquid mixture by the pump 305 can be configured, for example, continuously at a desired delivery rate (e.g., adjusted by a metered valve or other means) to achieve good process throughput of system 300. In another configuration, the mist generator 306 is positioned outside the drying chamber 310 and the mist generated therefrom is delivered to the drying chamber 310 via the chamber inlet 315.

One or more gas lines (e.g., gas lines 331A, 331B, 331C, 331D, etc.) can be coupled to various portions of the drying chamber 310 and adapted to flow a gas from a gas source 332 into the drying chamber 310. A flow of the gas stored in the gas source 332 can be delivered, concurrently with the formation of the mist inside drying chamber 310, into the drying chamber 310 to carry the mist through the drying chamber 310, remove moisture from the mist, and form a gas-solid mixture containing the precursors. Also, the flow of the gas can be delivered into the drying chamber 310 prior to the formation of the mist to fill and preheat an internal volume of the drying chamber 310 prior to generating the mist inside the drying chamber 310.

In one example, the gas line 331A is connected to the top portion of the drying chamber 310 to deliver the gas into the mist generator 306 positioned near the chamber inlet 315 to be mixed with the mist generated by the mist generator 306 inside the drying chamber 310. In one embodiment, the gas is preheated to a temperature of between 70° C. and 600° C. to mix with and remove moisture from the mist. As another example, the gas line 331B delivering the gas therein is connected to the chamber inlet 315 of the drying chamber 310, in close proximity with the liquid line 303 having the liquid mixture therein. Accordingly, the gas can thoroughly mix with the mist of the liquid mixture inside the drying chamber 310.

In another example, the gas line 331C is connected to the chamber body 312 of the drying chamber 310 to deliver the gas therein and mix the gas with the mist generated from the mist generator 306. In addition, the gas line 331D connected to the drying chamber 310 near the chamber outlet 317 may be used to ensure the gas-solid mixture formed within the drying chamber 310 is uniformly mixed with the gas.

The flow of the gas may be pumped through an air filter to remove any particles, droplets, or contaminants, and the flow rate of the gas can be adjusted by a valve or other means. In one embodiment, the gas is heated to a drying temperature to mix with the mist and remove moisture from the mist. It is designed to obtain spherical solid particles from a thoroughly-mixed liquid mixture of two or more precursors after drying the mist of the liquid mixture. In contrast, conventional solid-state manufacturing processes involve mixing or milling a solid mixture of precursor compounds, resulting in uneven mixing of precursors.

Once the mist of the liquid mixture is dried and formed into a gas-solid mixture with the gas, the gas-solid mixture is delivered out of the drying chamber 310 via the chamber outlet 317. The drying chamber 310 is coupled to the gas-solid separator 320 of the system 300. The gas-solid separator 320 collects chamber products (e.g., a gas-solid mixture having the gas and the one or more solid particles of a lithium cobalt oxide material mixed together) from the chamber outlet 317.

The gas-solid separator 320 includes a separator inlet 321A, two or more separator outlets 322A, 324A. The separator inlet 321A is connected to the chamber outlet 317 and adapted to collect the gas-solid mixture and other chamber products from the drying chamber 310. The gas-solid separator 320 separates the gas-solid mixture from the drying chamber 310 into one or more solid particles of a lithium cobalt oxide material and waste products. The separator outlet 322A is adapted to deliver the one or more solid particles of a lithium cobalt oxide material to the reactor 340 for further processing and reactions. The separator outlet 324A is adapted to deliver waste products out of the gas-solid separator 320.

The waste products may be delivered into a gas abatement device 326A to be treated and released out of the system 300. The waste product may include, for example, water ($H_2O$) vapor, organic solvent vapor, nitrogen-containing gas, oxygen-containing gas, $O_2$, $O_3$, nitrogen gas ($N_2$), NO, $NO_2$, $NO_2$, $N_2O$, $N_4O$, $NO_3$, $N_2O_3$, $N_2O_4$, $N_2O_5$, $N(NO_2)_3$, carbon-containing gas, carbon dioxide ($CO_2$), CO, hydrogen-containing gas, $H_2$, chlorine-containing gas, $Cl_2$, sulfur-containing gas, $SO_2$, small particles of the one or more solid particles of a lithium cobalt oxide material, and combinations thereof.

The one or more solid particles of a lithium cobalt oxide material may include at least particles of the two or more precursors that are dried and uniformly mixed together. It is contemplated to separate the one or more solid particles of a lithium cobalt oxide material away from any side products, gaseous products or waste products, prior to reacting the two or more precursors in the reactor 340. Accordingly, the system 300 is designed to mix the two or more precursors uniformly, dry the two or more precursors, separate the dried two or more precursors, and react the two or more precursors into final solid product particles of the crystallized lithium cobalt oxide materials in a continuous manner.

Suitable gas-solid separators include cyclones, electrostatic separators, electrostatic precipitators, gravity separators, inertia separators, membrane separators, fluidized beds, classifiers, electric sieves, impactors, particles collectors, leaching separators, elutriators, air classifiers, leaching classifiers, and combinations thereof, among others.

Once the one or more solid particles of a lithium cobalt oxide material are separated and obtained, it is delivered into the reactor 340 for further reaction. The reactor 340 includes a gas inlet 333, a reactor inlet 345, and a reactor outlet 347. The reactor inlet 345 is connected to the separator outlet 322A and adapted to receive the solid particles. Optionally, a vessel 325 is adapted to store the solid particles prior to adjusting the amounts of the solid particles delivered into the reactor 340.

The gas inlet 333 of the reactor 340 is coupled to a heating mechanism 380 to heat a gas from a gas source 334 to an annealing temperature of between 400° C. and 1200° C. The heating mechanism 380 can be, for example, an electric heater, a gas-fueled heater, a burner, among other heaters. Additional gas lines can be used to deliver heated air or gas into the reactor 340, if needed. The pre-heated gas can fill the reactor 340 and maintained the internal temperature of the reactor 340, much better and energy efficient than conventional heating of the chamber body of a reactor.

The gas flown inside the reactor 340 is designed to be mixed with the one or more solid particles of a lithium cobalt oxide material and form an oxidized reaction product inside the reactor 340. Thermal energy from the pre-heated gas is used as the energy source for reacting the one or more solid particles of a lithium cobalt oxide material within the reactor 340. The reaction process includes, but not limited to, reduction, decomposition, combination reaction, phase-transformation, re-crystallization, single displacement reaction, double displacement reaction, combustion, isomerization, and combinations thereof. The oxidized reaction product is then going through annealing process for a residence time of between 1 second and ten hours, or longer, depending on the annealing temperature and the type of the precursors initially delivered into the system 300. One embodiment of the invention provides the control of the temperature of the reactor 340 by the temperature of the heated gas. The use of the heated gas as the energy source inside the reactor 340 provides the benefits of fast heat transfer, precise temperature control, uniform temperature distribution therein, and/or easy to scale up, among others.

Once the reactions inside the reactor 340 are complete, for example, upon the formation of desired crystal structure, particle morphology, and particle size, oxidized reaction products are delivered out of the reactor 340 via the reactor outlet 347 and/or a reactor outlet 348. The cooled reaction products include final solid product particles of the crystallized lithium cobalt oxide materials containing, for example, oxidized reaction product particles of the precursor compounds which are suitable as a material of a battery cell.

Optionally, the system 300 includes a gas-solid separator, such as a gas-solid separator 328, which collects the reaction products from the reactor outlet 347 of the reactor 340. The gas-solid separator 328 may be a particle collector, such as cyclone, electrostatic separator, electrostatic precipitator, gravity separator, inertia separator, membrane separator, fluidized beds classifiers electric sieves impactor, leaching separator, elutriator, air classifier, leaching classifier, and combinations thereof.

The gas-solid separator 328 of the system 300 generally includes a separator inlet 321B, a separator outlet 322B and a separator outlet 324B and is used to separate the reaction products into the solid particles and gaseous side products. The gaseous side products may be delivered into a gas abatement device 326B to be treated and released out of the system 300. The gaseous side products separated by the gas-solid separator 328 may generally contain water ($H_2O$) vapor, organic solvent vapor, nitrogen-containing gas, oxygen-containing gas, $O_2$, $O_3$, nitrogen gas ($N_2$), NO, $NO_2$, $NO_2$, $N_2O$, $N_4O$, $NO_3$, $N_2O_3$, $N_2O_4$, $N_2O_5$, $N(NO_2)_3$, carbon-containing gas, carbon dioxide ($CO_2$), CO, hydrogen-containing gas, $H_2$, chlorine-containing gas, $Cl_2$, sulfur-containing gas, $SO_2$, small particles of the solid particles, and combinations thereof. In addition, the system 300 may further include one or more cooling fluid lines 353, 355 connected to the reactor outlet 347 or the separator outlet 322A of the gas solid separator 328 and adapted to cool the reaction products and/or the solid particles. The cooling fluid line 353 is adapted to deliver a cooling fluid (e.g., a gas or liquid) from a source 352 to the separator inlet 321B of the gas-solid separator 328. The cooling fluid line 355 is adapted to deliver a cooling fluid, which may filtered by a filter 354 to remove particles, into a heat exchanger 350.

The heat exchanger 350 is adapted to collect and cool the solid particles and/or reaction products from the gas-solid separator 328 and/or the reactor 340 by flowing a cooling fluid through them. The cooling fluid has a temperature lower than the temperature of the reaction products and the solid particles delivered from the gas-solid separator 328 and/or the reactor 340. The cooling fluid may have a temperature of between 4° C. and 30° C. The cooling fluid may be liquid water, liquid nitrogen, an air, an inert gas or any other gas which would not react to the reaction products.

Final solid products particles are collected and cooled by one or more separators, cooling fluid lines, and/or heat exchangers, and once cooled, the solid particles are delivered out of the system 300 and collected in a final product collector 368. The solid particles may include oxidized form of precursors, such as an oxide material, suitable to be packed into a battery cell 370. Additional pumps may also be installed to achieve the desired pressure gradient.

A process control system 390 can be coupled to the system 300 at various locations to automatically control the manufacturing process performed by the system 300 and adjust various process parameters (e.g., flow rate, mixture ratio, temperature, residence time, etc.) within the system 300. For example, the flow rate of the liquid mixture into the system 300 can be adjusted near the reactant sources 302A, 302B, the liquid mixer 304, or the pump 305. As another example, the droplet size and generation rate of the mist generated by the mist generator 306 can be adjusted. In addition, flow rate and temperature of various gases flown within the gas lines 331A, 331B, 331C, 331D, 333, 353, 355, 515, etc., can be controlled by the process control system 390. In addition, the process control system 390 is adapted to control the temperature and the residence time of various gas-solid mixture and solid particles at desired level at various locations.

Accordingly, a continuous process for producing a material of a battery cell using a system having a mist generator, a drying chamber, one or more gas-solid separators and a reactor is provided. A mist generated from a liquid mixture of one or more metal precursor compounds in desired ratio is mixed with air and dried inside the drying chamber, thereby forming gas-solid mixtures. One or more gas-solid separators are used in the system to separate the gas-solid mixtures from the drying chamber into solid particles packed with the one or more metal precursors and continuously deliver the solid particles into the reactor for further reaction to obtain final solid material particles with desired ratio of two or more intercalated metals.

In one embodiment, preparation and manufacturing of a metal oxide material is provided. Depending on the details and ratios of the metal precursor compounds that are delivered into the system 300, the resulting final solid material particles obtained from the system 300 may be a metal oxide material, a doped metal oxide material, an inorganic metal salts, among others. In addition, the metal oxide materials can exhibit a crystal structure of metals in the shape of layered, spinel, olivine, etc. In addition, the morphology of the final solid product particles (such as the oxidized reaction product prepared using the method 100 and the system 300 as described herein) exists as desired solid powders. The particle sizes of the solid powders range between 10 nm and 100 ρm.

In operation, a mist is mixed with a gas flow of a gas inside a mist generator to form a gas-liquid mixture, where the liquid mixture includes a lithium-containing salt compound, a cobalt-containing salt compound, and one or more metal-dopant-containing salts compounds. In addition, the liquid mixture is mixed with a gas flow of another gas inside a drying chamber. It is contemplated that these gas flows are provided to thoroughly mix the liquid mixture to uniformly form into the gas-liquid mixture and assist in carrying the gas-liquid mixture inside the drying chamber. The liquid mixture can be adjusted digitally or manually prepared in a desirable molar ratio of the lithium-containing salt compound, the cobalt-containing salt compound, and the one or more metal-dopant-containing salts compounds at a ratio of around x:y:a:b: . . . :n inside reactant sources and delivered into one or more liquid mixers.

In one embodiment, the adjusting of the molar ratio of the lithium-containing salt compound, the cobalt-containing salt compound, and the one or more metal-dopant-containing salt compounds is performed prior to the forming the mist of the liquid mixture inside a liquid mixer. Desired molar ratio of the lithium-containing salt, the cobalt-containing salt, and the one or more metal-dopant-containing salts are digitally or manually measured and delivered from reactant sources to the liquid mixer so that the lithium-containing salt compound, the cobalt-containing salt compound, and the one or more metal-dopant-containing salts compounds can be dissolved and/or dispersed in the solvent and mix well into the liquid mixture inside the liquid mixer. The lithium-containing salt compound, the cobalt-containing salt compound, and the one or more metal-containing salts compounds are all soluble in a suitable solvent within the liquid mixture.

In another embodiment, the adjusting of the molar ratio of the lithium-containing salt compound, the cobalt-containing salt compound, and the one or more metal-dopant-containing salt compounds is performed simultaneously with the forming the mist of the liquid mixture. The desirable molar ratio of the lithium-containing salt compound, the cobalt-containing salt compound, and the one or more metal-dopant-containing salt compounds can be adjusted digitally or manually from each reactant source and delivered into the mist generator to generate the mist of the liquid mixture inside the mist generator.

The liquid mixture comprising the lithium-containing salt compound, the cobalt-containing salt compound, and the one or more metal-containing salts compounds is mixed with a gas flow to form a gas-liquid mixture inside a drying chamber. Then, the gas-liquid mixture is dried at a drying temperature inside the drying chamber to form a gas-solid mixture of solid particles of an oxide material. The gas-solid mixture is continuously delivered into the gas-solid separator which separates the gas-solid mixture into one or more solid particles of the oxide material and waste products.

The one or more solid particles of the oxide material are then delivered into an annealing chamber to be mixed with a flow of a gas. The one or more solid particles of the oxide material are reacted and annealed at an annealing temperature inside the annealing chamber to obtain high quality lithium cobalt oxide materials doped with one or more metal dopants at desired size, morphology and crystal structure.

EXAMPLE

SUITABLE EXAMPLES: Exemplary material compositions and formulations of the present inventions are shown in Table 1. In group of A (Example#: A2-A8), lithium cobalt oxides materials doped with one or more metal dopants having a chemical formula of $Li_x Co_y O_z$ ● doped $Me1_a$ $Me2_b$ $Me3_c$ . . . $MeN_n$, is designed and prepared such that a ratio of x:y:a:b:c: . . . n is equivalent to $M_{LiSalt}:M_{CoSalt}:$ $M_{Me1Salt}:M_{Me2Salt}:M_{Me3Salt}: . . . M_{MeNSalt}$, wherein x is from 0.95-0.99 ($0.95 \le x \le 0.99$), y is 1.0, the a is from 0-0.05 ($0 \le a \le 0.05$), the b is from 0-0.05 ($0 \le b \le 0.05$), the c is from 0-0.05 ($0 \le c \le 0.05$), $N \ge 1$, and wherein Me1, Me2, Me3 are different metal dopants incorporated into lithium cobalt oxide materials.

For example, each of the one or more metal dopants (i.e. Me1, Me2, Me3, . . . MeN) can be selected from a group consisting of Al, Mg, Mn, Zr, Zn, Nb, La, Ce, Sn, Ga, Ba, Ac, Ca, Sc, Ti, V, Cr, Fe, Cu, B, Ge, As, Hf, Mo, W, Re, Ru, Rh, Pt, Ag, Os, Ir, Au, and combinations thereof.

For example, in group A, exemplary lithium-containing salt compounds include, but not limited to lithium sulfate (Li2SO4), lithium nitrate (LiNO3), lithium carbonate (Li2CO3), lithium acetate (LiCH2COO), lithium hydroxide (LiOH), lithium formate (LiCHO2), lithium chloride (LiCl), and combinations thereof. Exemplary cobalt-containing salt compounds include, but not limited to cobalt containing salts include, but not limited to, cobalt sulfate ($CoSO_4$), cobalt nitrate ($Co(NO_3)_2$), cobalt acetate ($Co(CH_2COO)_2$), cobalt formate ($Co(CHO_2)_2$), cobalt chloride ($CoCl_2$), and combinations thereof.

Exemplary metal-dopant-containing salts include, but not limited to, of magnesium nitrate $Mg(NO_3)_2$, magnesium acetate (MgAc, $Mg(CH_3COO)_2$), magnesium chloride ($MgCl_2$), magnesium sulfate ($MgSO_4$), magnesium formate ($C_2H_2MgO_4$), aluminum nitrate ($Al(NO_3)_3$), aluminum acetate (AlAc, $C_6H_9AlO_6$), aluminum chloride ($AlCl_3$), aluminum sulfate ($Al_2(SO_4)_3$), aluminum formate ($Al(HCOO)_3$), manganese sulfate ($MnSO_4$), manganese nitrate ($Mn(NO_3)_2$), manganese acetate ($Mn(CH_2COO)_2$), manganese formate ($Mn(CHO_2)_2$), manganese chloride ($MnCl_2$), zirconium nitrate ($Zr(NO_3)_4$), zirconium acetate ($C_8H_{12}O_8Zr$), zirconium chloride ($ZrCl_4$), zirconium sulfate ($Zr(SO_4)_2$), zirconium formate ($C_4H_4O_2Zr$), nickel sulfate ($NiSO_4$), nickel nitrate ($Ni(NO_3)_2$), nickel acetate ($Ni(CH_2COO)_2$), nickel formate ($Ni(CHO_2)_2$), nickel chloride ($NiCl_2$), titanyl nitrate ($TiO(NO_3)_2$). The annealing temperature and annealing time in group A experiments can be controlled from 900 to 949° C. for 15 to 20 hours.

TABLE 1

Exemplary LCO materials doped with one or more metal dopants compositions

| Example # | $M_{LiSalt}$ | $M_{CoSalt}$ | $M_{Me1Salt}$ | $M_{Me2Salt}$ | $M_{Me3Salt}$ | Anneal Temp (° C.) | Anneal Time (hour) |
|---|---|---|---|---|---|---|---|
| A2 | 0.95-0.99 | 1.0 | 0-0.05 | 0 | 0 | 900-949 | 15-20 |
| A3 | 0.95-0.99 | 1.0 | 0 | 0-0.05 | 0 | 900-949 | 15-20 |
| A4 | 0.95-0.99 | 1.0 | 0 | 0 | 0-0.05 | 900-949 | 15-20 |
| A5 | 0.95-0.99 | 1.0 | 0-0.05 | 0-0.05 | 0 | 900-949 | 15-20 |
| A6 | 0.95-0.99 | 1.0 | 0-0.05 | 0 | 0-0.05 | 900-949 | 15-20 |
| A7 | 0.95-0.99 | 1.0 | 0 | 0-0.05 | 0-0.05 | 900-949 | 15-20 |
| A8 | 0.95-0.99 | 1.0 | 0-0.05 | 0-0.05 | 0-0.05 | 900-949 | 15-20 |

Additional material compositions and formulations are shown in Table 2. In group of B (Example#: B2-B8), lithium cobalt oxides materials doped with one or more metal dopants having a chemical formula of $Li_x Co_y O_z$ ● doped $Me1_a Me2_b Me3_c$ . . . $MeN_n$, is designed and prepared such that a ratio of x:y:a:b:c n is equivalent to $M_{LiSalt}$:$M_{CoSalt}$:$M_{Me1Salt}$:$M_{Me2Salt}$:$M_{Me3Salt}$: . . . $M_{MeNSalt}$, wherein x is from 0.95-0.99 ($0.95 \leq x \leq 0.99$), y is 1.0, the a is from 0-0.05 ($0 \leq a \leq 0.05$), the b is from 0-0.05 ($0 \leq b \leq 0.05$), the c is from 0-0.05 ($0 \leq c \leq 0.05$), N≥1, and wherein Me1, Me2, Me3 are different metal dopants incorporated into lithium cobalt oxide materials.

For example, each of the one or more metal dopants (i.e. Me1, Me2, Me3, . . . MeN) can be selected from a group consisting of Al, Mg, Mn, Zr, Zn, Nb, La, Ce, Sn, Ga, Ba, Ac, Ca, Sc, Ti, V, Cr, Fe, Cu, B, Ge, As, Hf, Mo, W, Re, Ru, Rh, Pt, Ag, Os, Ir, Au, and combinations thereof.

For example, in group B, exemplary lithium-containing salt compounds include, but not limited to lithium sulfate (Li2SO4), lithium nitrate (LiNO3), lithium carbonate (Li2CO3), lithium acetate (LiCH2COO), lithium hydroxide (LiOH), lithium formate (LiCHO2), lithium chloride (LiCl), and combinations thereof. Exemplary cobalt-containing salt compounds include, but not limited to cobalt containing salts include, but not limited to, cobalt sulfate ($CoSO_4$), cobalt nitrate ($Co(NO_3)_2$), cobalt acetate ($Co(CH_2COO)_2$), cobalt formate ($Co(CHO_2)_2$), cobalt chloride ($CoCl_2$), and combinations thereof.

Exemplary metal-dopant-containing salts include, but not limited to, of magnesium nitrate $Mg(NO_3)_2$, magnesium acetate (MgAc, $Mg(CH_3COO)_2$), magnesium chloride ($MgCl_2$), magnesium sulfate ($MgSO_4$), magnesium formate ($C_2H_2MgO_4$), aluminum nitrate ($Al(NO_3)_3$), aluminum acetate (AlAc, $C_6H_9AlO_6$), aluminum chloride ($AlCl_3$), aluminum sulfate ($Al_2(SO_4)_3$), aluminum formate ($Al(HCOO)_3$), manganese sulfate ($MnSO_4$), manganese nitrate ($Mn(NO_3)_2$), manganese acetate ($Mn(CH_2COO)_2$), manganese formate ($Mn(CHO_2)_2$), manganese chloride ($MnCl_2$), zirconium nitrate ($Zr(NO_3)_4$), zirconium acetate ($C_8H_{12}O_8Zr$), zirconium chloride ($ZrCl_4$), zirconium sulfate ($Zr(SO_4)_2$), zirconium formate ($C_4H_4O_2Zr$), nickel sulfate ($NiSO_4$), nickel nitrate ($Ni(NO_3)_2$), nickel acetate ($Ni(CH_2COO)_2$), nickel formate ($Ni(CHO_2)_2$), nickel chloride ($NiCl_2$), titanyl nitrate ($TiO(NO_3)_2$). The annealing temperature and annealing time in group B experiments can be controlled from 950 to 999° C. for 15 to 20 hours.

TABLE 2

Exemplary LCO materials doped with one or more metal dopants compositions

| Example # | $M_{LiSalt}$ | $M_{CoSalt}$ | $M_{Me1Salt}$ | $M_{Me2Salt}$ | $M_{Me3Salt}$ | Anneal Temp (° C.) | Anneal Time (hour) |
|---|---|---|---|---|---|---|---|
| B2 | 0.95-0.99 | 1.0 | 0-0.05 | 0 | 0 | 950-999 | 15-20 |
| B3 | 0.95-0.99 | 1.0 | 0 | 0-0.05 | 0 | 950-999 | 15-20 |
| B4 | 0.95-0.99 | 1.0 | 0 | 0 | 0-0.05 | 950-999 | 15-20 |
| B5 | 0.95-0.99 | 1.0 | 0-0.05 | 0-0.05 | 0 | 950-999 | 15-20 |
| B6 | 0.95-0.99 | 1.0 | 0-0.05 | 0 | 0-0.05 | 950-999 | 15-20 |
| B7 | 0.95-0.99 | 1.0 | 0 | 0-0.05 | 0-0.05 | 950-999 | 15-20 |
| B8 | 0.95-0.99 | 1.0 | 0-0.05 | 0-0.05 | 0-0.05 | 950-999 | 15-20 |

Additional material compositions and formulations are shown in Table 3. In group of C (Example#: C2-C8), lithium cobalt oxides materials doped with one or more metal dopants having a chemical formula of $Li_x Co_y O_x$ ● doped $Me1_a Me2_b Me3_c \ldots MeN_n$, is designed and prepared such that a ratio of x:y:a:b:c: . . . n is equivalent to $M_{LiSalt}:M_{CoSalt}:M_{Me1Salt}:M_{Me2Salt}:M_{Me3Salt}: \ldots M_{MeNSalt}$, wherein x is 1.0, y is 1.0, the a is from 0-0.05 ($0 \leq a \leq 0.05$), the b is from 0-0.05 ($0 \leq b \leq 0.05$), the c is from 0-0.05 ($0 \leq c \leq 0.05$), $N \geq 1$, and wherein Me1, Me2, Me3 are different metal dopants.

For example, each of the one or more metal dopants (i.e. Me1, Me2, Me3, . . . MeN) can be selected from a group consisting of Al, Mg, Mn, Zr, Zn, Nb, La, Ce, Sn, Ga, Ba, Ac, Ca, Sc, Ti, V, Cr, Fe, Cu, B, Ge, As, Hf, Mo, W, Re, Ru, Rh, Pt, Ag, Os, Ir, Au, and combinations thereof.

For example, in group C, exemplary lithium-containing salt compounds include, but not limited to lithium sulfate (Li2SO4), lithium nitrate (LiNO3), lithium carbonate (Li2CO3), lithium acetate (LiCH2COO), lithium hydroxide (LiOH), lithium formate (LiCHO2), lithium chloride (LiCl), and combinations thereof. Exemplary cobalt-containing salt compounds include, but not limited to cobalt containing salts include, but not limited to, cobalt sulfate ($CoSO_4$), cobalt nitrate ($Co(NO_3)_2$), cobalt acetate ($Co(CH_2COO)_2$), cobalt formate ($Co(CHO_2)_2$), cobalt chloride ($CoCl_2$), and combinations thereof.

Exemplary metal-dopant-containing salts include, but not limited to, of magnesium nitrate $Mg(NO_3)_2$, magnesium acetate (MgAc, $Mg(CH_3COO)_2$), magnesium chloride ($MgCl_2$), magnesium sulfate ($MgSO_4$), magnesium formate ($C_2H_2MgO_4$), aluminum nitrate ($Al(NO_3)_3$), aluminum acetate (AlAc, $C_6H_3AlO_6$), aluminum chloride ($AlCl_3$), aluminum sulfate ($Al_2(SO_4)_3$), aluminum formate ($Al(HCOO)_3$), manganese sulfate ($MnSO_4$), manganese nitrate ($Mn(NO_3)_2$), manganese acetate ($Mn(CH_2COO)_2$), manganese formate ($Mn(CHO_2)_2$), manganese chloride ($MnCl_2$), zirconium nitrate ($Zr(NO_3)_4$), zirconium acetate ($C_8H_{12}O_8Zr$), zirconium chloride ($ZrCl_4$), zirconium sulfate ($Zr(SO_4)_2$), zirconium formate ($C_4H_4O_8Zr$), nickel sulfate ($NiSO_4$), nickel nitrate ($Ni(NO_3)_2$), nickel acetate ($Ni(CH_2COO)_2$), nickel formate ($Ni(CHO_2)_2$), nickel chloride ($NiCl_2$), titanyl nitrate ($TiO(NO_3)_2$). The annealing temperature and annealing time in group C experiments can be controlled from 900 to 999° C. for 15 to 20 hours.

TABLE 3

Exemplary LCO materials doped with one or more metal dopants compositions

| Example # | $M_{LiSalt}$ | $M_{CoSalt}$ | $M_{Me1Salt}$ | $M_{Me2Salt}$ | $M_{Me3Salt}$ | Anneal Temp (° C.) | Anneal Time (hour) |
|---|---|---|---|---|---|---|---|
| C2 | 1.0-1.05 | 1.0 | 0-0.05 | 0 | 0 | 900-999 | 15-20 |
| C3 | 1.0-1.05 | 1.0 | 0 | 0-0.05 | 0 | 900-999 | 15-20 |
| C4 | 1.0-1.05 | 1.0 | 0 | 0 | 0-0.05 | 900-999 | 15-20 |
| C5 | 1.0-1.05 | 1.0 | 0-0.05 | 0-0.05 | 0 | 900-999 | 15-20 |
| C6 | 1.0-1.05 | 1.0 | 0-0.05 | 0 | 0-0.05 | 900-999 | 15-20 |
| C7 | 1.0-1.05 | 1.0 | 0 | 0-0.05 | 0-0.05 | 900-999 | 15-20 |
| C8 | 1.0-1.05 | 1.0 | 0-0.05 | 0-0.05 | 0-0.05 | 900-999 | 15-20 |

Additional material compositions and formulations are shown in Table 4. In group of D (Example#: D2-D8), lithium cobalt oxides materials doped with one or more metal dopants having a chemical formula of $Li_x\,Co_y\,O_z\,\bullet$ doped $Me1_a\,Me2_b\,Me3_c\,\ldots\,MeN_n$, is designed and prepared such that a ratio of x:y:a:b:c: . . . n is equivalent to $M_{LiSalt}$:$M_{CoSalt}$:$M_{Me1Salt}$:$M_{Me2Salt}$:$M_{Me3Salt}$:$M_{MeNSalt}$, wherein x is 1.0, y is 1.0, the a is from 0-0.05 ($0 \le a \le 0.05$), the b is from 0-0.05 ($0 \le b \le 0.05$), the c is from 0-0.05 ($0 \le c \le 0.05$), $N \ge 1$, and wherein Me1, Me2, Me3 are different metals.

For example, each of the one or more metal dopants (i.e. Me1, Me2, Me3, . . . MeN) can be selected from a group consisting of Al, Mg, Mn, Zr, Zn, Nb, La, Ce, Sn, Ga, Ba, Ac, Ca, Sc, Ti, V, Cr, Fe, Cu, B, Ge, As, Hf, Mo, W, Re, Ru, Rh, Pt, Ag, Os, Ir, Au, and combinations thereof.

For example, in group D, exemplary lithium-containing salt compounds include, but not limited to lithium sulfate (Li2SO4), lithium nitrate (LiNO3), lithium carbonate (Li2CO3), lithium acetate (LiCH2COO), lithium hydroxide (LiOH), lithium formate (LiCHO2), lithium chloride (LiCl), and combinations thereof. Exemplary cobalt-containing salt compounds include, but not limited to cobalt containing salts include, but not limited to, cobalt sulfate ($CoSO_4$), cobalt nitrate ($Co(NO_3)_2$), cobalt acetate ($Co(CH_2COO)_2$), cobalt formate ($Co(CHO_2)_2$), cobalt chloride ($CoCl_2$), and combinations thereof.

Exemplary metal-dopant-containing salts include, but not limited to, of magnesium nitrate $Mg(NO_3)_2$, magnesium acetate (MgAc, $Mg(CH_3COO)_2$), magnesium chloride ($MgCl_2$), magnesium sulfate ($MgSO_4$), magnesium formate ($C_2H_2MgO_4$), aluminum nitrate ($Al(NO_3)_3$), aluminum acetate (AlAc, $C_6H_9AlO_6$), aluminum chloride ($AlCl_3$), aluminum sulfate ($Al_2(SO_4)_3$), aluminum formate (Al $(HCOO)_3$), manganese sulfate ($MnSO_4$), manganese nitrate ($Mn(NO_3)_2$), manganese acetate ($Mn(CH_2COO)_2$), manganese formate ($Mn(CHO_2)_2$), manganese chloride ($MnCl_2$), zirconium nitrate ($Zr(NO_3)_4$), zirconium acetate ($C_8H_{12}O_8Zr$), zirconium chloride ($ZrCl_4$), zirconium sulfate ($Zr(SO_4)_2$), zirconium formate ($C_4H_4O_8Zr$), nickel sulfate ($NiSO_4$), nickel nitrate ($Ni(NO_3)_2$), nickel acetate ($Ni(CH_2COO)_2$), nickel formate ($Ni(CHO_2)_2$), nickel chloride ($NiCl_2$), titanyl nitrate ($TiO(NO_3)_2$). The annealing temperature and annealing time in group A experiments can be controlled from 1000 to 1049° C. for 15 to 20 hours.

TABLE 4

Exemplary LCO materials doped with one or more metal dopants compositions

| Example # | $M_{LiSalt}$ | $M_{CoSalt}$ | $M_{Me1Salt}$ | $M_{Me2Salt}$ | $M_{Me3Salt}$ | Anneal Temp (° C.) | Anneal Time (hour) |
|---|---|---|---|---|---|---|---|
| D2 | 1.0-1.05 | 1.0 | 0-0.05 | 0 | 0 | 1000-1049 | 15-20 |
| D3 | 1.0-1.05 | 1.0 | 0 | 0-0.05 | 0 | 1000-1049 | 15-20 |
| D4 | 1.0-1.05 | 1.0 | 0 | 0 | 0-0.05 | 1000-1049 | 15-20 |
| D5 | 1.0-1.05 | 1.0 | 0-0.05 | 0-0.05 | 0 | 1000-1049 | 15-20 |
| D6 | 1.0-1.05 | 1.0 | 0-0.05 | 0 | 0-0.05 | 1000-1049 | 15-20 |
| D7 | 1.0-1.05 | 1.0 | 0 | 0-0.05 | 0-0.05 | 1000-1049 | 15-20 |
| D8 | 1.0-1.05 | 1.0 | 0-0.05 | 0-0.05 | 0-0.05 | 1000-1049 | 15-20 |

Additional material compositions and formulations are shown in Table 2. In group of E (Example#: E2-E8), lithium cobalt oxides materials doped with one or more metal dopants having a chemical formula of $Li_x Co_y O_z$ ● doped $Me1_a Me2_b Me3_c \ldots MeN_n$, is designed and prepared such that a ratio of x:y:a:b:c: . . . n is equivalent to $M_{LiSalt}$:$M_{CoSalt}$:$M_{Me1Salt}$:$M_{Me2Salt}$:$M_{Me3Salt}$: . . . $M_{MeNSalt}$, wherein x is 1.0, y is 1.0, the a is from 0-0.05 (0≤a≤0.05), the b is from 0-0.05 (0≤b≤0.05), the c is from 0-0.05 (0≤c≤0.05), N≥1, and wherein Me1, Me2, Me3 are different metal dopants.

For example, each of the one or more metal dopants (i.e. Me1, Me2, Me3, . . . MeN) can be selected from a group consisting of Al, Mg, Mn, Zr, Zn, Nb, La, Ce, Sn, Ga, Ba, Ac, Ca, Sc, Ti, V, Cr, Fe, Cu, B, Ge, As, Hf, Mo, W, Re, Ru, Rh, Pt, Ag, Os, Ir, Au, and combinations thereof.

For example, in group E, exemplary lithium-containing salt compounds include, but not limited to lithium sulfate (Li2SO4), lithium nitrate (LiNO3), lithium carbonate (Li2CO3), lithium acetate (LiCH2COO), lithium hydroxide (LiOH), lithium formate (LiCHO2), lithium chloride (LiCl), and combinations thereof. Exemplary cobalt-containing salt compounds include, but not limited to cobalt containing salts include, but not limited to, cobalt sulfate ($CoSO_4$), cobalt nitrate ($Co(NO_3)_2$), cobalt acetate ($Co(CH_2COO)_2$), cobalt formate ($Co(CHO_2)_2$), cobalt chloride ($CoCl_2$), and combinations thereof.

Exemplary metal-dopant-containing salts include, but not limited to, of magnesium nitrate $Mg(NO_3)_2$, magnesium acetate (MgAc, $Mg(CH_3COO)_2$), magnesium chloride ($MgCl_2$), magnesium sulfate ($MgSO_4$), magnesium formate ($C_2H_2MgO_4$), aluminum nitrate ($Al(NO_3)_3$), aluminum acetate (AlAc, $C_6H_9AlO_6$), aluminum chloride ($AlCl_3$), aluminum sulfate ($Al_2(SO_4)_3$), aluminum formate (Al $(HCOO)_3$), manganese sulfate ($MnSO_4$), manganese nitrate ($Mn(NO_3)_2$), manganese acetate ($Mn(CH_2COO)_2$), manganese formate ($Mn(CHO_2)_2$), manganese chloride ($MnCl_2$), zirconium nitrate ($Zr(NO_3)_4$), zirconium acetate ($C_8H_{12}O_8Zr$), zirconium chloride ($ZrCl_4$), zirconium sulfate ($Zr(SO_4)_2$), zirconium formate ($C_4H_4O_8Zr$), nickel sulfate ($NiSO_4$), nickel nitrate ($Ni(NO_3)_2$), nickel acetate (Ni $(CH_2COO)_2$), nickel formate ($Ni(CHO_2)_2$), nickel chloride ($NiCl_2$), titanyl nitrate ($TiO(NO_3)_2$). The annealing temperature and annealing time in group E experiments can be controlled from 1050 to 1200° C. for 15 to 20 hours.

TABLE 5

| Exemplary LCO materials doped with one or more metal dopants compositions | | | | | | |
|---|---|---|---|---|---|---|
| Example # | $M_{LiSalt}$ | $M_{CoSalt}$ | $M_{Me1Salt}$ | $M_{Me2Salt}$ | $M_{Me3Salt}$ | Anneal Temp (° C.) | Anneal Time (hour) |
| E2 | 1.0-1.05 | 1.0 | 0-0.05 | 0 | 0 | 1050-1200 | 15-20 |
| E3 | 1.0-1.05 | 1.0 | 0 | 0-0.05 | 0 | 1050-1200 | 15-20 |
| E4 | 1.0-1.05 | 1.0 | 0 | 0 | 0-0.05 | 1050-1200 | 15-20 |
| E5 | 1.0-1.05 | 1.0 | 0-0.05 | 0-0.05 | 0 | 1050-1200 | 15-20 |
| E6 | 1.0-1.05 | 1.0 | 0-0.05 | 0 | 0-0.05 | 1050-1200 | 15-20 |
| E7 | 1.0-1.05 | 1.0 | 0 | 0-0.05 | 0-0.05 | 1050-1200 | 15-20 |
| E8 | 1.0-1.05 | 1.0 | 0-0.05 | 0-0.05 | 0-0.05 | 1050-1200 | 15-20 |

PREPARATION: Lithium cobalt oxide materials doped with one or more metal dopants were prepared in the following steps: (a) mixing 1 M solutions of forming a liquid mixture having a lithium-containing salt at a molarity of $M_{LiSalt}$, a cobalt-containing salt at a molarity of $M_{CoSalt}$, a first metal salt at a molarity of $M_{Me1Salt}$, a second metal salt at a molarity of $M_{Me2Salt}$, and a third metal salt at a molarity of $M_{Me3Salt}$ wherein the liquid mixture achieves a molar ratio of $M_{LiSalt}{:}M_{CoSalt}{:}M_{Me1Salt}{:}M_{Me2Salt}{:}M_{Me3Salt}$; (b) generating a mist of the liquid mixture inside a mist generator of the drying chamber; (c) mixing the mist of the liquid mixture with a gas flow to form a gas-liquid mixture inside the drying chamber; (d) dry the gas-liquid mixture at a drying temperature for a time period and form a gas-solid mixture inside the drying chamber; (e) separate the gas-solid mixture into one or more solid particles of a an oxide material and a waste product; (f) deliver the solid particles of the lithium cobalt oxide material into an annealing chamber to react and anneal the solid particles of the lithium cobalt oxide material in the presence of a flow of a gas at an annealing temperature to obtain crystallized lithium cobalt oxide materials doped with one or more metal dopants, and anneal the crystallized lithium cobalt oxide materials doped with one or more metal dopants inside the annealing chamber for a time period to obtain crystallized lithium cobalt oxide materials; (g) cool the crystallized lithium cobalt oxide materials doped with one or more metal dopants and obtain final solid product particles of crystallized lithium cobalt oxide materials doped with one or more metal dopants at desired size, morphology and crystal structure.

In some embodiments, the compositions and formulations of the present inventions being tested are as shown in the below Table 6. The compositions of the present inventions, prepared according to Example #12 and Example #16, have a chemical formula of $Li_x Co_y O_z$ ● doped $Zr_c$, wherein a ratio of x:y:c is equivalent to $M_{LiSalt}{:}M_{CoSalt}{:}M_{ZrSalt}$, wherein x is from 0.9-1.1 ($0.9{\leq}x{\leq}1.1$), x is 0.97, y is 1.0, c is 0.0017.

In Example 12 and Example 16, exemplary lithium-containing salt compounds include, but not limited to, lithium nitrate ($LiNO_3$), exemplary cobalt-containing salt compound include, but not limited to cobalt nitrate (Co $(NO_3)_2$) and combinations thereof, exemplary zirconium-containing salt compound include, but not limited to, zirconium nitrate ($Zr(NO_3)_4$) and combinations thereof. The annealing temperature and annealing time in Example 12 and Example 16 were heated to 950° C. for 17 hours. The List of chemistries used for in the present invention is displayed in Table 6.

TABLE 6

| | | | | | | Anneal | Anneal |
|---|---|---|---|---|---|---|---|
| | | | $M_{Me1Salt}$ | $M_{Me2Salt}$ | $M_{ZrSalt}$ | Temp | Time |
| Example # | $M_{LiSalt}$ | $M_{CoSalt}$ | ($Mg(NO_3)_2$) | ($Al(NO_3)_3$) | ($Zr(NO_3)_4$) | (° C.) | (hour) |
| 12 | 0.97 | 1.0 | 0 | 0 | 0.0017 | 950 | 17 |
| 16 | 1.0 | 1.0 | 0 | 0 | 0.0017 | 950 | 17 |

Exemplary compositions of measured LCO doped with zirconium material

Table 7 illustrates testing results of exemplary compositions of measured LCO material doped with zirconium (Example #12). One observation is that the testing results of the ratio of the measured LCO ● doped Zr material compositions of Li:Co:Zr are within an expected range from the prepared molar ratio of $M_{LiSalt}$:$M_{CoSalt}$:$M_{ZrSalt}$ being prepared.

TABLE 7

| | Exemplary compositions of measured LCO doped with zirconium material | | | | | |
|---|---|---|---|---|---|---|
| Example # | Li | Ni | Co | Al | Mg | Zr |
| 12 | 1.0312 | 0.0022 | 0.9963 | 0.0013 | 0.0001 | 0.0019 |

Table 8 illustrates testing results of electric capacity and coulombic efficiency (CE) of battery cells made by lithium cobalt oxide materials doped with zirconium at different cutoff voltage of 4.45 voltage and 4.5 voltage, prepared according to Example #16. One observation can be found that the cutoff voltage affect the initial charge and discharge capacity and CE of exemplary lithium cobalt oxide material doped with zirconium. Further observation can be found that with lower cutoff voltage, the exemplary lithium cobalt oxide material doped with zirconium demonstrates slightly higher coulombic efficiency (CE) as shown in Table 8. To be more specific, under the upper cutoff voltage of 4.45 V, the coulombic efficiency (CE) is 96.3%, while the coulombic efficiency (CE) is 92.9% under the upper cutoff voltage of 4.5 V.

TABLE 8

| Measured electric performance of lithium-ion-battery cells made from exemplary LCO doped with Zirconium materials Example #16 | | | |
|---|---|---|---|
| Upper cut off voltage, V | 1st charge capacity, mAh/g | 1st discharge capacity, mAh/g | 1st CE, % |
| 4.45 | 187.297 | 180.337 | 96.3 |
| 4.5 | 195.108 | 181.306 | 92.9 |

In other embodiments, the compositions and formulations of the present inventions being tested are as shown in the below Table 8. The compositions of the present inventions, prepared according to Example #22-#26, have a chemical formula of $Li_x Co_y O_z$ ● doped $Mg_a$, $Al_b$, $Zr_c$, wherein a ratio of x:y:a:b:c is equivalent to $M_{LiSalt}$:$M_{CoSalt}$:$M_{MgSalt}$:$M_{AlSalt}$:$M_{ZrSalt}$, wherein x is 1.0, y is 1.0, the a is from 0-0.05 ($0 \le a \le 0.05$), the b is from 0-0.05 ($0 \le b \le 0.05$), the c is from 0-0.05 ($0 \le c \le 0.05$).

In Example #22#26, exemplary lithium-containing salt compound include, but not limited to, lithium nitrate ($LiNO_3$) and combinations thereof, exemplary cobalt-containing salt compound include, but not limited to cobalt nitrate ($Co(NO_3)_2$) and combinations thereof, exemplary first metal-containing salt Me1 include, but not limited to, magnesium nitrate ($Mg(NO_3)_2$) and combinations thereof, exemplary second metal-containing salt Me2 compound include, but not limited to, aluminum nitrate ($Al(NO_3)_3$) and combinations thereof, exemplary third metal-containing salt Me3 compound include, but not limited to, zirconium nitrate ($Zr(NO_3)_4$) and combinations thereof. The annealing temperature and annealing time in the Example #22-#26 were heated to 1020° C. for 17 hours. The list of chemistries used for in the present invention is displayed in Table 9.

TABLE 9

| | Exemplary compositions of measured LCO material doped with one or more metal dopants | | | | | | |
|---|---|---|---|---|---|---|---|
| Example # | $M_{LiSalt}$ | $M_{CoSalt}$ | $M_{Me1Salt}$ ($Mg(NO_3)_2$) | $M_{Me2Salt}$ ($Al(NO_3)_3$) | $M_{Me3Salt}$ ($Zr(NO_3)_4$) | Anneal Temp (° C.) | Anneal Time (hour) |
| 22 | 1.0 | 1.0 | 0.0017 | 0 | 0 | 1020 | 17 |
| 23 | 1.0 | 1.0 | 0.0045 | 0 | 0 | 1020 | 17 |
| 24 | 1.0 | 1.0 | 0 | 0.0045 | 0 | 1020 | 17 |
| 25 | 1.0 | 1.0 | 0.0010 | 0.0035 | 0 | 1020 | 17 |
| 26 | 1.0 | 1.0 | 0 | 0 | 0.0017 | 1020 | 17 |

Table 10 illustrates testing results of exemplary measured LCO material doped with one or more metal dopants compositions (Example #22-#26). One observation is that the testing results of the ratio of the measured LCO material compositions of Li:Co:Mg:Al:Zr are within an expected range from the prepared molar ratio of $M_{LiSalt}$:$M_{CoSalt}$:$M_{MgSalt}$:$M_{AlSalt}$, $M_{ZrSalt}$ being prepared.

TABLE 10

| | Exemplary compositions of measured LCO material doped with one or more metal dopants | | | | | |
|---|---|---|---|---|---|---|
| Example # | Li | Ni | Co | Al | Mg | Zr |
| 22 | 1.0040 | 0.0014 | 0.998 | 0.0003 | 0.0021 | 0.0002 |
| 23 | 1.0099 | 0 | 0.999 | 0.0007 | 0.0053 | 0 |
| 24 | 1.0131 | 0 | 0.9954 | 0.0044 | 0.0001 | 0 |
| 25 | 1.0165 | 0 | 0.9954 | 0.0044 | 0.0017 | 0 |
| 26 | 1.0140 | 0 | 0.9995 | 0.0003 | 0.0001 | 0.0009 |

Table 11 illustrates testing results of tap density (TD) and contaminants of crystallized lithium cobalt oxide materials doped with one or more metal dopants after annealing process of exemplary LCO doped with one or more metal dopants (Example #22-26). To obtain an ideal lithium cobalt oxide material with high discharge capacity, excellent cycling performance and high-volume energy density, the morphology and tap density of the material have to be controlled precisely during the preparation process. It is found that the tap density of the obtained precursor is around 2.38 (g/cc), which can be attributed to the homogeneous distributions of particles with good packing properties.

TABLE 11

| | Measurement of tap density (TD) & contaminants of exemplary LCO materials doped with one or more metal dopants | | |
|---|---|---|---|
| Example # | TD (g/cc) | $Li_2CO_3$ | LiOH |
| 22 | 2.17 | 0.024 | 0 |
| 23 | 2.38 | 0.036 | 0.005 |
| 24 | 2.27 | 0.035 | 0.005 |
| 25 | 2.18 | 0.027 | 0 |
| 26 | 2.10 | 0.031 | 0 |

Table 12 illustrates testing results of electric capacity and coulombic efficiency (CE) of battery cells made by lithium cobalt oxide materials doped with magnesium tested under different upper cutoff voltages from 4.45 voltage to 4.6 voltage, prepared according to Example #22. One observation can be found that the battery samples made by exemplary lithium cobalt oxide materials doped with magnesium overall show a highcoulombic efficiency (CE) under different cutoff voltages. For example, under the upper cutoff voltage of 4.45 V, the discharge capacity and the coulombic efficiency (CE) is around 181.404 mAh/g and 98%, respectively. In another example, under the upper cutoff voltage of 4.5 V, the discharge capacity and coulombic efficiency (CE) is around 194.346 mAh/g and 99.4%, respectively. In still another example, under the upper cutoff voltage of 4.6 V, the discharge capacity and the coulombic efficiency (CE) is around 226.019 mAh/g and 97%, respectively.

Referring back to Table 8, further observation can be found that samples of batter cells made from lithium cobalt oxide materials doped with magnesium ($Li_{1.0}$ $Co_{1.0}$ $O_2$ ● doped $Mg_{0.0017}$) demonstrate higher coulombic efficiency (CE) than the CE made from lithium cobalt oxide materials doped with zirconium ($Li_{1.0}$ $Co_{1.0}$ $O_2$ ● doped $Zr_{0.0017}$). To be more specific, the measured CE of battery cells made from exemplary LCO doped with zirconium materials is ranged from 92.9% to 96.3%, while the measured CE of battery cells made from exemplary LCO doped with magnesium materials is ranged from 96.9% to 99.4%

TABLE 12

| Measured electric performance of lithium-ion-battery cells made from exemplary LCO doped with Magnesium materials Example # 22 | | | |
|---|---|---|---|
| Upper cut off voltage, V | 1st charge capacity, mAh/g | 1st discharge capacity, mAh/g | 1st CE, % |
| 4.45 | 185.104 | 181.404 | 98 |
| 4.45 | 185.557 | 181.493 | 97.8 |
| 4.5 | 195.423 | 194.346 | 99.4 |
| 4.5 | 193.576 | 191.201 | 98.8 |
| 4.6 | 233.032 | 226.019 | 97 |
| 4.6 | 233.108 | 225.913 | 96.9 |

Table 13 illustrates testing results of electric capacity and coulombic efficiency (CE) of battery cells made by lithium cobalt oxide materials doped with magnesium tested under different upper cutoff voltages from 4.3 voltage to 4.6 voltage, prepared according to Example #23. One observation can be found that the battery samples made by exemplary lithium cobalt oxide materials doped with magnesium overall show a high coulombic efficiency (CE) under different cutoff voltages. For example, under the upper cutoff voltage of 4.3 V, the discharge capacity and the coulombic efficiency (CE) is around 160.434 mAh/g and 97.7%, respectively. In another example, under the upper cutoff voltage of 4.45 V, the discharge capacity and the coulombic efficiency (CE) is around 183.173 mAh/g and 97.6%, respectively. In still another example, under the upper cutoff voltage of 4.5 V, the discharge capacity and the coulombic efficiency (CE) is around and 193.217 mAh/g and 97.3%, respectively. In yet another example, under the upper cutoff voltage of 4.6 V, the discharge capacity and the coulombic efficiency (CE) is around 228.309 mAh/g and 96.6%, respectively Referring back to Table 12, further observation can be found that samples of batter cells made from lithium cobalt oxide materials doped with different percentage of magnesium demonstrate similar coulombic efficiency (CE). To be more specific, the measured CE of battery cells made from exemplary LCO doped with 0.0017 magnesium materials ($Li_{1.0}$ $Co_{1.0}$ $O_2$ ● doped $Mg_{0.0017}$) is ranged from 96.9% to 99.4% under different upper cutoff voltage ranged from 4.45 V to 4.6 V, while the measured CE of battery cells made from exemplary LCO doped with 0.0045 ($Li_{1.0}$ $Co_{1.0}$ $O_2$ ● doped $Mg_{0.0045}$) magnesium materials is ranged from 95.7% to 97.7% under different upper cutoff voltage ranged from 4.3 V to 4.6 V

TABLE 13

| Measured electric performance of lithium-ion-battery cells made from exemplary LCO doped Magnesium materials Example # 23 | | | |
|---|---|---|---|
| Upper cut off voltage, V | 1st charge capacity, mAh/g | 1st discharge capacity, mAh/g | 1st CE, % |
| 4.3 | 164.16 | 160.434 | 97.7 |
| 4.3 | 166.873 | 159.676 | 95.7 |
| 4.45 | 187.556 | 182.718 | 97.4 |

TABLE 13-continued

| Measured electric performance of lithium-ion-battery cells made from exemplary LCO doped Magnesium materials Example # 23 | | | |
|---|---|---|---|
| Upper cut off voltage, V | 1st charge capacity, mAh/g | 1st discharge capacity, mAh/g | 1st CE, % |
| 4.45 | 187.757 | 183.173 | 97.6 |
| 4.5 | 198.574 | 193.217 | 97.3 |
| 4.6 | 236.302 | 228.309 | 96.6 |

Table 14 illustrates testing results of electric capacity and coulombic efficiency (CE) of battery cells made by lithium cobalt oxide materials doped with aluminum tested under different upper cutoff voltages from 4.4 voltage to 4.6 voltage, prepared according to Example #24. One observation can be found that the cutoff voltage the battery samples made by exemplary lithium cobalt oxide materials doped with aluminum overall have a high coulombic efficiency (CE). For example, under the upper cutoff voltage of 4.4 V, the discharge capacity and the coulombic efficiency (CE) is around 173.592 mAh/g and 97%, respectively. In another example, the discharge capacity and under the upper cutoff voltage of 4.45V, the coulombic efficiency (CE) is around 181.861 mAh/g and 97.3%, respectively. In still another example, under the upper cutoff voltage of 4.5 V, the discharge capacity and the coulombic efficiency (CE) is around 191.712 mAh/g and 97%, respectively. In yet another example, under the upper cutoff voltage of 4.6 V, the discharge capacity and the coulombic efficiency (CE) is around 225.187 mAh/g and 96.4%.

Referring back to Table 13, further observation can be found that samples of batter cells made from lithium cobalt oxide materials doped with magnesium ($Li_{1.0} Co_{1.0} O_2$ ● doped $Mg_{0.0045}$) demonstrate similar coulombic efficiency (CE) to lithium cobalt oxide materials doped with aluminum ($Li_{1.0} Co_{1.0} O_2$ ● doped $Al_{0.0045}$). To be more specific, the measured CE of battery cells made from exemplary LCO doped with magnesium materials is ranged from 95.7% to 97.7%, while the measured CE of battery cells made from exemplary LCO doped with aluminum materials is ranged from 96.4% to 97.3%

TABLE 14

| Measured electric performance of lithium-ion-battery cells made from exemplary LCO doped Aluminum materials Example # 24 | | | |
|---|---|---|---|
| Upper cut off voltage, V | 1st charge capacity, mAh/g | 1st discharge capacity, mAh/g | 1st CE, % |
| 4.4 | 178.991 | 173.592 | 97 |
| 4.45 | 186.964 | 181.861 | 97.3 |
| 4.45 | 186.955 | 181.729 | 97.2 |
| 4.5 | 197.624 | 191.712 | 97 |
| 4.6 | 233.659 | 225.187 | 96.4 |

Table 15 illustrates testing results of electric capacity and coulombic efficiency (CE) of battery cells made by lithium cobalt oxide materials doped with aluminum tested under different upper cutoff voltages from 4.45 voltage to 4.6 voltage, prepared according to Example #25. One observation can be found that the cutoff voltage the battery samples made by exemplary lithium cobalt oxide materials doped with magnesium and aluminum overall have a high coulombic efficiency (CE). For example, under the upper cutoff voltage of 4.45 V, the discharge capacity and the coulombic efficiency (CE) is around 180.661 mAh/g and 93.2%, respectively. In another example, under the upper cutoff voltage of 4.5V, the discharge capacity and the coulombic efficiency (CE) is around 190.324 mAh/g and 96.5%, respectively. In still another example, under the upper cutoff voltage of 4.6 V, the discharge capacity and the coulombic efficiency (CE) is around 224.68 mAh/g and 95.8%, respectively.

Referring back to Table 11, Table 12, Table 13 and Table 14, further observation can be found that samples of battery cells made from lithium cobalt oxide materials with one metal dopant in average demonstrate higher coulombic efficiency (CE) to lithium cobalt oxide materials with two metal dopants ($Li_{1.0} Co_{1.0} O_2$ ● doped $Mg_{0.0010} Al_{0.0035}$). To be more specific, the measured CE of battery cells made from exemplary LCO with one metal dopant is ranged from 96.4% to 99.4%, while the measured CE of battery cells made from exemplary LCO doped with magnesium and aluminum materials is ranged from 93.2% to 96.5%

TABLE 15

| Measured electric performance of lithium-ion-battery cells made from exemplary LCO ● doped Mg, Al materials Example # 25 | | | |
|---|---|---|---|
| Upper cut off voltage, V | 1st charge capacity, mAh/g | 1st discharge capacity, mAh/g | 1st CE, % |
| 4.45 | 193.756 | 180.661 | 93.2 |
| 4.5 | 197.212 | 190.324 | 96.5 |
| 4.6 | 232.562 | 222.25 | 95.6 |
| 4.6 | 234.493 | 224.638 | 95.8 |

Table 16 illustrates testing results of electric capacity and coulombic efficiency (CE) of battery cells made by lithium cobalt oxide materials doped with zirconium tested under different upper cutoff voltages from 4.3 voltage to 4.6 voltage, prepared according to Example #26. One observation can be found that the cutoff voltage the battery samples made by exemplary lithium cobalt oxide materials doped with zirconium overall show a high coulombic efficiency (CE). For example, under the upper cutoff voltage of 4.3 V, the discharge capacity and the coulombic efficiency (CE) is around 159.025 mAh/g and 98.3%, respectively. In another example, under the upper cutoff voltage of 4.45 V, the discharge capacity and coulombic efficiency (CE) is around 181.71 mAh/g and 98.0%, respectively. In still another example, under the upper cutoff voltage of 4.5 V, the discharge capacity and the coulombic efficiency (CE) is around 194.107 mAh/g and 97.9%, respectively. In yet another example, under the upper cutoff voltage of 4.6 V, the discharge capacity and the coulombic efficiency (CE) is around 230.09 mAh/g and 96.9%, respectively.

Referring back to Table 8, further observation can be found that samples of batter cells made from lithium cobalt oxide materials doped with zirconium annealed at 950° C. for 17 hours ($Li_{1.0} Co_{1.0} O_2$ ● doped $Zr_{0.0017}$) demonstrate lower coulombic efficiency (CE) than the CE made from lithium cobalt oxide materials doped with zirconium annealed at 1020° C. for 17 hours ($Li_{1.0} Co_{1.0} O_2$ ● doped $Zr_{0.0017}$). To be more specific, the measured CE of battery cells made from exemplary LCO doped with zirconium materials annealed at 1020° C. is ranged from 96.9% to 98.3%, while the measured CE of battery cells made from exemplary LCO doped with zirconium materials annealed at 950° C. is ranged from 92.9% to 96.3%

TABLE 16

| Measured electric performance of lithium-ion-battery cells made from exemplary LCO • doped Zr materials Example # 26 | | | |
| --- | --- | --- | --- |
| Upper cut off voltage, V | 1st charge capacity, mAh/g | 1st discharge capacity, mAh/g | 1st CE, % |
| 4.3 | 161.831 | 159.025 | 98.3 |
| 4.45 | 185.369 | 181.71 | 98.0 |
| 4.5 | 198.267 | 194.107 | 97.9 |
| 4.6 | 237.538 | 230.09 | 96.9 |

In still other embodiments, the compositions and formulations of the present inventions being tested are as shown in the below Table 17. The compositions of the present inventions for Example 32 having a chemical formula of $Li_x Co_y O_z$ ● doped $Mg_a$, wherein a ratio of x:y:a is equivalent to $M_{LiSalt}:M_{CoSalt}:M_{MgSalt}$, wherein x is 1.0, y is 1.0, a is 0.0017.

In Example 32, exemplary lithium-containing salt compound include, but not limited to, lithium nitrate ($LiNO_3$) and combinations thereof, exemplary cobalt-containing salt compound include, but not limited to cobalt nitrate ($Co(NO_3)_2$) and combinations thereof, exemplary first metal-containing salt Me1 include, but not limited to, magnesium nitrate ($Mg(NO_3)_2$) and combinations thereof. The annealing temperature and annealing time in the Example 32 were heated to 1090° C. for 17 hours. The list of chemistries used for in the present invention is displayed in Table 17.

TABLE 17

| Exemplary compositions of measured LCO material doped with magnesium | | | | | | | |
| --- | --- | --- | --- | --- | --- | --- | --- |
| Example # | $M_{LiSalt}$ | $M_{CoSalt}$ | $M_{MgSalt}$ ($Mg(NO_3)_2$) | $M_{Me2Salt}$ ($Al(NO_3)_3$) | $M_{Me3Salt}$ ($Zr(NO_3)_4$) | Anneal Temp (° C.) | Anneal Time (hour) |
| 32 | 1.0 | 1.0 | 0.0017 | 0 | 0 | 1090 | 17 |

Table 18 illustrates testing results of exemplary measured LCO material compositions (Example #32). One observation is that the testing results of the ratio of the measured LCO material compositions of Li:Co:Mg are within an expected range from the prepared molar ratio of $M_{LiSalt}:M_{CoSalt}:M_{MgSalt}$ being prepared.

TABLE 18

| Exemplary compositions of measured LCO material doped with magnesium | | | | | | |
| --- | --- | --- | --- | --- | --- | --- |
| Example # | Li | Ni | Co | Al | Mg | Zr |
| 32 | 1.0072 | 0 | 0.9979 | 0.0018 | 0.0020 | 0 |

Table 19 illustrates testing results of electric capacity and coulombic efficiency (CE) of battery cells made by lithium cobalt oxide materials doped with magnesium annealed at 1090° C. tested under different upper cutoff voltages from 4.3 voltage to 4.6 voltage, prepared according to Example #32. One observation can be found that the battery samples made by exemplary lithium cobalt oxide materials doped with magnesium overall show a high coulombic efficiency (CE) under different cutoff voltages. For example, under the upper cutoff voltage of 4.3 V, the discharge capacity and the coulombic efficiency (CE) is around 146.55 mAh/g and 98.2%, respectively. In another example, under the upper cutoff voltage of 4.45 V, the discharge capacity and the coulombic efficiency (CE) is around 175.842 mAh/g and 98.3%, respectively. In still another example, under the upper cutoff voltage of 4.5 V, the discharge capacity and the coulombic efficiency (CE) is around and 175.7 mAh/g and 98.2%, respectively. In yet another example, under the upper cutoff voltage of 4.6 V, the discharge capacity and the coulombic efficiency (CE) is around 217.2 mAh/g and 97.5%, respectively Referring back to Table 12, further observation can be found that samples of batter cells made from lithium cobalt oxide materials doped with magnesium ($Li_{1.0} Co_{1.0} O_2$ ● doped $Mg_{0.0017}$) annealed at different annealing temperatures demonstrate similar coulombic efficiency (CE). To be more specific, the measured CE of battery cells made from exemplary LCO doped with magnesium materials annealed at 1020° C. is ranged from 96.9% to 99.4%, while the measured CE of battery cells made from exemplary LCO doped with magnesium materials annealed at 1090° C. is ranged from 97.1% to 98.3%

TABLE 19

Measured electric performance of lithium-ion-battery
cells made from exemplary LCO • doped Mg materials
Example # 32

| Upper cut off voltage, V | 1st charge capacity, mAh/g | 1st discharge capacity, mAh/g | 1st CE, % |
|---|---|---|---|
| 4.3 | 149.23 | 146.55 | 98.2 |
| 4.45 | 178.845 | 175.842 | 98.3 |
| 4.5 | 178.9 | 175.7 | 98.2 |
| 4.5 | 192.3 | 186.7 | 97.1 |
| 4.6 | 222.8 | 217.2 | 97.5 |

Figure 4:
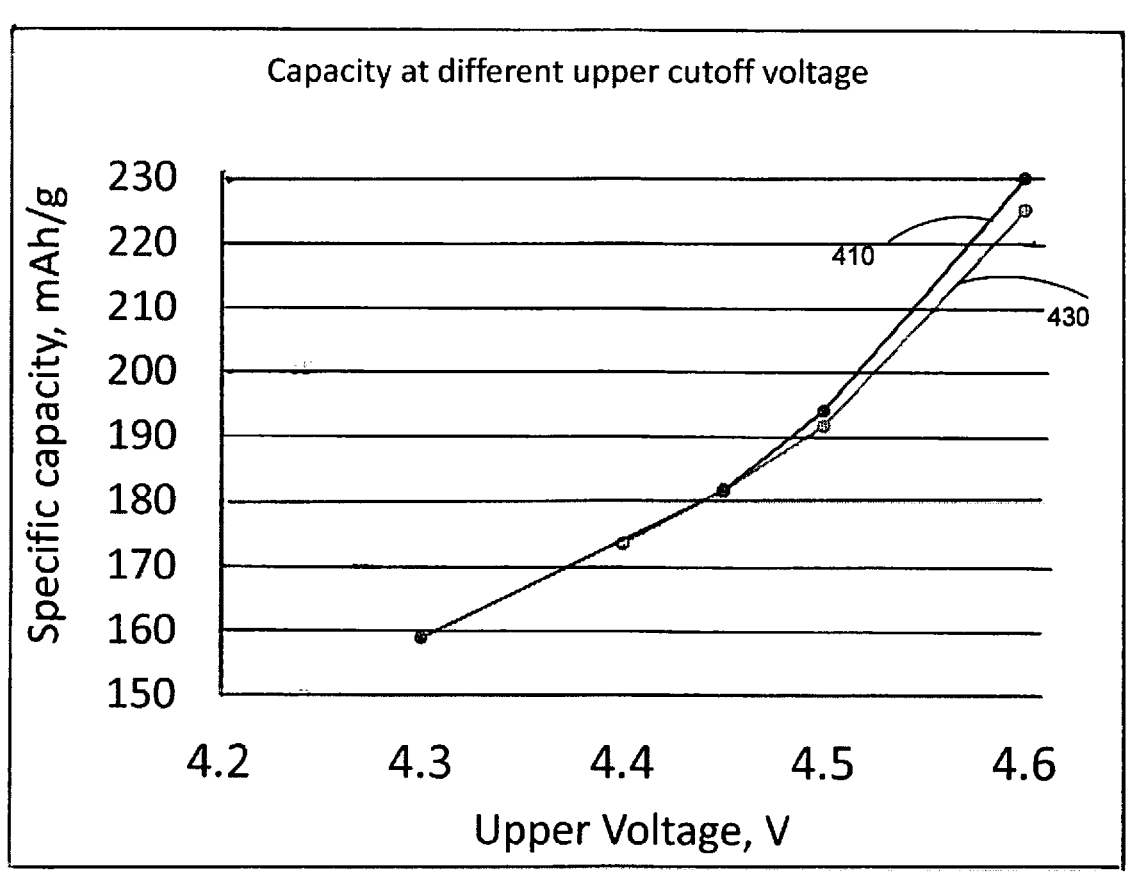
FIG. 4 is a line graph illustrating the discharge profile of electric capacity of lithium ion batteries prepared from various cathode materials of the invention.

FIG. 4 illustrates testing results of the discharge profile of electric capacity of lithium ion batteries prepared from lithium cobalt oxide materials doped with one or metal dopants of the invention. In one embodiment, line 410 represents lithium cobalt oxide materials doped with zirconium ($Li_{1.0}$ $Co_{1.0}$ $O_2$ • doped $Zr_{0.0017}$). In another embodiment, line 430 represents lithium cobalt oxide materials doped with Aluminum ($Li_{1.0}$ $Co_{1.0}$ $O_2$ • doped $Al_{0.0045}$). All dopants affect the discharge capacity of the lithium cobalt oxide materials. One observation can be found that the samples LCO dependent on different dopant composition ratios has a higher capacity at a higher voltage as shown in FIG. 4.

Other observation can be found that at the same upper cut-off voltage, the discharge capacities drop slightly due to the different dopants at different ratios, however no significant drop can be observed, which confirms that substituted dopant levels do not affect the electrochemical performance of the sample significantly.

Further observation can be found that at the upper cut-off voltage 4.6 V, the lithium cobalt oxide materials doped with zirconium ($Li_{1.0}$ $Co_{1.0}$ $O_2$ • doped $Zr_{0.0017}$) have the optimal and the highest discharge capacity of 230.09 mAh/g and 96.7% coulombic efficiency (CE) among other composition ratios of cathode material mixtures as shown in FIG. 4.

Figure 5A:
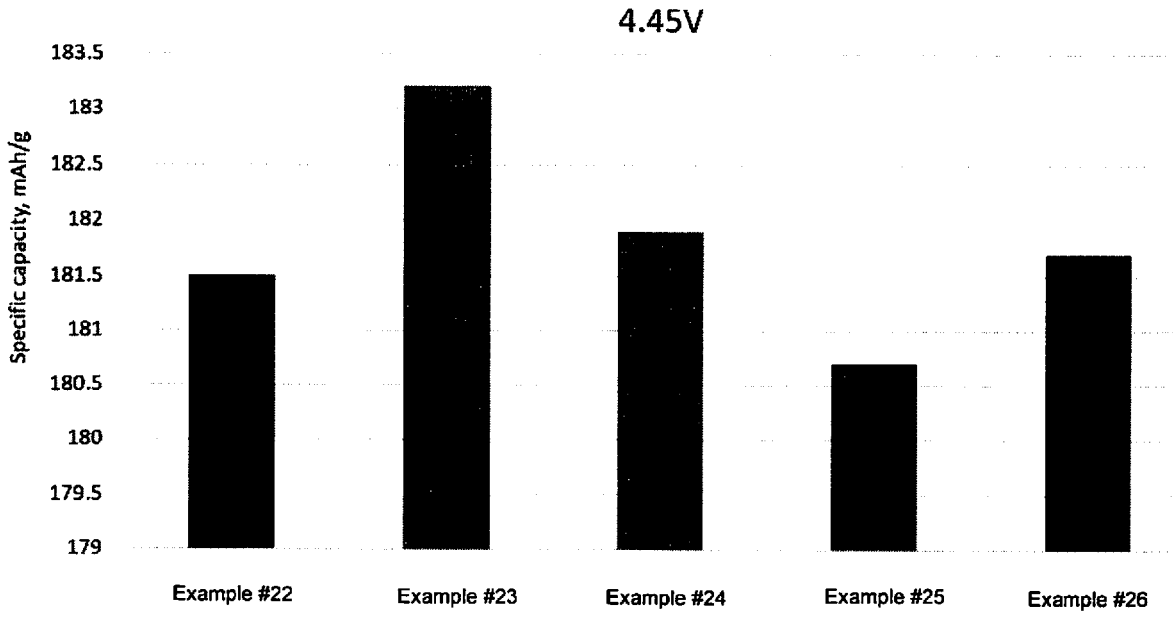
FIG. 5A is a column graph illustrating the discharge profile of electric capacity of lithium ion batteries at a specified voltage where the lithium ion batteries are prepared from various exemplary cathode materials of the invention.
Figure 5B:
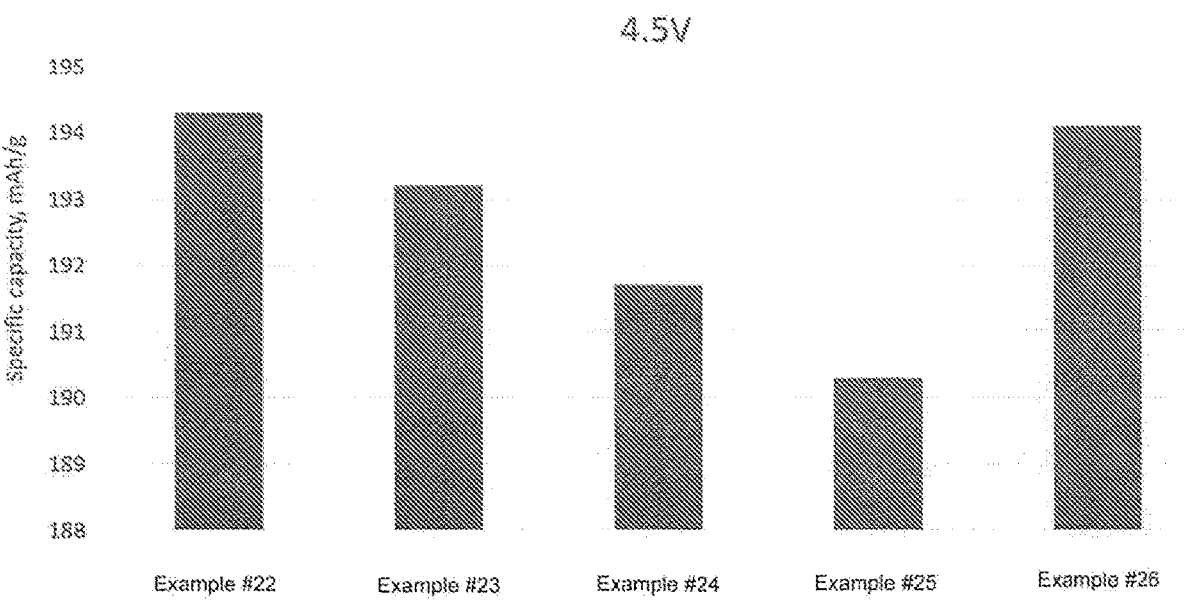
FIG. 5B is a column graph illustrating the discharge profile of electric capacity of lithium ion batteries at a specified voltage where the lithium ion batteries are prepared from exemplary cathode materials of the invention.
Figure 5C:
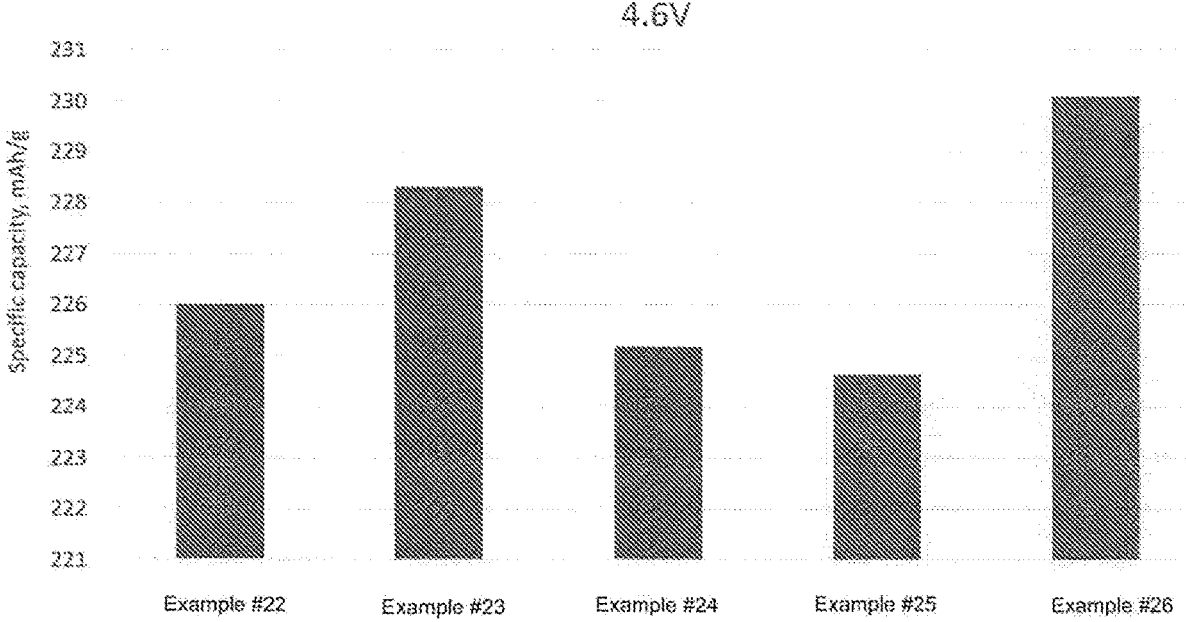
FIG. 5C is a column graph illustrating the discharge profile of electric capacity of lithium ion batteries at a specified voltage where the lithium ion batteries are prepared from yet several examples of a cathode material of the invention.

FIG. 5A, FIG. 5B and FIG. 5C illustrate the discharge profile of electric capacity of lithium ion batteries at different cut-off voltages (from 4.45 voltage to 4.6 voltage), where the lithium ion batteries are prepared according to Example #22-#26 of lithium cobalt oxide materials doped with one or more metal dopants of the invention.

FIG. 5A is a column graph illustrating the discharge profile of electric capacity of lithium ion batteries prepared according to Example #22-#26 of the invention at 4.45 cut-off voltage. One observation can be found that at 4.45 cut-off voltage, the discharge capacities drop slightly due to the different dopants at different ratios. Further observation can be found that at the upper cut-off voltage 4.45 V, the lithium cobalt oxide materials doped with magnesium ($Li_{1.0}$ $Co_{1.0}$ $O_2$ • doped $Mg_{0.0045}$), prepared according to Example #23, have the highest discharge capacity of 183.17 mAh/g among other composition ratios of Example #22-26 as shown in FIG. 5A.

FIG. 5B is a column graph illustrating the discharge profile of electric capacity of lithium ion batteries prepared from Example #22-26 of the invention at 4.5 voltage. One observation can be found that at 4.5 cut-off voltage, the discharge capacities drop slightly due to the different dopants at different ratios. Further observation can be found that at the upper cut-off voltage 4.5 V, the lithium cobalt oxide materials doped with magnesium ($Li_{1.0}$ $Co_{1.0}$ $O_2$ • doped $Mg_{0.0017}$), prepared according to Example #22, and lithium cobalt oxide materials doped with zirconium ($Li_{1.0}$ $Co_{1.0}$ $O_2$ • doped $Zr_{0.0017}$), prepared according to Example #26, have higher discharge capacity of 194.35 mAh/g and 194.11 mAh/g, respectively, among other composition ratios of Example #22-26 as shown in FIG. 5B.

FIG. 5C is a column graph illustrating the discharge profile of electric capacity of lithium ion batteries prepared from Example #22-26 of the invention at 4.6 voltage. As shown in FIG. 5C, a higher discharge capacity reading is observed as the cut-off voltage increases. Further observation can be found that the lithium cobalt oxide materials doped with zirconium ($Li_{1.0}$ $Co_{1.0}$ $O_2$ • doped $Zr_{0.0017}$), prepared according to Example #26, have the higher discharge capacity of 230.09 mAh/g among other composition ratios of Example #22-26.

Figure 6:
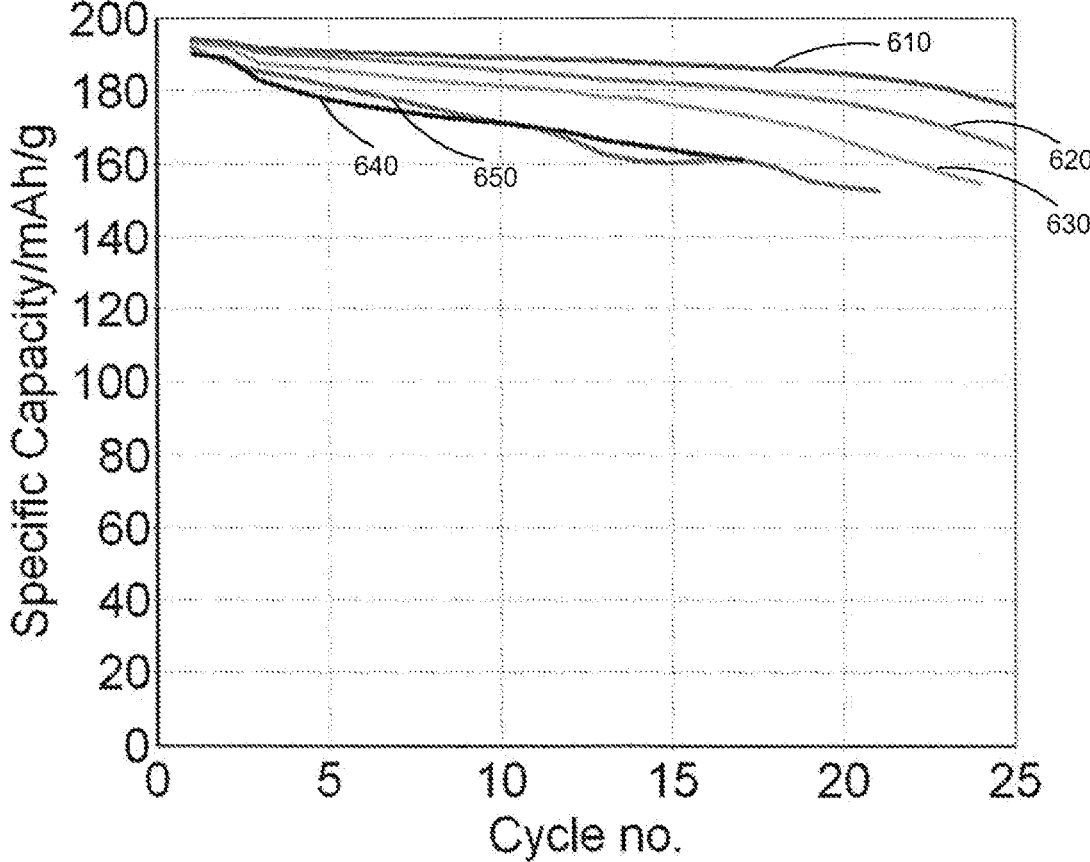
FIG. 6 is a graph illustrating electric charge and discharge cycling performance of battery cells prepared by using various examples of cathode materials of the invention.

FIG. 6 is a graph illustrating cycling performance of samples of battery cells made from lithium cobalt oxide materials doped with different metal dopants and concentrations at a cutoff voltage of 4.5 V. FIG. 6 compares the cycle and discharge capability test results for the doped examples.

In one embodiment, line 610 illustrates the charge cycles of battery cells made from lithium cobalt oxide doped with zirconium ($LiCoO_2$ • doped $Zr_{0.17\%}$). In another embodiment, line 620 illustrates the charge cycles of battery cells made from lithium cobalt oxide doped with magnesium ($LiCoO_2$ • doped $Mg_{0.17\%}$). In yet another embodiment, line 630 illustrates the charge cycles of battery cells made from lithium cobalt oxide doped with magnesium ($LiCoO_2$ • doped $Mg_{0.45\%}$). In yet another embodiment, line 640 illustrates the charge cycles of battery cells made from lithium cobalt oxide doped with magnesium and aluminum ($LiCoO_2$ • doped $Mg_{0.17\%}$, $Al_{0.35\%}$). In yet another embodiment, line 650 illustrates the charge cycles of battery cells made from lithium cobalt oxide doped with aluminum ($LiCoO_2$ • doped $Al_{0.45\%}$).

Observation can be seen by FIG. 6 is that the cycling of battery cells doped with zirconium containing compound ($LiCoO_2$ • doped $Zr_{0.17\%}$) performs better than the battery cells doped with other metals containing compound. Further illustration can be seen from FIG. 6 is that between 0-25 battery cycles, the battery cell made from lithium cobalt oxide materials doped with zirconium ($LiCoO_2$ • doped $Zr_{0.17\%}$) has higher capacity than the other samples made from lithium cobalt oxide materials doped with magnesium, lithium cobalt oxide materials doped with aluminum, and lithium cobalt oxide materials doped with magnesium and aluminum of the battery cells. Further observation is that the discharge capacity of these samples starts to slowly fade by the time they reach $25^{th}$ cycle.

Figures 7A, 7B, 7C, 7D, 8A, 8B:
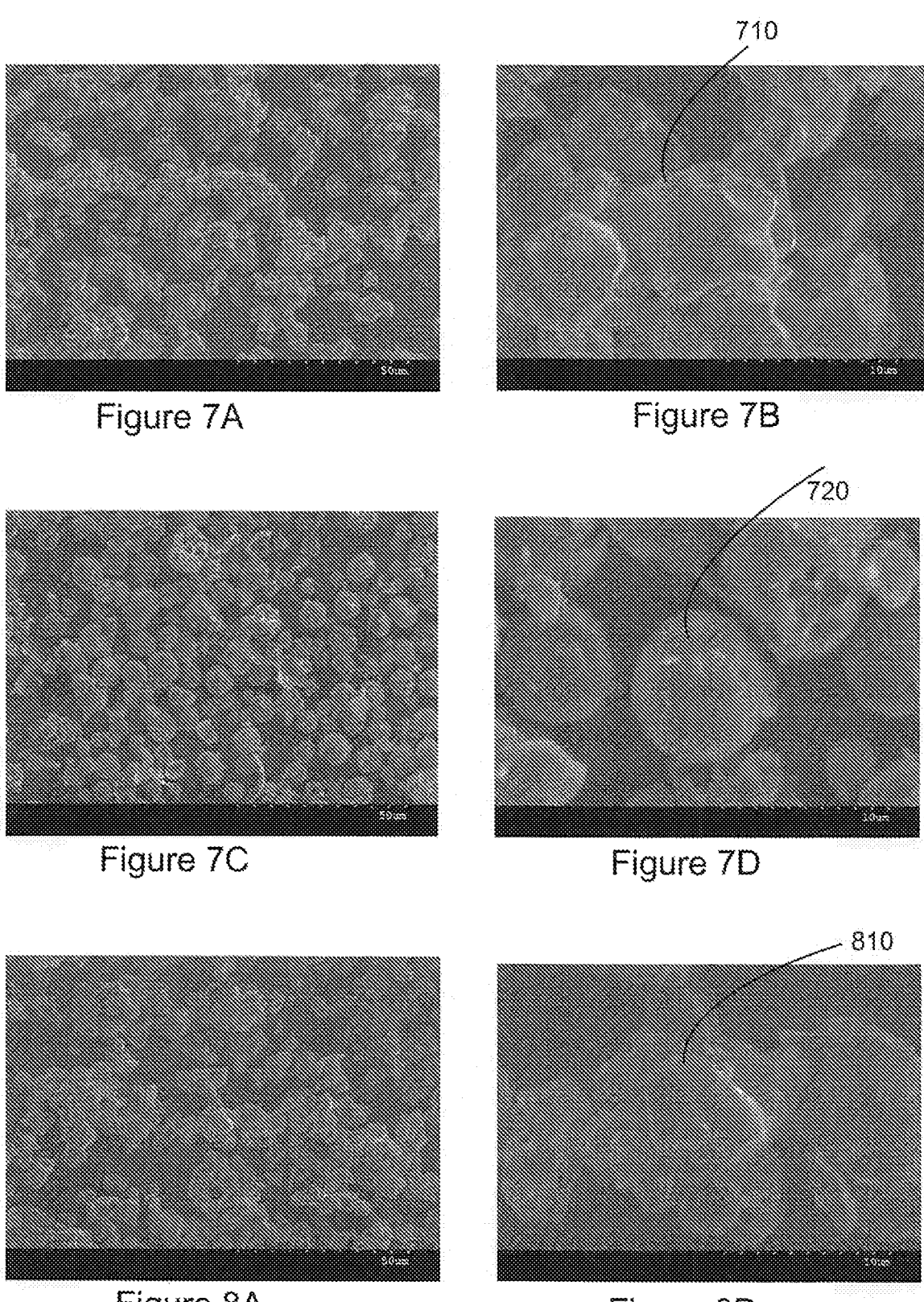
FIG. 7A is a scanning electron microscopy (SEM) image of another example of crystallized lithium cobalt oxide materials of the invention.
FIG. 7B is a scanning electron microscopy (SEM) image of the example of FIG. 7A in larger magnitude.
FIG. 7C is a scanning electron microscopy (SEM) image of another embodiment of another example of solid particles of an oxide material after a drying process.
FIG. 7D is a scanning electron microscopy (SEM) image of the example of FIG. 7C in larger magnitude.
FIG. 8A is a scanning electron microscopy (SEM) image of another example of crystallized lithium cobalt oxide materials.
FIG. 8B is a scanning electron microscopy (SEM) image of the example of FIG. 8A in larger magnitude.

FIG. 7A and FIG. 7B are scanning electron microscopy (SEM) images of one example of crystallized lithium cobalt oxide materials doped with magnesium ($LiCoO_2$ • doped $Mg_{0.17}\%$) of the invention after the annealing process at 1020° C. for 17 hours inside the annealing chamber. The SEM Image shows the compositions and formulations of the present inventions having a molar ratio of a lithium-containing salt, a cobalt-containing salt, a magnesium-containing salt is $M_{LiSalt}$:$M_{CoSalt}$:$M_{MgSalt}$. The present invention having a chemical formula of $Li_x$ $Co_y$ $O_z$ • doped $Mg_a$, wherein a ratio of x:y:a is equivalent to $M_{LiSalt}$:$M_{CoSalt}$:$M_{MgSalt}$, wherein the x is 1.0, the y is 1.0, and a is 0.0017. In FIG. 7A and FIG. 7B, exemplary lithium-containing salt compound include, but not limited to, lithium nitrate ($LiNO_3$) and combinations thereof, exemplary cobalt-containing salt compound include, but not limited to cobalt nitrate ($Co(NO_3)_2$) and combinations thereof, exemplary magnesium-containing salt (Mg) include, but not limited to, magnesium nitrate ($Mg(NO_3)_2$) and combinations thereof.

FIG. 7A illustrates the morphology and particle size of one example of lithium cobalt oxide material doped with magnesium particles at an annealing temperature of 1020° C. for 17 hours having crystallized structure. In addition, FIG. 7B shows a closer look of FIG. 7A. In one example as shown in FIG. 7B one lithium cobalt oxide material doped with magnesium particle 710 has a crystal structure.

FIG. 7C and FIG. 7D are scanning electron microscopy (SEM) images of another example of solid particles of an oxide material doped with magnesium (LiCoO$_2$ ● doped Mg$_{0.17\%}$) after a drying process inside a drying chamber. The SEM Image shows the compositions and formulations of the present inventions having a molar ratio of a lithium-containing salt, a cobalt-containing salt, a magnesium-containing salt is M$_{LiSalt}$:M$_{CoSalt}$:M$_{MgSalt}$. The present invention having a chemical formula of Li$_x$ Co$_y$ O$_z$ ● doped Mg$_a$, wherein a ratio of x:y:a is equivalent to M$_{LiSalt}$:M$_{CoSalt}$:M$_{MgSalt}$, wherein the x is 1.0, the y is 1.0, and a is 0.0017. In FIG. 7C and FIG. 7D, exemplary lithium-containing salt compound include, but not limited to, lithium nitrate (LiNO$_3$) and combinations thereof, exemplary cobalt-containing salt compound include, but not limited to cobalt nitrate (Co(NO$_3$)$_2$) and combinations thereof, exemplary magnesium-containing salt (Mg) include, but not limited to, magnesium nitrate (Mg(NO$_3$)$_2$) and combinations thereof.

FIG. 7C illustrates the morphology and particle size of one example of lithium cobalt oxide material doped with magnesium particles after the drying process having crystallized structure. In addition, FIG. 7D shows a closer look of FIG. 7C. In one example as shown in FIG. 7D, one solid particle of a lithium cobalt oxide material doped with magnesium 720 is spherical in shape.

FIG. 8A and FIG. 8B are scanning electron microscopy (SEM) images of crystallized lithium cobalt oxide materials doped with magnesium (LiCoO$_2$ ● doped Mg$_{0.45\%}$) of the invention after the annealing process at 1020° C. for 17 hours inside the annealing chamber. The SEM Image shows the compositions and formulations of the present inventions having a molar ratio of a lithium-containing salt, a cobalt-containing salt, a magnesium-containing salt is M$_{LiSalt}$:M$_{CoSalt}$:M$_{MgSalt}$. The present invention having a chemical formula of Li$_x$ Co$_y$ O$_z$ ● doped Mg$_a$, wherein a ratio of x:y:a is equivalent to M$_{LiSalt}$:M$_{CoSalt}$:M$_{MgSalt}$, wherein the x is 1.0, the y is 1.0, and a is 0.0045. In FIG. 8A and FIG. 8B, exemplary lithium-containing salt compound include, but not limited to, lithium nitrate (LiNO$_3$) and combinations thereof, exemplary cobalt-containing salt compound include, but not limited to cobalt nitrate (Co(NO$_3$)$_2$) and combinations thereof, exemplary magnesium-containing salt (Mg) include, but not limited to, magnesium nitrate (Mg(NO$_3$)$_2$) and combinations thereof.

FIG. 8A illustrates the morphology and particle size of one example of lithium cobalt oxide material doped with magnesium particles at an annealing temperature of 1020° C. for 17 hours having crystallized structure. In addition, FIG. 8B shows a closer look of FIG. 8A. In one example as shown in FIG. 8B one lithium cobalt oxide material doped with magnesium particle 810 has a crystal structure. Referring back to FIG. 7B, further observation can be found that the morphology does not change significantly with different percentage of magnesium dopants.

Figures 8C, 8D, 9A, 9B, 9C, 9D:
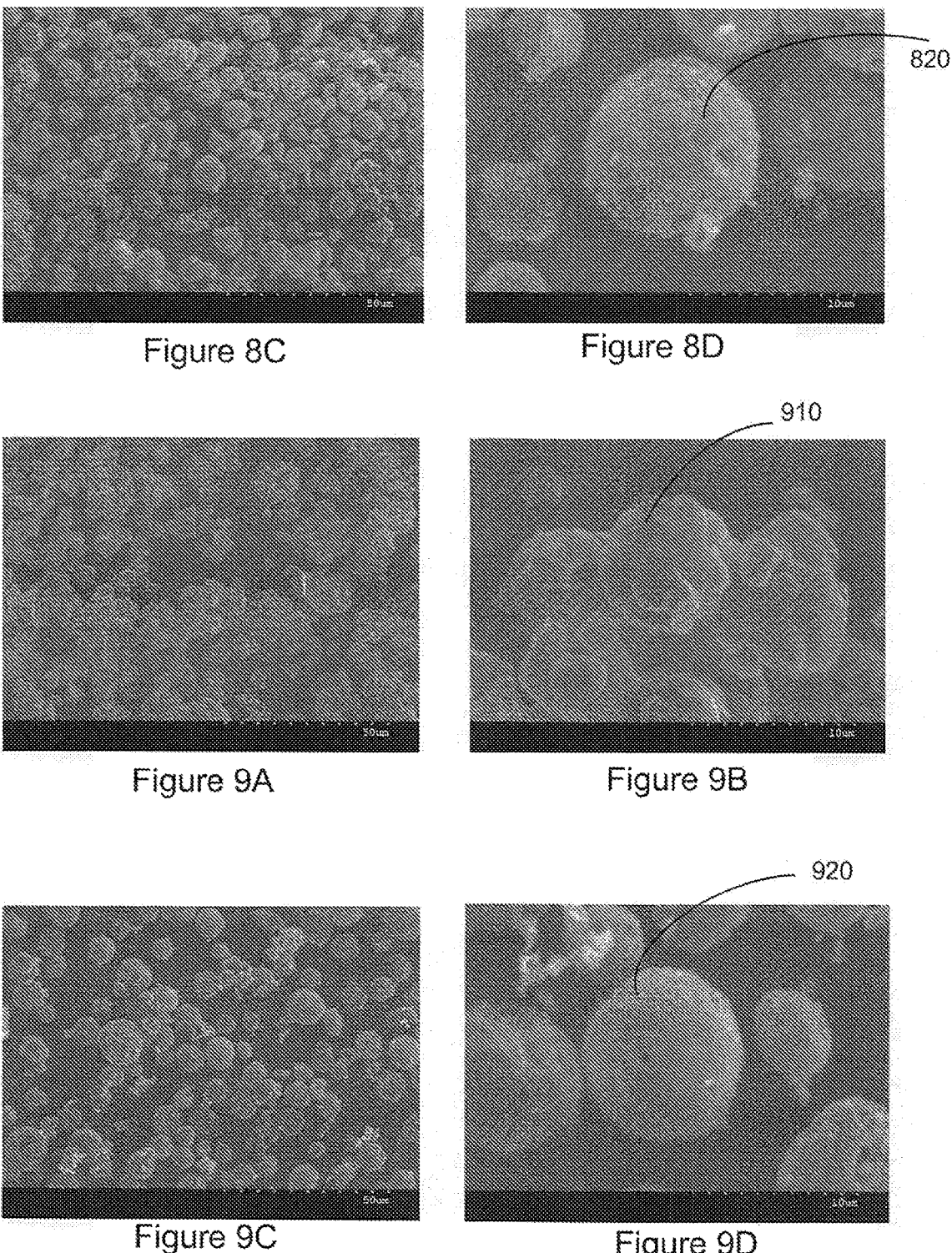
FIG. 8C is a scanning electron microscopy (SEM) image of another embodiment of another example of solid particles of an oxide material after a drying process.
FIG. 8D is a scanning electron microscopy (SEM) image of the example of FIG. 8C in larger magnitude.
FIG. 9A is a scanning electron microscopy (SEM) image of another example of crystallized lithium cobalt oxide materials of the invention.
FIG. 9B is a scanning electron microscopy (SEM) image of the example of FIG. 9A in larger magnitude.
FIG. 9C is a scanning electron microscopy (SEM) image of another embodiment of another example of solid particles of an oxide material after a drying process.
FIG. 9D is a scanning electron microscopy (SEM) image of the example of FIG. 9C in larger magnitude.

FIG. 8C and FIG. 8D are scanning electron microscopy (SEM) images of another example of solid particles of an oxide material doped with magnesium (LiCoO$_2$ ● doped Mg$_{0.45\%}$) after a drying process inside a drying chamber. The SEM Image shows the compositions and formulations of the present inventions having a molar ratio of a lithium-containing salt, a cobalt-containing salt, a magnesium-containing salt is M$_{LiSalt}$:M$_{CoSalt}$:M$_{MgSalt}$. The present invention having a chemical formula of Li$_x$ Co$_y$ O$_z$ ● doped Mg$_a$, wherein a ratio of x:y:a is equivalent to M$_{LiSalt}$:M$_{CoSalt}$:M$_{MgSalt}$, wherein the x is 1.0, the y is 1.0, and a is 0.0045. In FIG. 8C and FIG. 8D, exemplary lithium-containing salt compound include, but not limited to, lithium nitrate (LiNO$_3$) and combinations thereof, exemplary cobalt-containing salt compound include, but not limited to cobalt nitrate (Co(NO$_3$)$_2$) and combinations thereof, exemplary magnesium-containing salt (Mg) include, but not limited to, magnesium nitrate (Mg(NO$_3$)$_2$) and combinations thereof.

FIG. 8C illustrates the morphology and particle size of one example of lithium cobalt oxide material doped with magnesium particles after the drying process having crystallized structure. In addition, FIG. 8D shows a closer look of FIG. 8C. In one example as shown in FIG. 8D, one solid particle of a lithium cobalt oxide material doped with magnesium 820 is spherical in shape.

FIG. 9A and FIG. 9B are scanning electron microscopy (SEM) images of crystallized lithium cobalt oxide materials doped with aluminum (LiCoO$_2$ ● doped Al$_{0.45\%}$) of the invention after the annealing process at 1020° C. for 17 hours inside the annealing chamber. The SEM Image shows the compositions and formulations of the present inventions having a molar ratio of a lithium-containing salt, a cobalt-containing salt, an aluminum-containing salt is M$_{LiSalt}$:M$_{CoSalt}$:M$_{AlSalt}$. The present invention having a chemical formula of Li$_x$ Co$_y$ O$_z$ ● doped Al$_b$, wherein a ratio of x:y:b is equivalent to M$_{LiSalt}$:M$_{CoSalt}$:M$_{AlSalt}$, wherein the x is 1.0, the y is 1.0, and b is 0.0045. In FIG. 9A and FIG. 9B, exemplary lithium-containing salt compound include, but not limited to, lithium nitrate (LiNO$_3$) and combinations thereof, exemplary cobalt-containing salt compound include, but not limited to cobalt nitrate (Co(NO$_3$)$_2$) and combinations thereof, exemplary aluminum-containing salt (Al) include, but not limited to, aluminum nitrate (Al(NO$_3$)$_3$) and combinations thereof.

FIG. 9A illustrates the morphology and particle size of one example of lithium cobalt oxide material doped with aluminum particles at an annealing temperature of 1020° C. for 17 hours having crystallized structure. In addition, FIG. 9B shows a closer look of FIG. 9A. In one example as shown in FIG. 9B one lithium cobalt oxide material doped with aluminum particle 910 has a crystal structure.

FIG. 9C and FIG. 9D are scanning electron microscopy (SEM) images of another example of solid particles of an oxide material doped with aluminum (LiCoO$_2$ ● doped Al$_{0.45\%}$) after a drying process inside a drying chamber. The SEM Image shows the compositions and formulations of the present inventions having a molar ratio of a lithium-containing salt, a cobalt-containing salt, an aluminum-containing salt is M$_{LiSalt}$:M$_{CoSalt}$:M$_{AlSalt}$. The present invention having a chemical formula of Li$_x$ Co$_y$ O$_z$ ● doped Al$_b$, wherein a ratio of x:y:b is equivalent to M$_{LiSalt}$:M$_{CoSalt}$:M$_{AlSalt}$, wherein the x is 1.0, the y is 1.0, and b is 0.0045. In FIG. 9C and FIG. 9D, exemplary lithium-containing salt compound include, but not limited to, lithium nitrate (LiNO$_3$) and combinations thereof, exemplary cobalt-containing salt compound include, but not limited to cobalt nitrate (Co(NO$_3$)$_2$) and combinations thereof, exemplary aluminum-containing salt (Al) include, but not limited to, aluminum nitrate (Al(NO$_3$)$_3$) and combinations thereof.

FIG. 9C illustrates the morphology and particle size of one example of lithium cobalt oxide material doped with aluminum particles after the drying process having crystallized structure. In addition, FIG. 9D shows a closer look of FIG. 9C. In one example as shown in FIG. 9D, one solid particle of a lithium cobalt oxide material doped with aluminum 920 is spherical in shape.

Figures 10A, 10B, 10C, 10D, 11A, 11B:
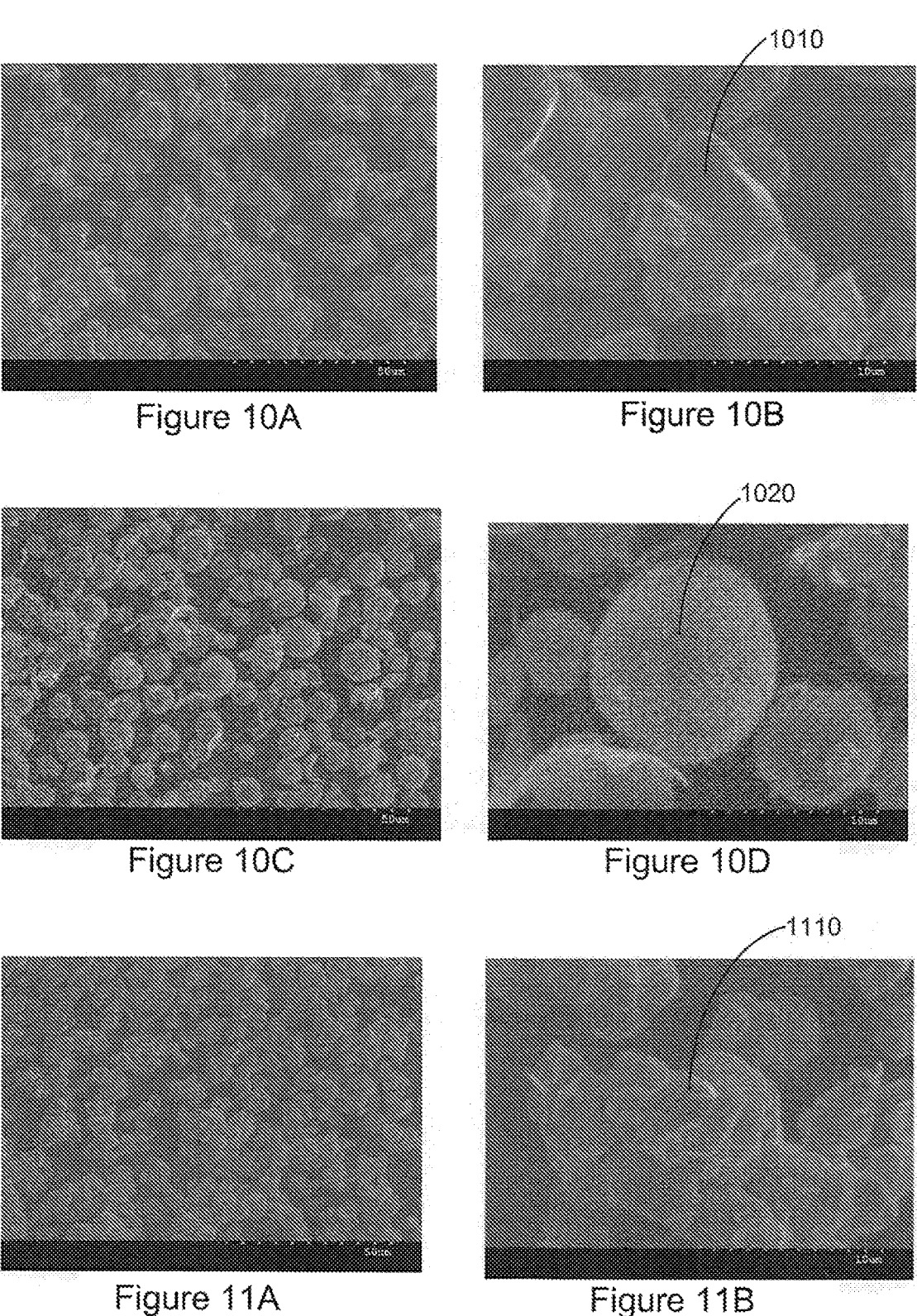
FIG. 10A is a scanning electron microscopy (SEM) image of another example of crystallized lithium cobalt oxide materials of the invention.
FIG. 10B is a scanning electron microscopy (SEM) image of the example of FIG. 10A in larger magnitude.
FIG. 10C is a scanning electron microscopy (SEM) image of another embodiment of another example of solid particles of an oxide material after a drying process.
FIG. 10D is a scanning electron microscopy (SEM) image of the example of FIG. 10C in larger magnitude.
FIG. 11A is a scanning electron microscopy (SEM) image of another example of crystallized lithium cobalt oxide materials of the invention.
FIG. 11B is a scanning electron microscopy (SEM) image of the example of FIG. 11A in larger magnitude.

FIG. 10A and FIG. 10B are scanning electron microscopy (SEM) images of crystallized lithium cobalt oxide materials doped with magnesium and aluminum (LiCoO$_2$ ● doped Mg$_{0.10}$%, Al$_{0.35}$%) of the invention after the annealing process at 1020° C. for 17 hours inside the annealing chamber. The SEM Image shows the compositions and formulations of the present inventions having a molar ratio of a lithium-containing salt, a cobalt-containing salt, a magnesium-containing salt, an aluminum-containing salt is M$_{LiSalt}$:M$_{CoSalt}$:M$_{MgSalt}$:M$_{AlSalt}$. The present invention having a chemical formula of Li$_x$ Co$_y$ O$_z$ ● doped Mg$_a$, Al$_b$, wherein a ratio of x:y:a:b is equivalent to M$_{LiSalt}$:M$_{CoSalt}$:M$_{MgSalt}$:M$_{AlSalt}$, wherein the x is 1.0, the y is 1.0, a is 0.001 and b is 0.0035. In FIG. 10A and FIG. 10B, exemplary lithium-containing salt compound include, but not limited to, lithium nitrate (LiNO$_3$) and combinations thereof, exemplary cobalt-containing salt compound include, but not limited to cobalt nitrate (Co(NO$_3$)$_2$) and combinations thereof. Exemplary magnesium-containing salt (Mg) include, but not limited to, magnesium nitrate (Mg(NO$_3$)$_2$) and combinations thereof. Exemplary aluminum-containing salt (Al) include, but not limited to, aluminum nitrate (Al(NO$_3$)$_3$) and combinations thereof.

FIG. 10A illustrates the morphology and particle size of one example of lithium cobalt oxide material doped with magnesium and aluminum particles at an annealing temperature of 1020° C. for 17 hours having crystallized structure. In addition, FIG. 10B shows a closer look of FIG. 10A. In one example as shown in FIG. 10B one lithium cobalt oxide material doped with magnesium and aluminum particle 1010 has a crystal structure.

FIG. 10C and FIG. 10D are scanning electron microscopy (SEM) images of another example of solid particles of an oxide material doped with magnesium and aluminum (LiCoO$_2$ ● doped Mg$_{0.10}$%, Al$_{0.35}$%) after a drying process inside a drying chamber. The SEM Image shows the compositions and formulations of the present inventions having a molar ratio of a lithium-containing salt, a cobalt-containing salt, a magnesium-containing salt, an aluminum-containing salt is M$_{LiSalt}$:M$_{CoSalt}$:M$_{MgSalt}$:M$_{AlSalt}$. The present invention having a chemical formula of Li$_x$ Co$_y$ O$_z$ ● doped Mg$_a$, Al$_b$, wherein a ratio of x:y:a:b is equivalent to M$_{LiSalt}$:M$_{CoSalt}$:M$_{MgSalt}$:M$_{AlSalt}$, wherein the x is 1.0, the y is 1.0, a is 0.001 and b is 0.0035. In FIG. 10C and FIG. 10D, exemplary lithium-containing salt compound include, but not limited to, lithium nitrate (LiNO$_3$) and combinations thereof, exemplary cobalt-containing salt compound include, but not limited to cobalt nitrate (Co(NO$_3$)$_2$) and combinations thereof. Exemplary magnesium-containing salt (Mg) include, but not limited to, magnesium nitrate (Mg(NO$_3$)$_2$) and combinations thereof. Exemplary aluminum-containing salt (Al) include, but not limited to, aluminum nitrate (Al(NO$_3$)$_3$) and combinations thereof.

FIG. 10C illustrates the morphology and particle size of one example of lithium cobalt oxide material doped with magnesium and aluminum particles after the drying process having crystallized structure. In addition, FIG. 10D shows a closer look of FIG. 10C. In one example as shown in FIG. 10D, one solid particle of a lithium cobalt oxide material doped with magnesium and aluminum 1020 is spherical in shape.

FIG. 11A and FIG. 11B are scanning electron microscopy (SEM) images of crystallized lithium cobalt oxide materials doped with zirconium (LiCoO$_2$ ● doped Zr$_{0.17}$%) of the invention after the annealing process at 1020° C. for 17 hours inside the annealing chamber. The SEM Image shows the compositions and formulations of the present inventions having a molar ratio of a lithium-containing salt, a cobalt-containing salt, a magnesium-containing salt is M$_{LiSalt}$:M$_{CoSalt}$:M$_{ZrSalt}$. The present invention having a chemical formula of Li$_x$ Co$_y$ O$_z$ ● doped Zr$_c$, wherein a ratio of x:y:c is equivalent to M$_{LiSalt}$:M$_{CoSalt}$:M$_{ZrSalt}$, wherein the x is 1.0, the y is 1.0, and c is 0.0017. In FIG. 11A and FIG. 11B, exemplary lithium-containing salt compound include, but not limited to, lithium nitrate (LiNO$_3$) and combinations thereof, exemplary cobalt-containing salt compound include, but not limited to cobalt nitrate (Co(NO$_3$)$_2$) and combinations thereof, and exemplary zirconium-containing salt (Zr) include, but not limited to, zirconium nitrate (Zr(NO$_3$)$_4$) and combinations thereof.

FIG. 11A illustrates the morphology and particle size of one example of lithium cobalt oxide material doped with zirconium particles at an annealing temperature of 1020° C. for 17 hours having crystallized structure. In addition, FIG. 11B shows a closer look of FIG. 11A. In one example as shown in FIG. 11B one lithium cobalt oxide material doped with zirconium particle 1110 has a crystal structure. Referring back to FIG. 7B-FIG. 10B, further observation can be found that the morphology does not change significantly with different dopants.

Figures 12A, 12B, 13A, 13B:
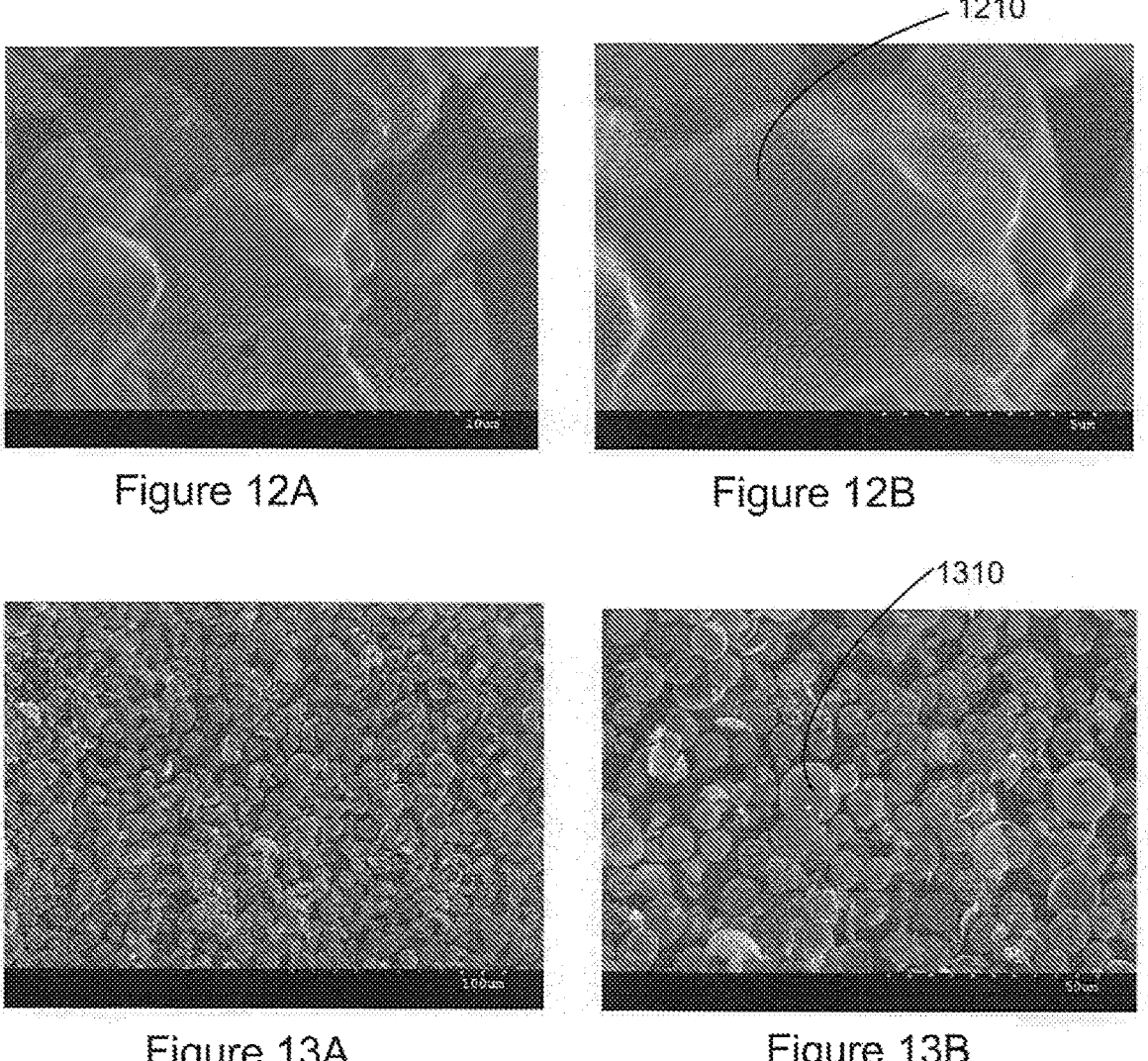
FIG. 12A is a scanning electron microscopy (SEM) image of another example of crystallized lithium cobalt oxide materials of the invention.
FIG. 12B is a scanning electron microscopy (SEM) image of the example of FIG. 12A in larger magnitude.
FIG. 13A is a scanning electron microscopy (SEM) image of another embodiment of another example of solid particles of an oxide material after a drying process.
FIG. 13B is a scanning electron microscopy (SEM) image of the example of FIG. 13A in larger magnitude.

FIG. 12A and FIG. 12B are scanning electron microscopy (SEM) images of one example of crystallized lithium cobalt oxide materials doped with magnesium (Li$_{0.97}$Co$_{1.0}$O$_2$ ● doped Mg$_{0.17}$%) of the invention after the annealing process at 1020° C. for 17 hours inside the annealing chamber. The SEM Image shows the compositions and formulations of the present inventions having a molar ratio of a lithium-containing salt, a cobalt-containing salt, a magnesium-containing salt is M$_{LiSalt}$:M$_{CoSalt}$:M$_{MgSalt}$. The present invention having a chemical formula of Li$_x$ Co$_y$ O$_z$ ● doped Mg$_a$, wherein a ratio of x:y:a is equivalent to M$_{LiSalt}$:M$_{CoSalt}$:M$_{MgSalt}$, wherein the x is 0.97, the y is 1.0, and a is 0.0017. In FIG. 12A and FIG. 12B, exemplary lithium-containing salt compound include, but not limited to, lithium nitrate (LiNO$_3$) and combinations thereof, exemplary cobalt-containing salt compound include, but not limited to cobalt nitrate (Co(NO$_3$)$_2$) and combinations thereof, exemplary magnesium-containing salt (Mg) include, but not limited to, magnesium nitrate (Mg(NO$_3$)$_2$) and combinations thereof.

FIG. 12A illustrates the morphology and particle size of one example of lithium cobalt oxide material doped with magnesium particles at an annealing temperature of 1020° C. for 17 hours having crystallized structure. In addition, FIG. 12A shows a closer look of FIG. 12A. In one example as shown in FIG. 12B one lithium cobalt oxide material doped with magnesium particle 1210 has a crystal structure. Referring back to FIG. 7B-FIG. 11B, further observation can be found that the morphology does not change significantly with different dopants.

FIG. 13A and FIG. 13B are scanning electron microscopy (SEM) images of one example of solid particles of an oxide material doped with magnesium and aluminum (LiCoO$_2$ ● doped Mg$_{0.10}$%, Al$_{0.35}$%) after a drying process inside a drying chamber. The SEM Image shows the compositions and formulations of the present inventions having a molar ratio of a lithium-containing salt, a cobalt-containing salt, a magnesium-containing salt, an aluminum-containing salt is M$_{LiSalt}$:M$_{CoSalt}$:M$_{MgSalt}$:M$_{AlSalt}$. The present invention having a chemical formula of Li$_x$ Co$_y$ O$_z$ ● doped Mg$_a$, Al$_b$, wherein a ratio of x:y:a:b is equivalent to $M_{LiSalt}$:$M_{CoSalt}$:$M_{MgSalt}$:$M_{AlSalt}$, wherein the x is 1.0, the y is 1.0, a is 0.001 and b is 0.0035.

In FIG. 13A and FIG. 13B, exemplary lithium-containing salt compound include, but not limited to, lithium nitrate ($LiNO_3$) and combinations thereof, exemplary cobalt-containing salt compound include, but not limited to cobalt nitrate ($Co(NO_3)_2$) and combinations thereof. Exemplary magnesium-containing salt (Mg) include, but not limited to, magnesium nitrate ($Mg(NO_3)_2$) and combinations thereof. Exemplary aluminum-containing salt (Al) include, but not limited to, aluminum nitrate ($Al(NO_3)_3$) and combinations thereof.

FIG. 13A illustrates the morphology and particle size of one example of lithium cobalt oxide material doped with magnesium and aluminum particles after the drying process having crystallized structure. In addition, FIG. 13B shows a closer look of FIG. 13A. In one example as shown in FIG. 13B, one solid particle of a lithium cobalt oxide material doped with magnesium and aluminum 1310 is spherical in shape.

Referring back to FIG. 13A and FIG. 13B, the tap density ("TD") and particle size distribution (known as "PSD" or "SPAN") of the solid particles of a lithium cobalt oxide material is shown as Table 20.

To be precise, the "SPAN" value represents a degree of particle size distribution ("PSD"), defined as (D90-D10)/D50. "D10", "D50", and "D90" are defined as the particle size at 10%, 50%, and 90% of the cumulative volume % distribution. D50 represents an average particle size which is larger than 50% (by number) of the total particles that are present (also known as the median diameter). D90 and D10 respectively stand for particle diameters that are larger than 90% and 10% of all the particles (by number). Further, the particle size is expressed in μm. The tapped density of the solid particles of a lithium cobalt oxide material is 0.86 g/cc, D10 value is 3.69 μm, D50 value is 7.71 μm, D90 value is 13.3 μm and PSD value is 1.25.

TABLE 20

Measurement of tap density (TD) and particle size of solid particles of a lithium cobalt oxide material after a drying process

| Tap Density | D10 | D50 | D90 | PSD |
|---|---|---|---|---|
| 0.86 | 3.69 | 7.71 | 13.3 | 1.25 |

FIG. 14A-14C, FIG. 15A-15C, FIG. 16A-16C, and FIG. 17A-17C are scanning electron microscopy (SEM) images of crystallized lithium cobalt oxide materials doped with magnesium and aluminum ($LiCoO_2$ ● doped $Mg_{0.10}$%, $Al_{0.35}$%) of the invention after the annealing process at different annealing temperatures (from 900° C. to 1050° C.) for 17 hours inside the annealing chamber. The SEM Image shows the compositions and formulations of the present inventions having a molar ratio of a lithium-containing salt, a cobalt-containing salt, a magnesium-containing salt, an aluminum-containing salt is $M_{LiSalt}$:$M_{CoSalt}$:$M_{MgSalt}$:$M_{AlSalt}$. The present invention having a chemical formula of $Li_x Co_y O_z$ ● doped $Mg_a$, $Al_b$, wherein a ratio of x:y:a:b is equivalent to $M_{LiSalt}$:$M_{CoSalt}$:$M_{MgSalt}$:$M_{AlSalt}$, wherein the x is 1.0, the y is 1.0, a is 0.001 and b is 0.0035.

In FIG. 14A-14C, FIG. 15A-15C, FIG. 16A-16C, and FIG. 17A-17C, exemplary lithium-containing salt compound include, but not limited to, lithium nitrate ($LiNO_3$) and combinations thereof, exemplary cobalt-containing salt compound include, but not limited to cobalt nitrate (Co ($NO_3)_2$) and combinations thereof. Exemplary magnesium-containing salt (Mg) include, but not limited to, magnesium nitrate ($Mg(NO_3)_2$) and combinations thereof. Exemplary aluminum-containing salt (Al) include, but not limited to, aluminum nitrate ($Al(NO_3)_3$) and combinations thereof.

Figures 14A, 14B, 14C, 15A, 15B, 15C:
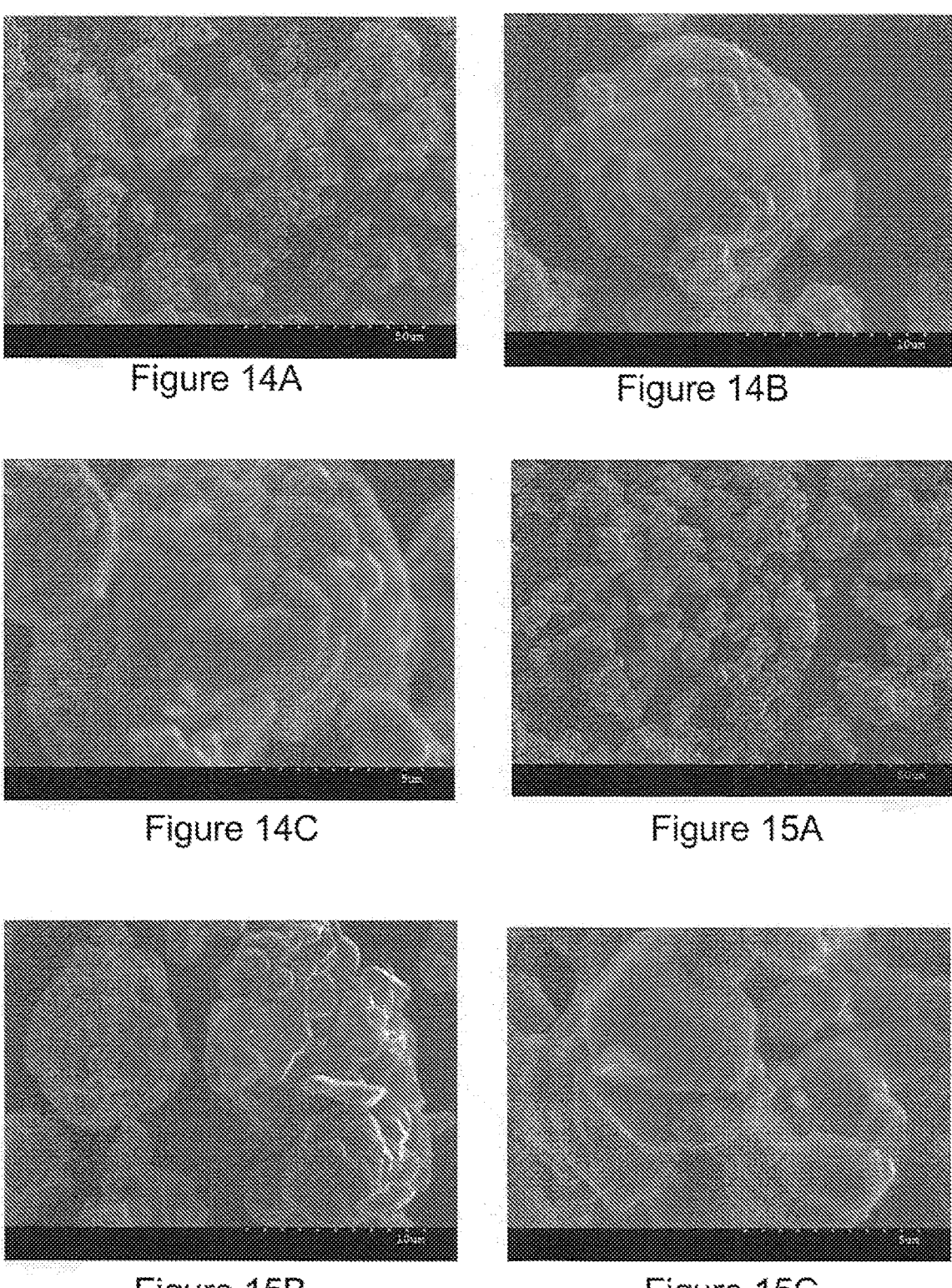
FIG. 14A is a scanning electron microscopy (SEM) image of another example of crystallized lithium cobalt oxide materials of the invention.
FIG. 14B is a scanning electron microscopy (SEM) image of the example of FIG. 14A in larger magnitude.
FIG. 14C is a scanning electron microscopy (SEM) image of the example of FIG. 14A in larger magnitude.
FIG. 15A is a scanning electron microscopy (SEM) image of another example of crystallized lithium cobalt oxide materials of the invention.
FIG. 15B is a scanning electron microscopy (SEM) image of the example of FIG. 15A in larger magnitude.
FIG. 15C is a scanning electron microscopy (SEM) image of the example of FIG. 15A in larger magnitude.
Figure 18:
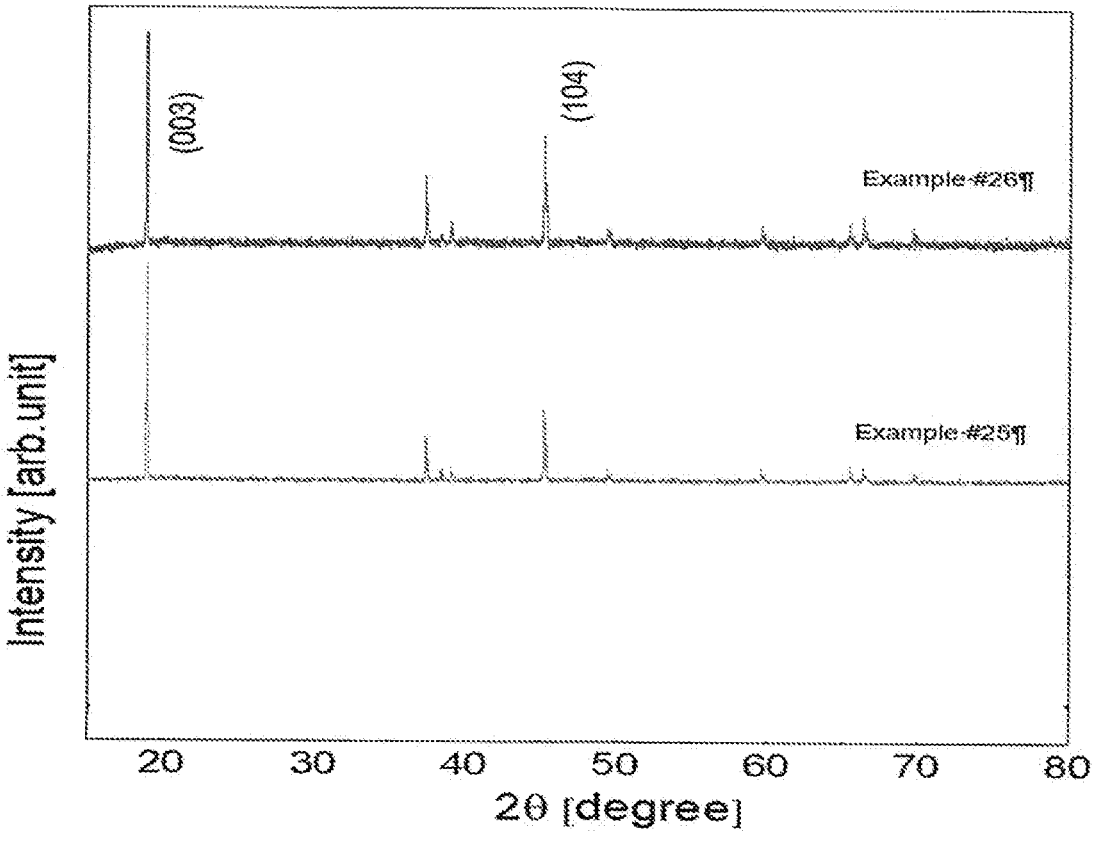
FIG. 18 is an X-ray diffraction (XRD) pattern of two examples of crystallized lithium cobalt oxide materials of the invention.

In one example as shown in FIG. 14A, the SEM shows the morphology and particle size of lithium cobalt oxide material particles doped with magnesium and aluminum ($LiCoO_2$ ● doped $Mg_{0.10}$%, $Al_{0.35}$%) at an annealing temperature of 900° C. for 17 hours having crystallized structure. FIG. 14B and FIG. 14C show a closer look of FIG. 14A.

In another example as shown in FIG. 15A, the SEM shows the morphology and particle size of lithium cobalt oxide material particles doped with magnesium and aluminum at an annealing temperature of 950° C. for 17 hours having crystallized structure. FIG. 15B and FIG. 15C show a closer look of FIG. 15A.

Referring back to FIG. 16A, the SEM shows the morphology and particle size of yet another example of lithium cobalt oxide material particles doped with magnesium and aluminum ($LiCoO_2$ ● doped $Mg_{0.10}$%, $Al_{0.35}$%) at an annealing temperature of 1000° C. for 17 hours having crystallized structure. FIG. 16B and FIG. 16C show a closer look of FIG. 16A.

In still another example as shown in FIG. 17A, the SEM shows the morphology and particle size of lithium cobalt oxide material particles doped with magnesium and aluminum ($LiCoO_2$ ● doped $Mg_{0.10}$%, $Al_{0.35}$%) at an annealing temperature of 1050° C. for 17 hours having crystallized structure. FIG. 17B and FIG. 17C show a closer look of FIG. 17A.

Referring back to FIG. 13-17, Table 21 illustrates testing results of samples of exemplary measured LCO material doped with magnesium and aluminum ($LiCoO_2$ ● doped $Mg_{0.10\%}$, $Al_{0.35\%}$). One observation is that the testing results of the ratio of the measured LCO material compositions of Li:Co:Mg:Al are within an expected range from the prepared molar ratio of $M_{LiSalt}$:$M_{CoSalt}$:$M_{MgSalt}$ being prepared.

TABLE 21

Exemplary measured LCO material compositions

| Corresponding Figure | Li | Co | Al | Mg | Condition |
|---|---|---|---|---|---|
| FIG. 13A, FIG. 13B | 1.0862 | 0.9875 | 0.0125 | 0.0040 | After Drying |
| FIG. 14A, FIG. 14B | 1.0629 | 0.9873 | 0.0127 | 0.0041 | Anneal at 900° C. |
| FIG. 15A, FIG. 15B | 1.0424 | 0.9862 | 0.0138 | 0.0041 | Anneal at 950° C. |
| FIG. 16A, FIG. 16B | 1.0313 | 0.9867 | 0.0133 | 0.0040 | Anneal at 1000° C. |
| FIG. 17A, FIG. 17B | 1.0067 | 0.9856 | 0.0144 | 0.0039 | Anneal at 1050° C. |

FIG. 22 illustrates a comparison of X-ray diffraction patterns, prepared according to Example #25 and Example #26. The crystal structure of the lithium cobalt oxide materials doped with one or more metal dopants (Example #25 and Example #26) have been investigated by means of X-ray diffraction. Example #25 and Example #26 exhibit a $LiCoO_2$ single phase. No second phases, impurity phases, such as $Li_2Co_3$, $Co_3O_4$ are observed.

Details of XRD results, prepared according to Example #25 and Example #26 are shown as Table 22. Comparison of the XRD results, prepared according to Example #25 and Example #26 are shown as Table 23. Based on the XRD results, one observation can be found that the intensity ratio I(003)/I(104) of Example #25 is higher than the intensity ratio I(003)/I(104) of Example #26. Further observation can be found that FWHM (003) and (104) of Example #25 is lower than Example #26. Another observation can be found that c/a of Example #26 is higher than c/a of Example #25. Still another observation can be found that $\Delta 2\theta[(012)-(006)]$, $\Delta 2\theta[(110)-(018)]$ of Example #25 is similar to the data of) Example #26.

Table 22: XRD Results

|  | Example#25 | Example#26 |
|---|---|---|
| a [Å] | 2.8143 ± 0.002 | 2.8159 ± 0.0002 |
|  | (0.07%) | (0.007%) |
| c [Å] | 14.044 ± 0.001 | 14.058 ± 0.001 |
|  | (0.007%) | (0.007%) |
| c/a | 4.990 | 4.992 |
| hkl | 003   104 | 003   104 |
| 2θ[°] | 18.955   45.253 | 18.917   45.225 |
| FWHM[°] | 0.09   0.07 | 0.10   0.09 |
| I (003)/I (104) | 3.96 | 2.27 |
| hkl | 006   012 | 006   012 |
| 2θ[°] | 38.427   39.090 | 38.395   39.062 |
| Δ2θ[(012-(006)][°] | 0.663 | 0.667 |
| hkl | 018   110 | 018   110 |
| 2θ[°] | 65.456   66.372 | 65.431   66.346 |
| Δ2θ[(110)-(018)][°] | 0.916 | 0.915 |
| η | 0.51 | 0.45 |
| $K_{Fm}$ | 23.53 | 15.37 |

TABLE 23

Comparison of the XRD Results

| Sample no. | Example 25 | Example 26 |
|---|---|---|
| I1 (003)/I (104) | 3.96 | 2.27 |
| hkl | 003   104 | 003   104 |
| FWHM[°] | 0.09   0.07 | 0.10   0.09 |
| Δ2θ[(012)-(006)][°] | 0.663 | 0.667 |
| Δ2θ[(110)-(018)][°] | 0.916 | 0.915 |
| c/a | 4.990 | 4.992 |
| $r_I$ | 0.51 | 0.45 |
| $K_{Fm}$ | 23.53 | 15.37 |

What is claimed:

1. An oxide material, comprising:
a lithium cobalt oxide material doped with at least one metal dopant, $Li_x Co_y O_z$ ● doped $Me_a$, wherein x is from 0.9 to 1.1, $0.9 \leq x \leq 1.1$, y is from 0.9 to 1.1, $0.9 \leq y \leq 1.1$, z is from 1.8 to 2.2, $1.8 \leq z \leq 2.2$, and wherein $0 < a \leq 0.05$, wherein, based on X-ray diffraction (XRD) pattern, the lithium cobalt oxide material doped with the at least one metal dopant exhibits a single phase of lithium cobalt oxide compound with no detectable second phases from impurities and a c/a lattice parameter ratio of not less than 4.990 after being obtained from a process comprising:
adjusting a molar ratio $M_{LiSalt}:M_{CoSalt}:M_{Me\ Salt}$ of a lithium-containing salt, a cobalt-containing salt, and at least one metal-dopant-containing salt into a liquid mixture to be a ratio of about 1:1:a, where a is more than 0 and not more than 0.05;
forming a mist of the liquid mixture, wherein the liquid mixture comprises:
the lithium-containing salt;
the cobalt-containing salt; and
the at least one metal-dopant-containing salt;

mixing the mist of the liquid mixture with a first gas flow to form a gas-liquid mixture;
drying the gas-liquid mixture to form a gas-solid mixture;
separating the gas-solid mixture into one or more solid particles of an oxide material; and
annealing the one or more solid particles of the oxide material at an annealing temperature of 400° C. or higher to obtain crystallized particles of the lithium cobalt oxide material doped with at least one metal dopant $Li_x Co_y O_z$ ● doped $Me_a$.

2. The oxide material of claim 1, wherein a tap density (TD) of the lithium cobalt oxide material doped with at least one metal dopant $Li_x Co_y O_z$ ● doped $Me_a$ is TD≥2.1 (g/cc).

3. The oxide material of claim 1, wherein a coulombic efficiency (CE) of battery cells made by the lithium cobalt oxide material doped with at least one metal dopant $Li_x Co_y O_z$ ● doped $Me_a$ at cutoff voltage of 4.3 voltage is CE≥95.7%.

4. The oxide material of claim 1, wherein a coulombic efficiency (CE) of battery cells made by the lithium cobalt oxide material doped with at least one metal dopant $Li_x Co_y O_z$ ● doped $Me_a$ at cutoff voltage of 4.4 voltage is CE≥97%.

5. The oxide material of claim 1, wherein a coulombic efficiency (CE) of battery cells made by the lithium cobalt oxide material doped with at least one metal dopant $Li_x Co_y O_z$ ● doped $Me_a$ at cutoff voltage of 4.45 voltage is CE≥93.2%.

6. The oxide material of claim 1, wherein a coulombic efficiency (CE) of battery cells made by the lithium cobalt oxide material doped with at least one metal dopant $Li_x Co_y O_z$ ● doped $Me_a$ at cutoff voltage of 4.5 voltage is CE≥92.9%.

7. The oxide material of claim 1, wherein a coulombic efficiency (CE) of battery cells made by the lithium cobalt oxide material doped with at least one metal dopant $Li_x Co_y O_z$ ● doped $Me_a$ at cutoff voltage of 4.6 voltage is CE≥95.6%.

8. The oxide material of claim 1, wherein a first discharge capacity at cutoff voltage of 4.45 voltage of the lithium cobalt oxide material doped with at least one metal dopant $Li_x Co_y O_z$ ● doped $Me_a$ is no less than (≥) 180.33 mAh/g.

9. The oxide material of claim 1, wherein a first discharge capacity at cutoff voltage of 4.5 voltage of the lithium cobalt oxide material doped with at least one metal dopant $Li_x Co_y O_z$ ● doped $Me_a$ is no less than (≥) 190.32 mAh/g.

10. The oxide material of claim 1, wherein a first discharge capacity at cutoff voltage of 4.6 voltage of the lithium cobalt oxide material doped with at least one metal dopant $Li_x Co_y O_z$ ● doped $Me_a$ is no less than (≥) 217.2 mAh/g.

11. The oxide material of claim 1, wherein the lithium cobalt oxide material doped with at least one metal dopant $Li_x Co_y O_z$ ● doped $Me_a$ exhibit an intensity ratio I(003)/I (104)≥2.27 based on X-ray diffraction pattern.

12. The oxide material of claim 1, wherein the lithium cobalt oxide material doped with at least one metal dopant $Li_x Co_y O_z$ ● doped $Me_a$ exhibit $\Delta 2\theta[(012)-(006)] \geq 0.663°$ based on X-ray diffraction pattern.

13. The oxide material of claim 1, wherein the lithium cobalt oxide material doped with at least one metal dopant $Li_x Co_y O_z$ ● doped $Me_a$ exhibit $\Delta 2\theta[(110)-(018)] \geq 0.915°$ based on X-ray diffraction pattern.

14. The oxide material of claim 1, wherein a full width at half maximum (FWHM) of the lithium cobalt oxide material doped with at least one metal dopant $Li_x Co_y O_z$ ● doped $Me_a$ exhibit FWHM (003)≥0.09° based on X-ray diffraction pattern.

15. The oxide material of claim 1, wherein a full width at half maximum (FWHM) of the lithium cobalt oxide material doped with at least one metal dopant $Li_x$ $Co_y$ $O_z$ ● doped $Me_a$ exhibit FWHM (0104)≥0.07° based on X-ray diffraction pattern.

16. The oxide material of claim 1, wherein the at least one metal dopant is selected from the group consisting of Al, Mg, Mn, Zr, Zn, Nb, La, Ce, Sn, Ga, Ba, Ac, Ca, Sc, Ti, V, Cr, Fe, Cu, B, Ge, As, Hf, Mo, W, Re, Ru, Rh, Pt, Ag, Os, Ir, Au, and combinations thereof.

17. The oxide material of claim 1, wherein the at least one metal dopant comprises magnesium (Mg), and wherein a battery cell made from the lithium cobalt oxide materials doped with the magnesium, which is annealed at 1090° C., exhibits a first discharge capacity no less than 175 mAh/g and a coulombic efficiency greater than 97% at 4.5 Voltage.

18. The oxide material of claim 1, wherein the at least one metal dopant comprises zirconium (Zr), such that the battery cell made from the lithium cobalt oxide materials doped with the zirconium and annealed at 1020° C. exhibits a first discharge capacity no less than 194 mAh/g and a coulombic efficiency greater than 97% at 4.5 Voltage.

19. The oxide material of claim 1, wherein the at least one metal dopant comprises aluminum (Al), such that the battery cell made from the lithium cobalt oxide materials doped with the aluminum exhibits a first discharge capacity greater than 191 mAh/g and a coulombic efficiency greater than 97% at 4.5 Voltage.

20. The oxide material of claim 1, wherein the at least one metal dopant comprises magnesium (Mg) and aluminum (Al), such that the battery cell made from the lithium cobalt oxide materials doped with the magnesium and the aluminum exhibits a first discharge capacity greater than 190 mAh/g and a coulombic efficiency greater than 96% at 4.5 Voltage.

* * * * *